US012776846B2

(12) United States Patent
Banin et al.

(10) Patent No.: US 12,776,846 B2
(45) Date of Patent: Oct. 27, 2026

(54) DISTRIBUTED RADIOHEAD SYSTEM (DRS) AND CLOCKING, CALIBRATION, AND SYNCHRONIZATION FOR DRS

(71) Applicant: Intel Corporation, Santa Clara, CA (US)

(72) Inventors: Rotem Banin, Even Yehuda (IL); Ofir Degani, Haifa (IL); Shahar Gross, Nes Ziona (IL); Run Levinger, Portland, OR (US); Eytan Mann, Modiin (IL); Ashoke Ravi, Portland, OR (US); Ehud Reshef, Qiryat Tivon (IL); Amir Rubin, Kiryat Ono (IL); Eran Segev, Tel Aviv (IL); Evgeny Shumaker, Nesher (IL)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 18/041,804

(22) PCT Filed: Sep. 25, 2020

(86) PCT No.: PCT/US2020/052605
§ 371 (c)(1),
(2) Date: Feb. 16, 2023

(87) PCT Pub. No.: WO2022/066161
PCT Pub. Date: Mar. 31, 2022

(65) Prior Publication Data
US 2023/0308193 A1 Sep. 28, 2023

(51) Int. Cl.
*H04B 17/14* (2015.01)
*H04W 56/00* (2009.01)

(52) U.S. Cl.
CPC ........ *H04B 17/14* (2015.01); *H04W 56/0015* (2013.01)

(58) Field of Classification Search
CPC ........ H04B 1/38; H04B 7/0456; H04B 17/11; H04B 17/14; H04B 17/309; H04B 17/318; H04W 72/0453
(Continued)

(56) References Cited

U.S. PATENT DOCUMENTS 9,025,524 B2 5/2015 Lee et al.
9,379,856 B2 6/2016 Khoryaev et al.
(Continued)

FOREIGN PATENT DOCUMENTS

EP 2894794 A1 7/2015

OTHER PUBLICATIONS

Dutch search report issued for the corresponding Dutch patent application No. NL2029023A, dated Apr. 4, 2022, 1 page (for informational purposes only).
(Continued)

*Primary Examiner* — Harun Chowdhury
(74) *Attorney, Agent, or Firm* — Viering, Jentschura & Partner mbB

(57) ABSTRACT

In various aspects of this disclosure, a communication device is provided. The communication device may include a first radiohead circuit including a first transceiver chain configured to transmit a first radio frequency signal associated with a first transmission configuration and to transmit a second radio frequency signal associated with a second transmission configuration a second radiohead circuit comprising a second transceiver chain configured to receive the first radio frequency signal and the second radio frequency signal, and one or more processors configured to determine a first signal parameter associated with the first radio frequency signal received at the second transceiver chain and a second signal parameter associated with the second radio frequency signal received at the second transceiver chain,
(Continued)

Figure 1:
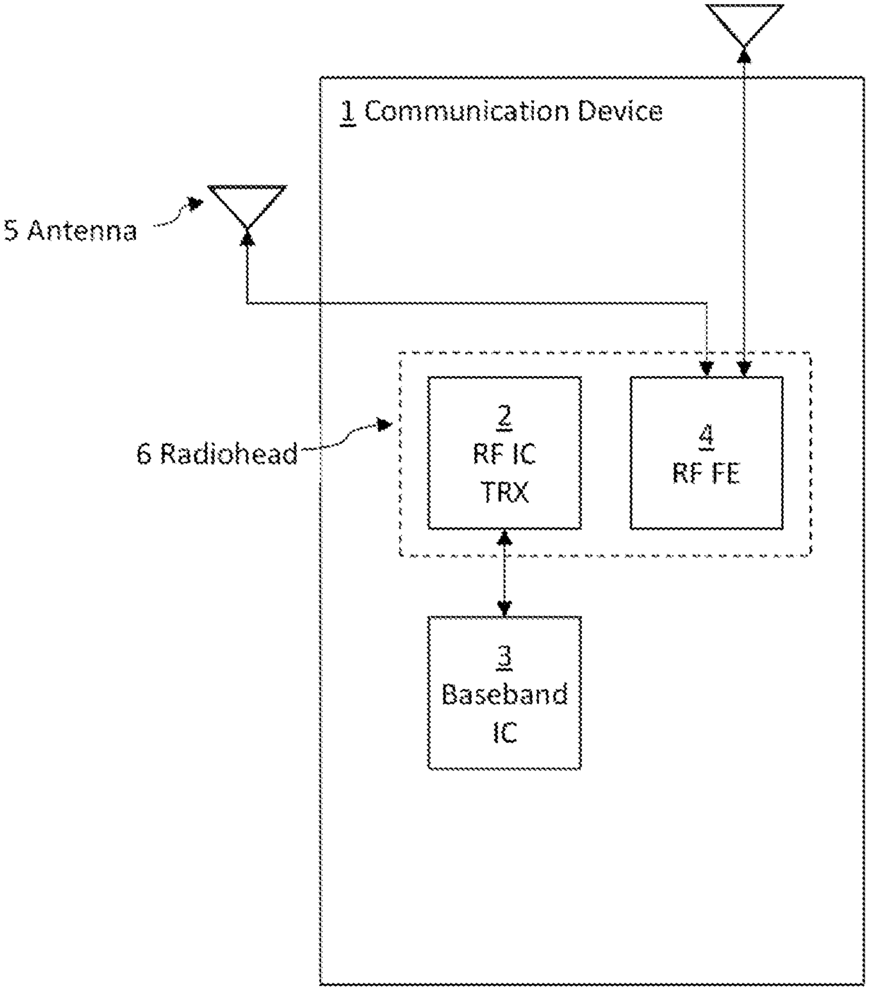

and to determine a preferred transmission configuration for the first transceiver chain by using the first signal parameter and the second signal parameter.

24 Claims, 37 Drawing Sheets

(58) Field of Classification Search
USPC .......................................... 370/252, 328, 329
See application file for complete search history.

(56) References Cited

U.S. PATENT DOCUMENTS

| | | | | |
|---|---|---|---|---|
| 9,991,972 | B1 | 6/2018 | Dogan et al. | |
| 10,045,306 | B2 | 8/2018 | Tarlazzi et al. | |
| 10,601,505 | B2 | 3/2020 | Hoffmann et al. | |
| 2001/0024474 | A1 | 9/2001 | Rakib et al. | |
| 2015/0200740 | A1* | 7/2015 | Yi | H04L 5/0035 370/328 |
| 2015/0341802 | A1* | 11/2015 | Chiang | H04B 17/12 455/424 |
| 2015/0358791 | A1* | 12/2015 | Wang | H04B 1/38 370/328 |
| 2016/0099762 | A1* | 4/2016 | Wu | H04B 7/0456 370/329 |
| 2017/0272180 | A1 | 9/2017 | Jitsukawa et al. | |
| 2019/0124648 | A1 | 4/2019 | Sun et al. | |
| 2020/0137835 | A1* | 4/2020 | Estella Aguerri | H04W 72/0453 |
| 2020/0259554 | A1 | 8/2020 | Kim et al. | |
| 2020/0295851 | A1* | 9/2020 | Luo | H04B 17/11 |
| 2021/0399812 | A1* | 12/2021 | Xiong | H04B 17/318 |

OTHER PUBLICATIONS

International Search Report for corresponding PCT application No. PCT/US2020052605, dated Jun. 23, 2021, 15 pages (for informational purposes only).

* cited by examiner

DISTRIBUTED RADIOHEAD SYSTEM (DRS) AND CLOCKING, CALIBRATION, AND SYNCHRONIZATION FOR DRS

RELATED APPLICATION(S)

This application is a National Stage Application, filed under 35 U.S.C. § 371, of International Patent Application No. PCT/US2020/052605, filed on Sep. 25, 2020, which is incorporated by reference herein in its entirety.

TECHNICAL FIELD

Various aspects of this disclosure generally relate to compact radiohead circuits that are integrated into one or more silicon chips.

BACKGROUND

To support increases in wireless data traffic, wireless transceivers need to support wider bandwidths (BW) and higher-order modulations schemes. For example, to increase throughput, wireless transceivers may be configured to implement a Multiple Input Multiple Output (MIMO) scheme, which may require an increased amount of wireless transceivers in the platform. However, the usage of the co-located wireless transceivers may result in cross interference, power consumption limitations, thermal limitations, and other technical problems. Attempts using existing technologies to try to remedy the above problems, such as, by separating the antennas and connecting the antennas to co-located transceivers using coax cable to connect the components results in a substantial increase in costs and degradation in wireless performance. Further the use of coax cables does not easily support many form factors.

Another consideration is that using an increasing number of co-located transceivers is not easily scalable in many cases, and does not allow for modular certification. Many applications or implementations require a complete device or platform certification, e.g., a complete certification from a known bus interface all the way to an antenna connector. However, in increasing the number of transceivers and associated components, the cost per unit of certifying a platform becomes prohibitive.

BRIEF DESCRIPTION OF THE EXEMPLARY DRAWINGS

Figure 2:
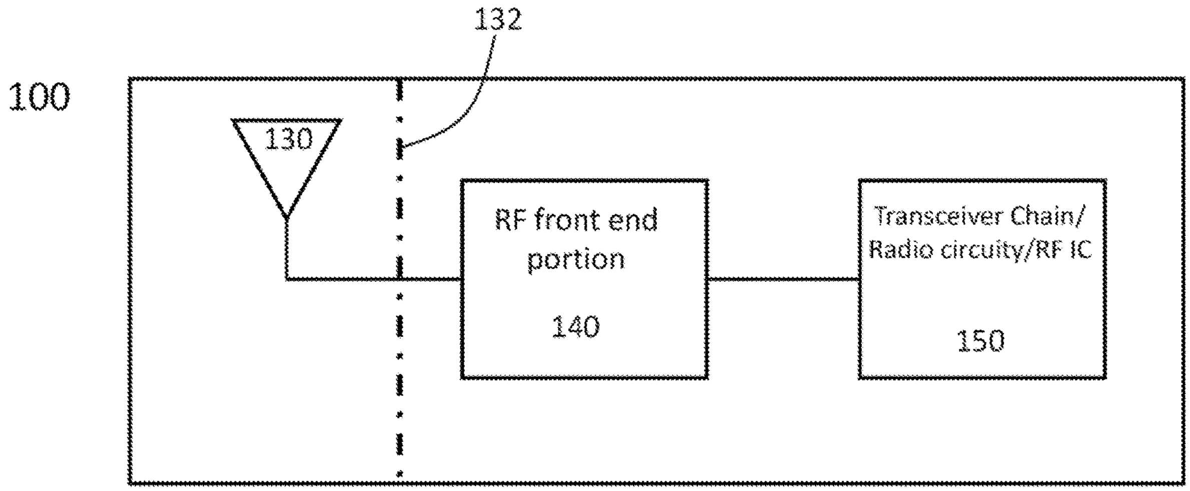
Figure 3:
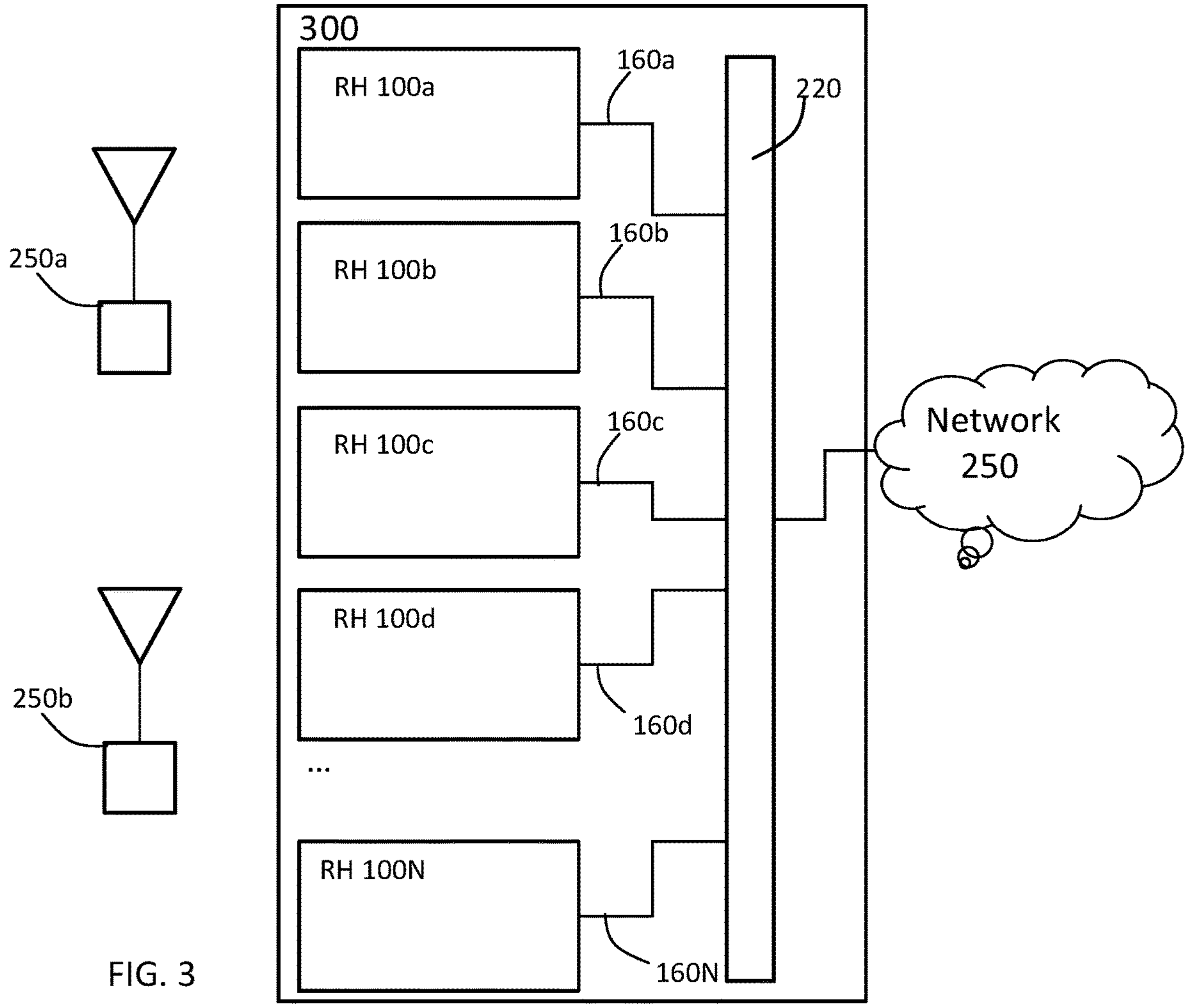
Figure 4:
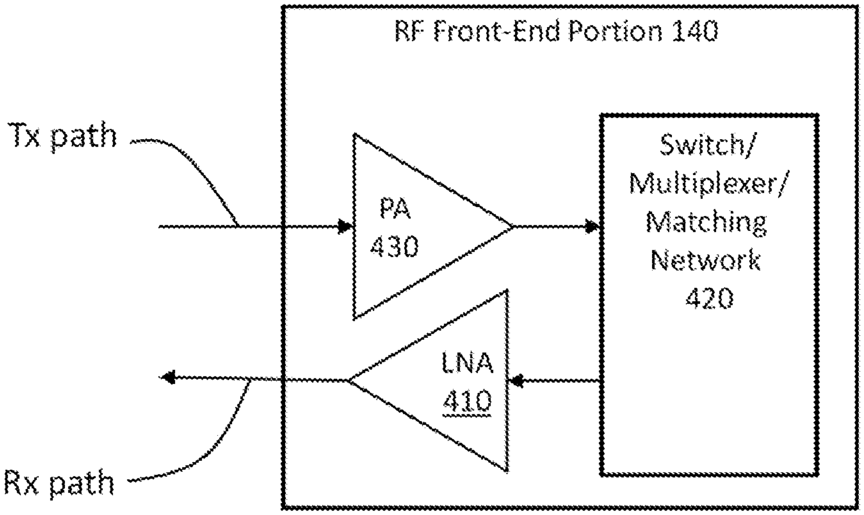
Figure 5:
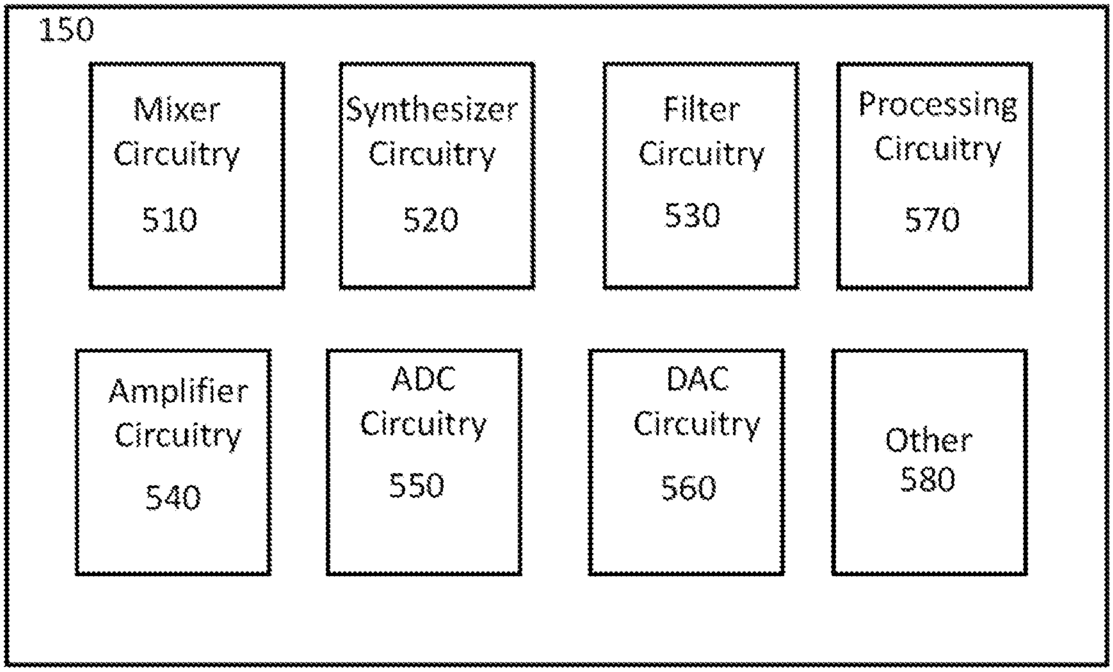
Figure 6:
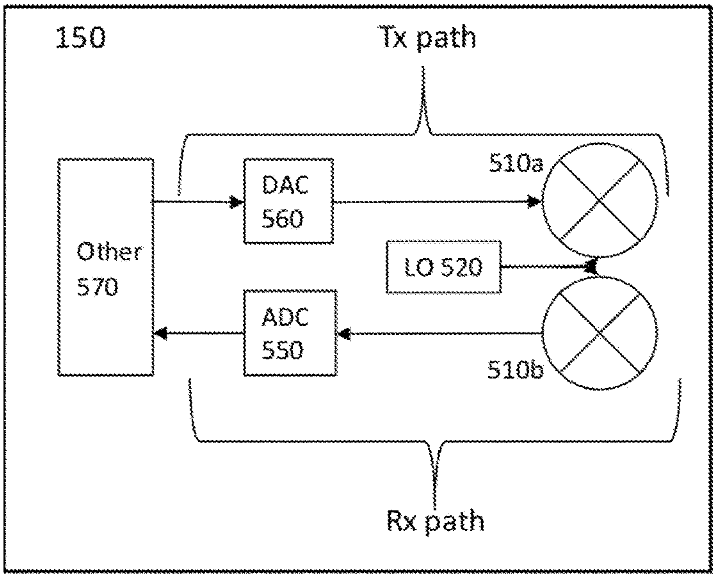
Figure 7:
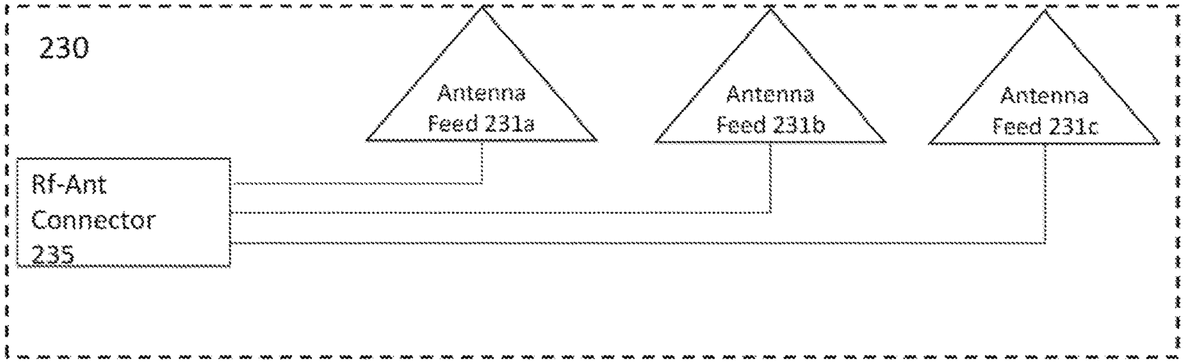
Figure 8:
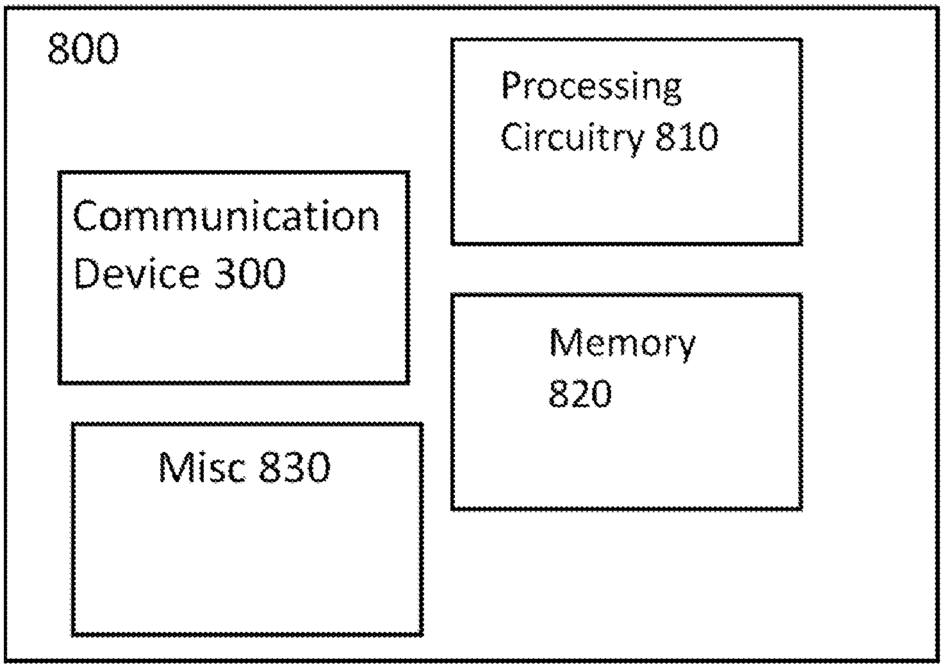
Figure 9A:
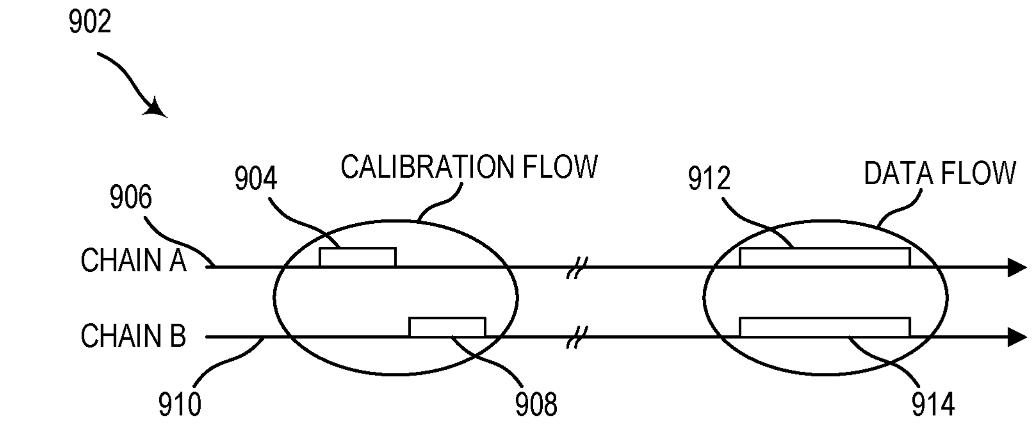
Figure 9B:
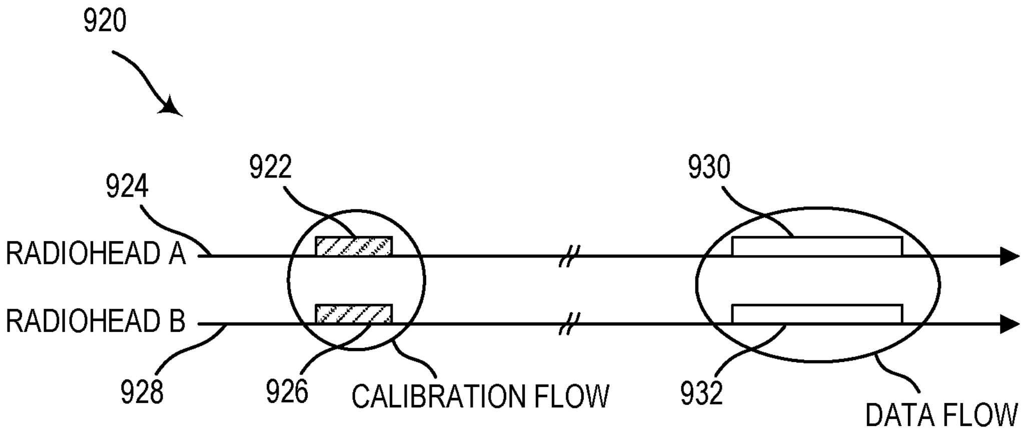
Figure 10A:
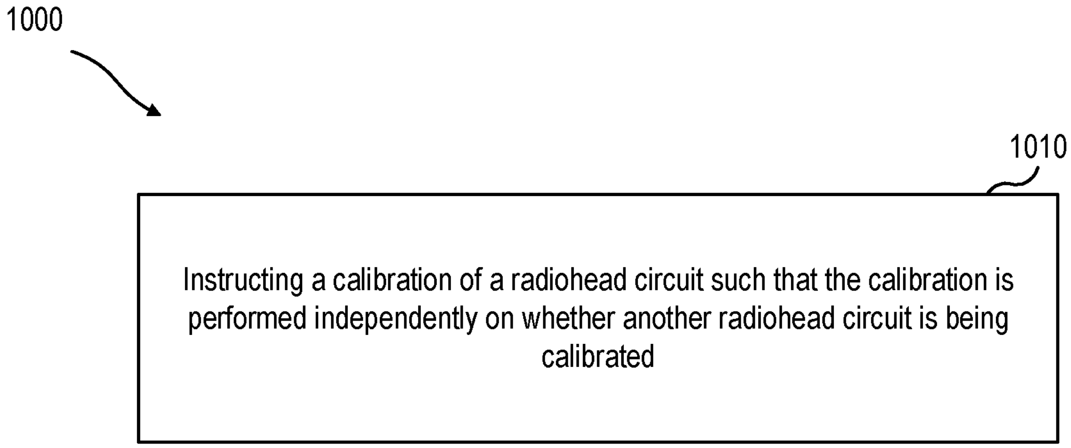
Figure 10B:
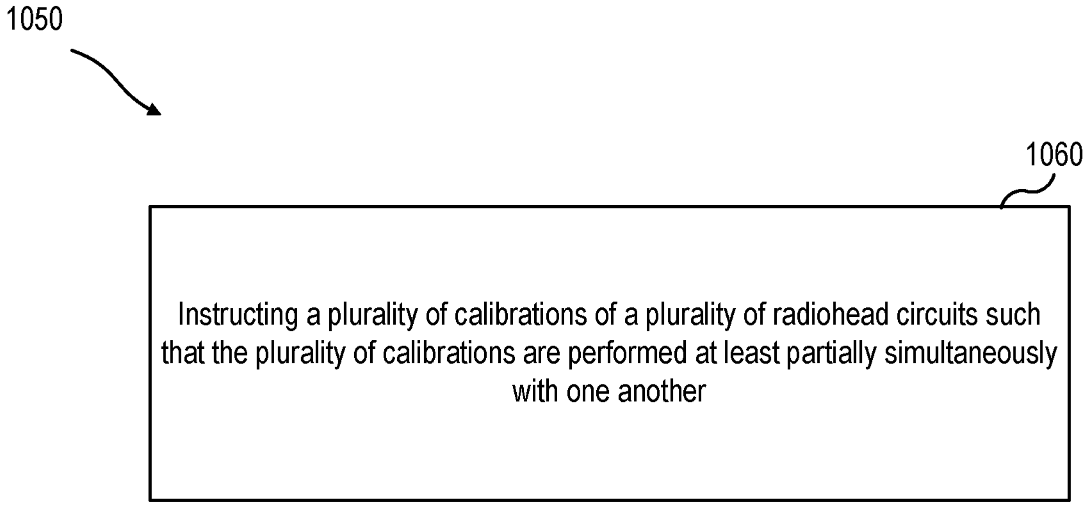
Figure 11A:
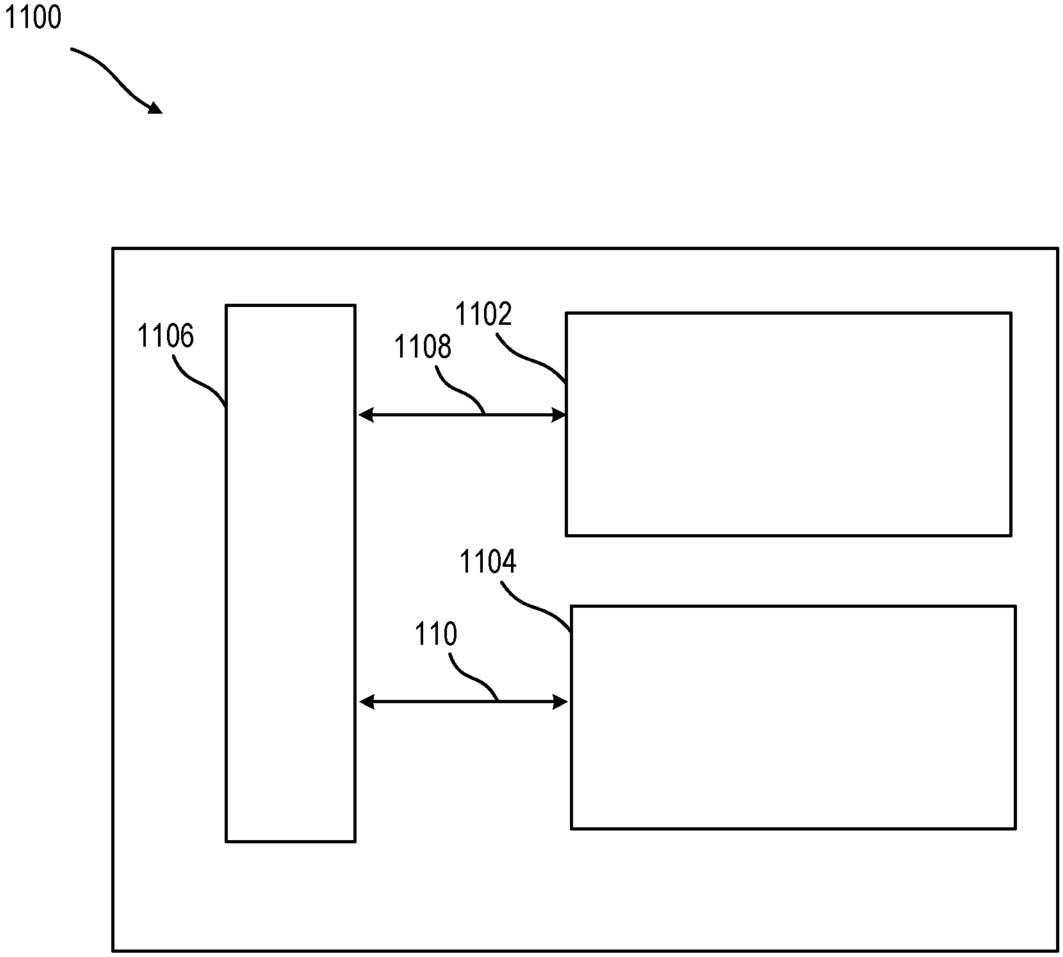
Figure 11B:
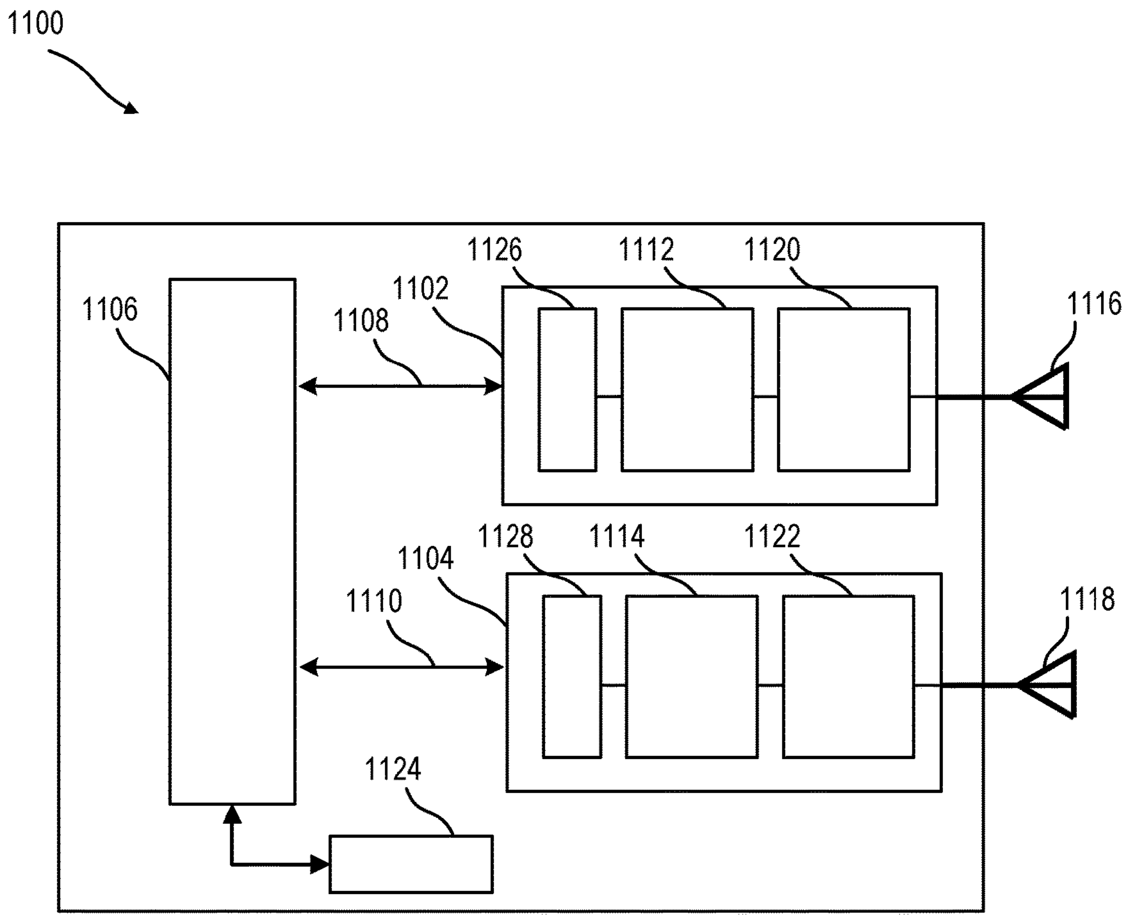
Figure 12:
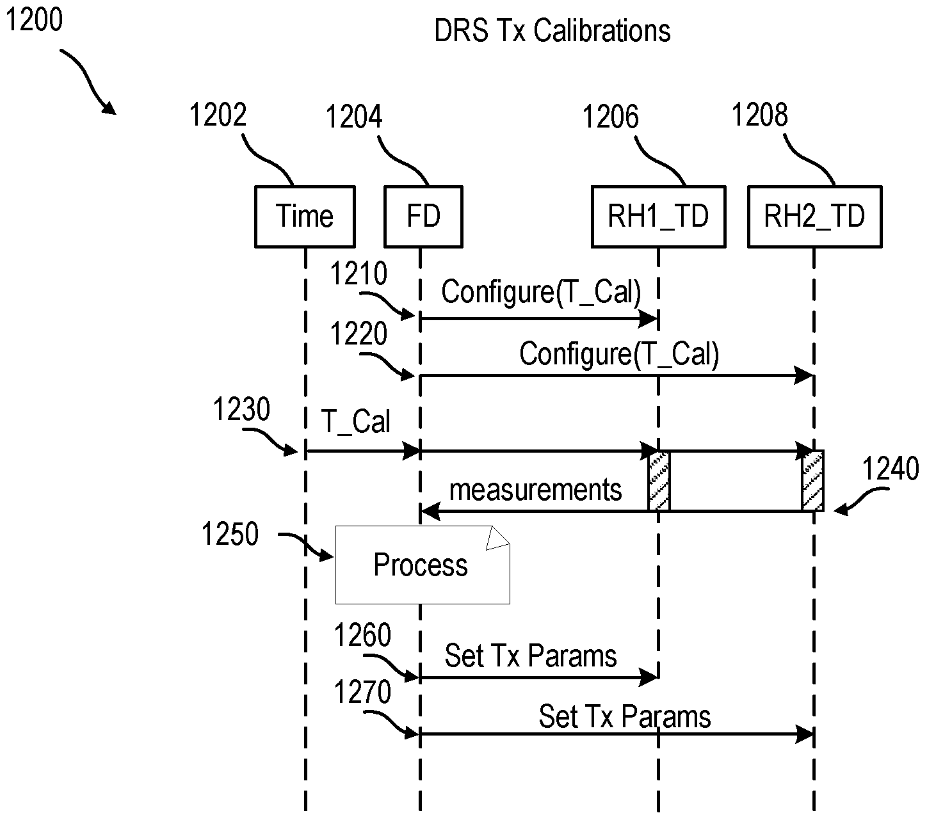
Figure 13A:
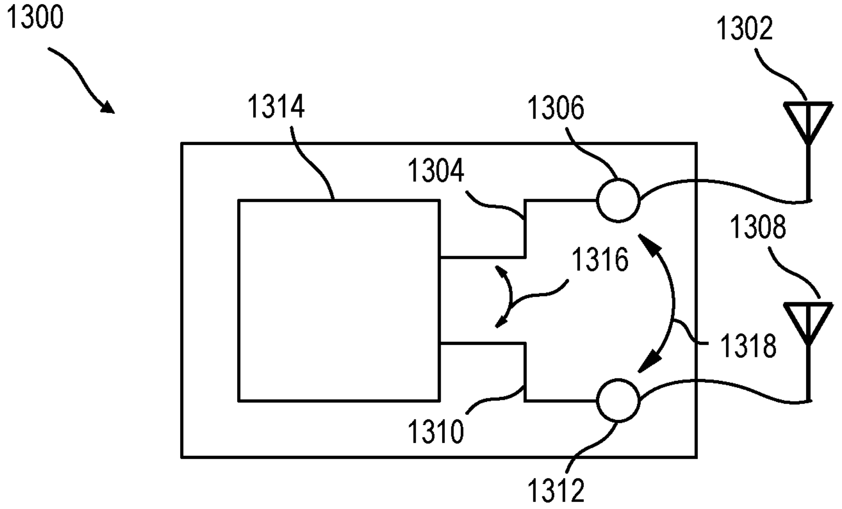
Figure 13B:
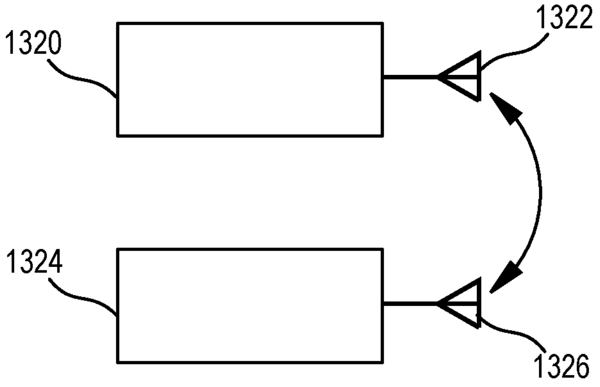
Figure 14:
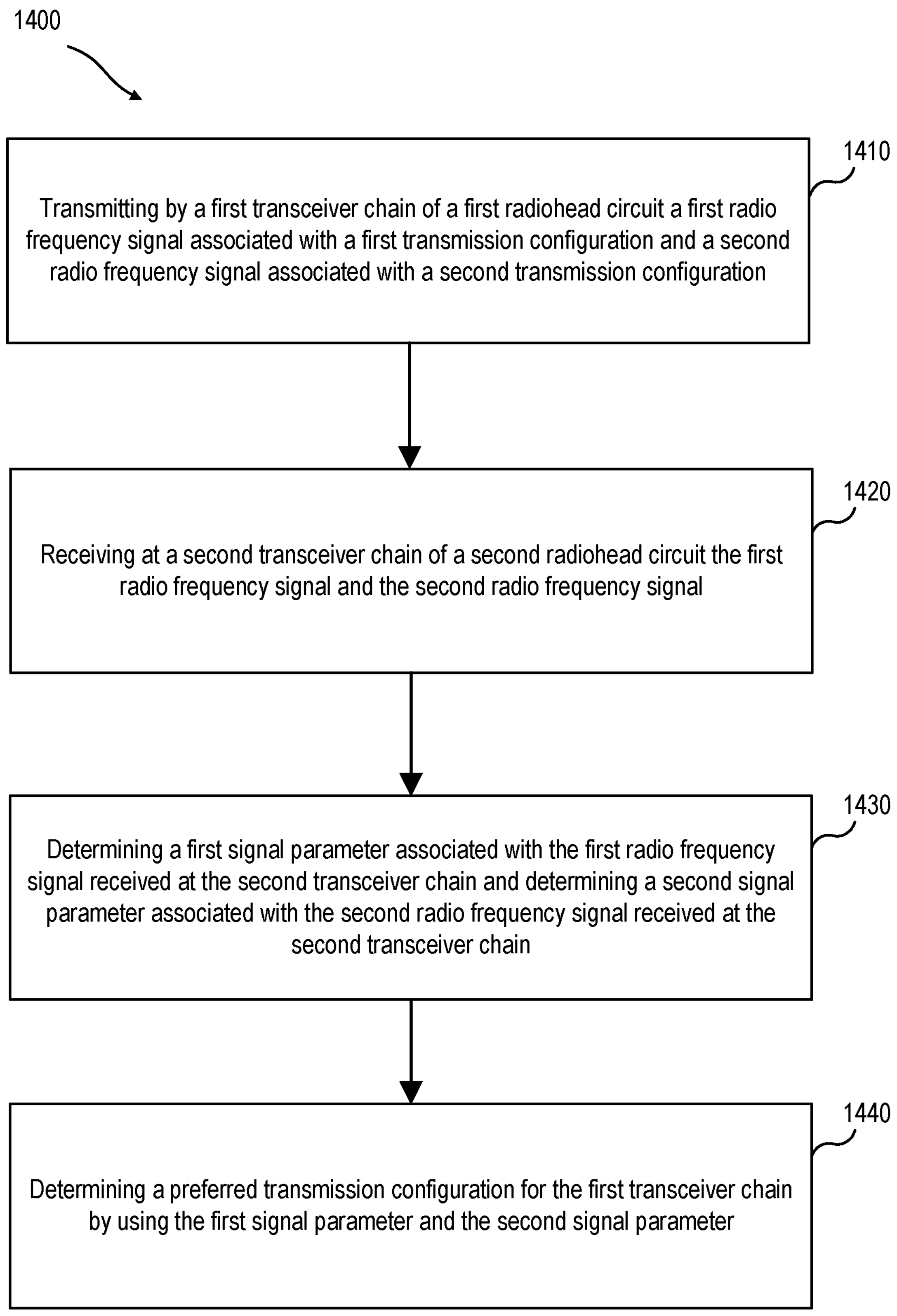
Figure 15A:
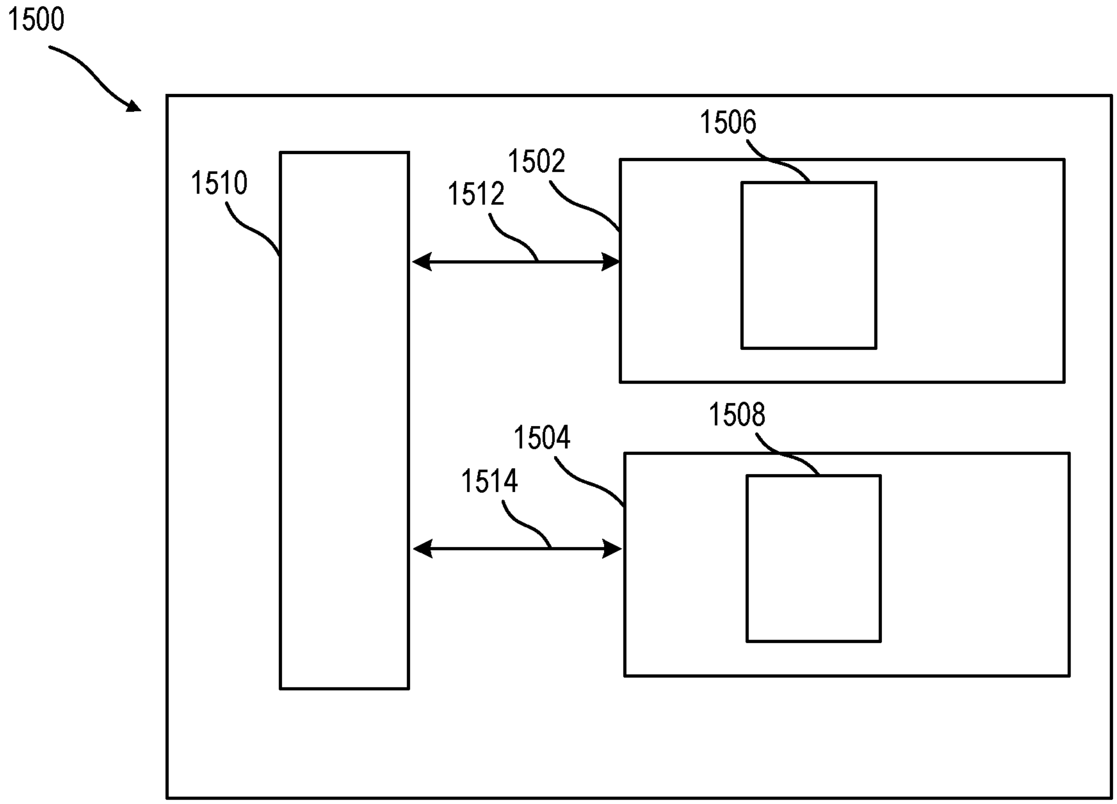
Figure 15B:
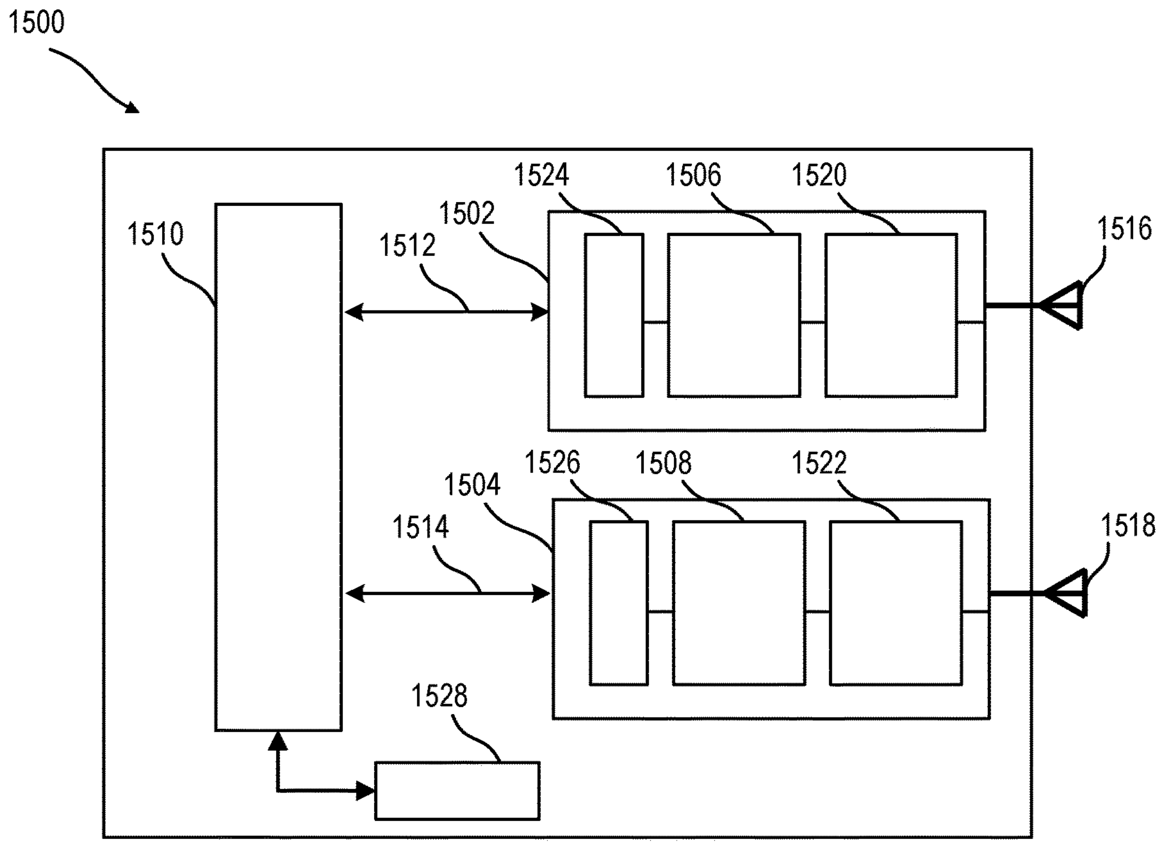
Figure 16A:
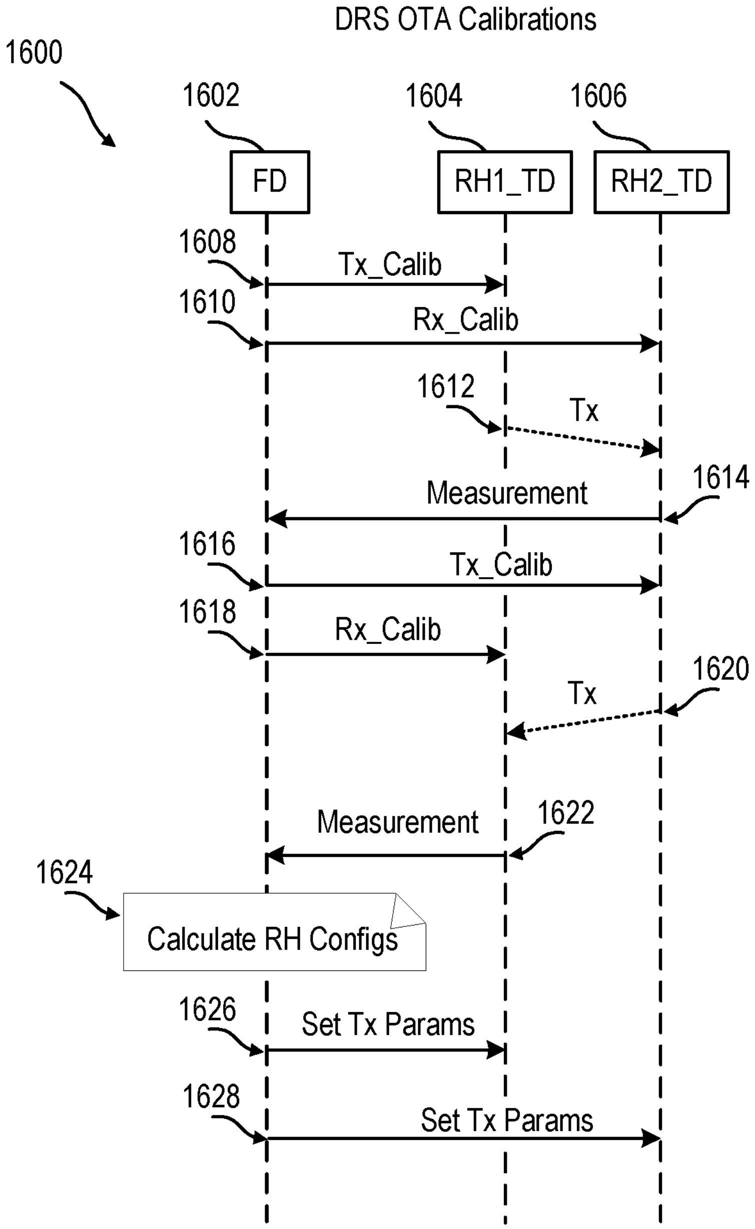
Figure 16B:
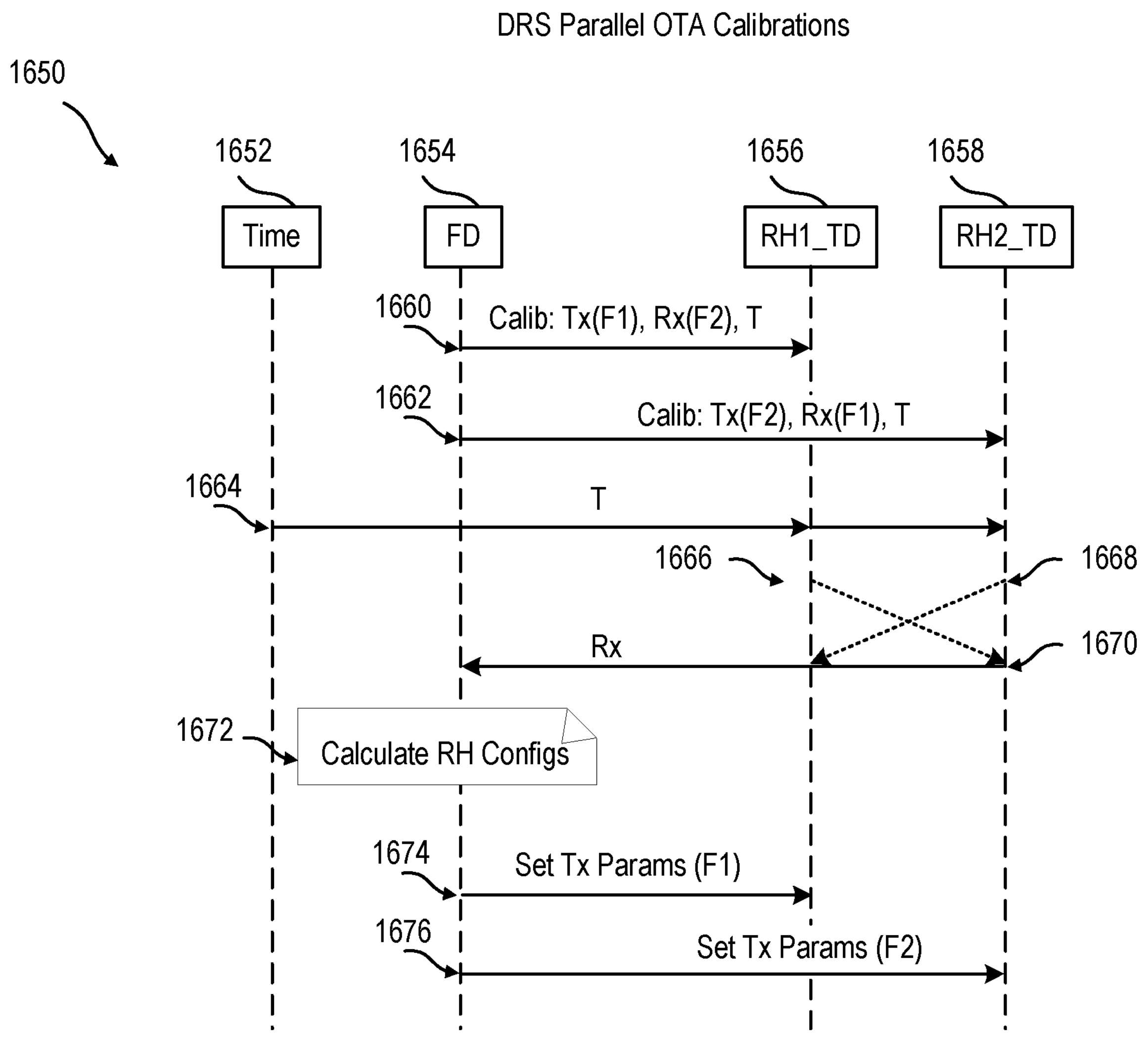
Figure 17:
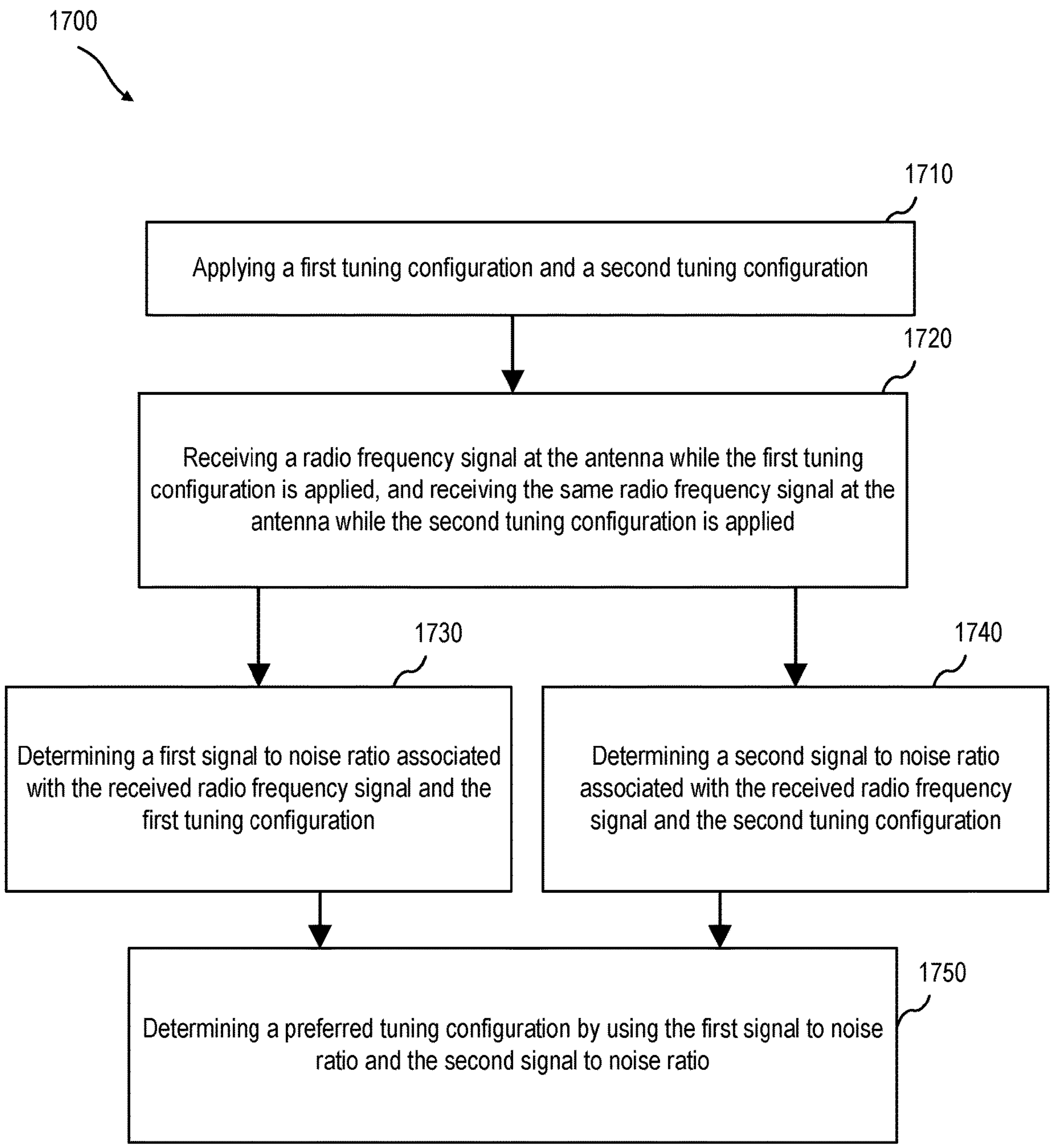
Figure 18:
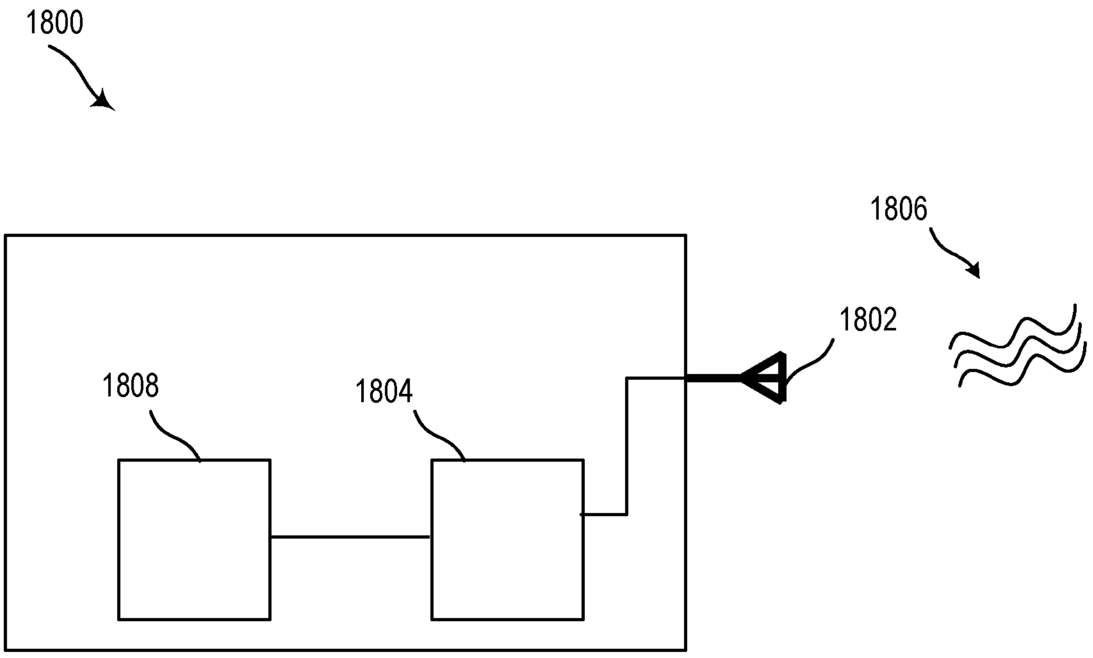
Figure 19A:
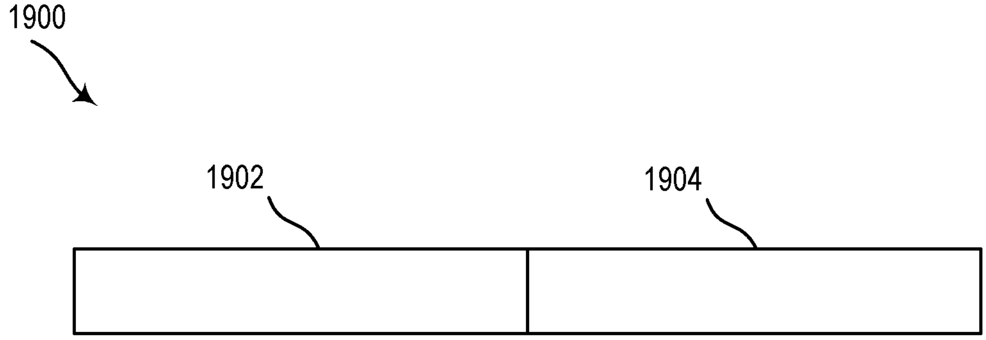
Figure 19B:
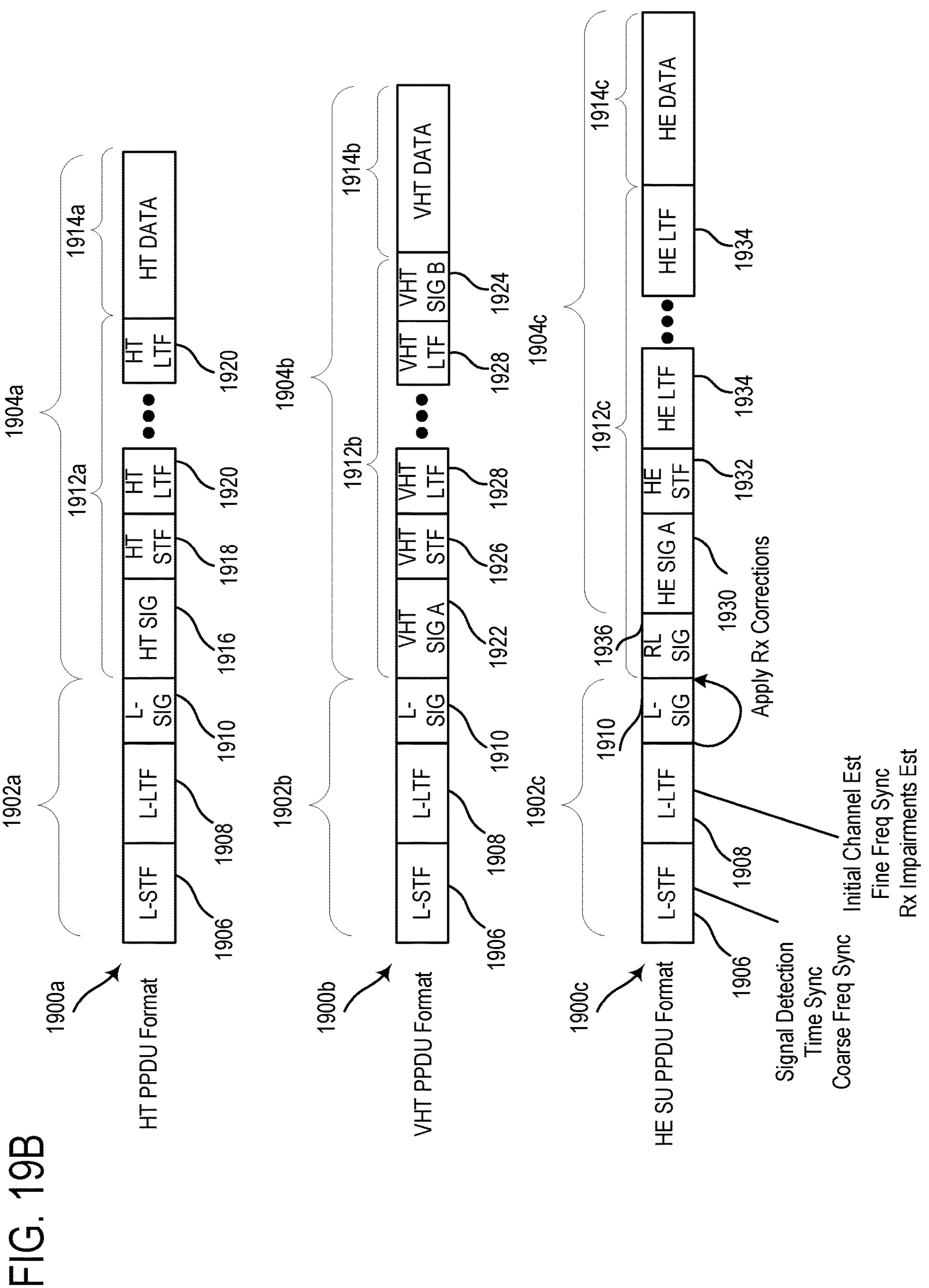
Figure 20:
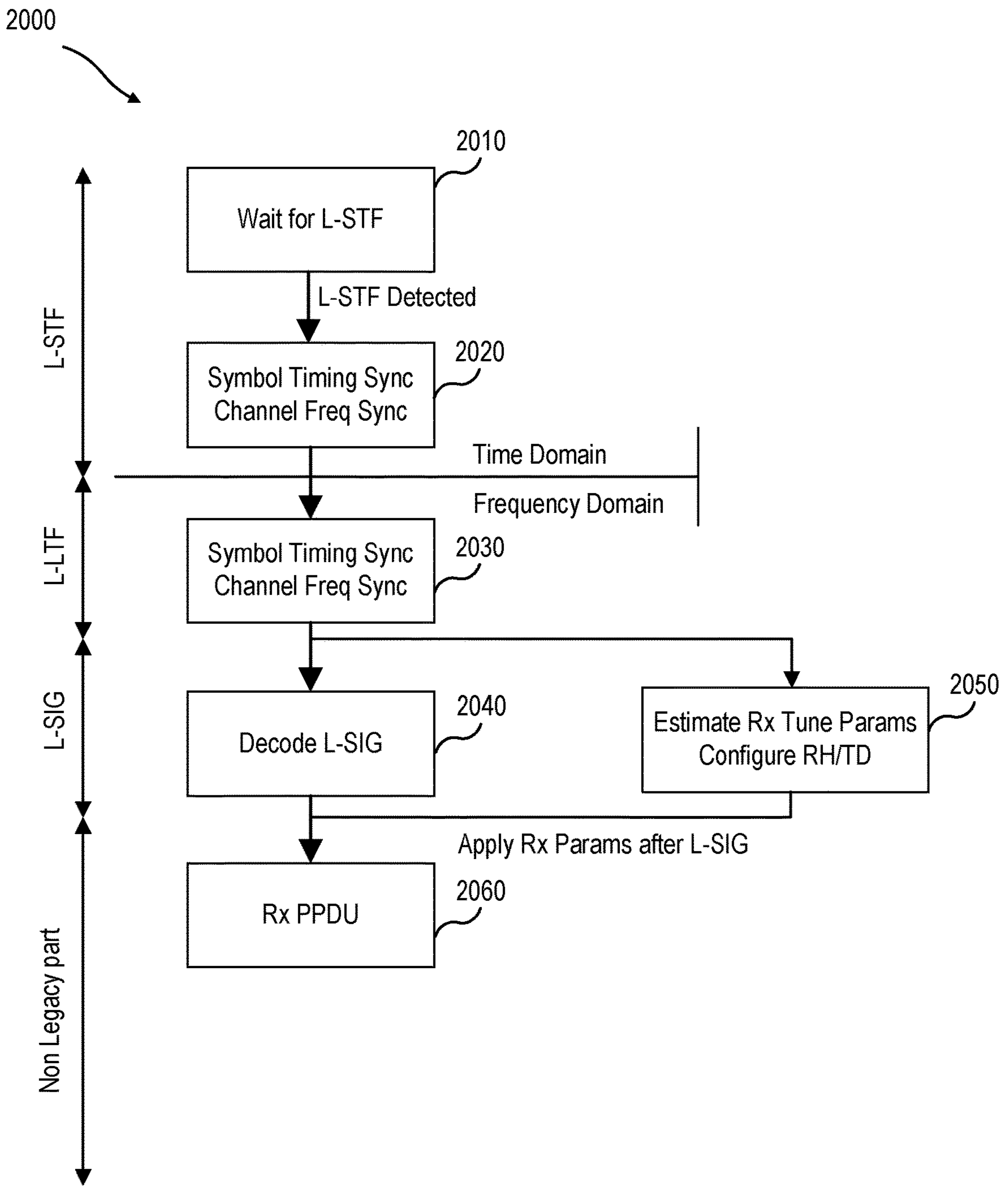
Figure 21A:
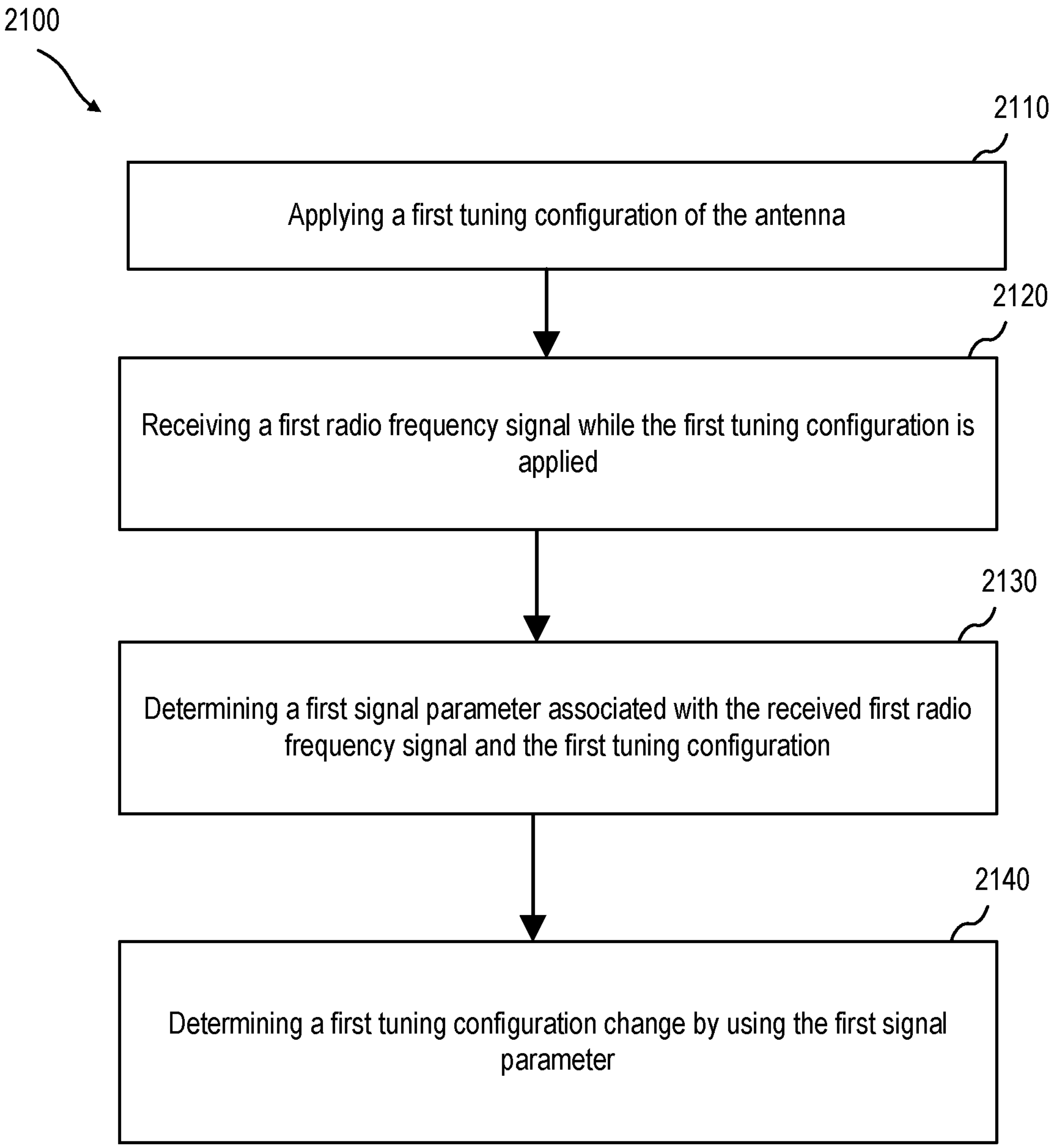
Figure 21B:
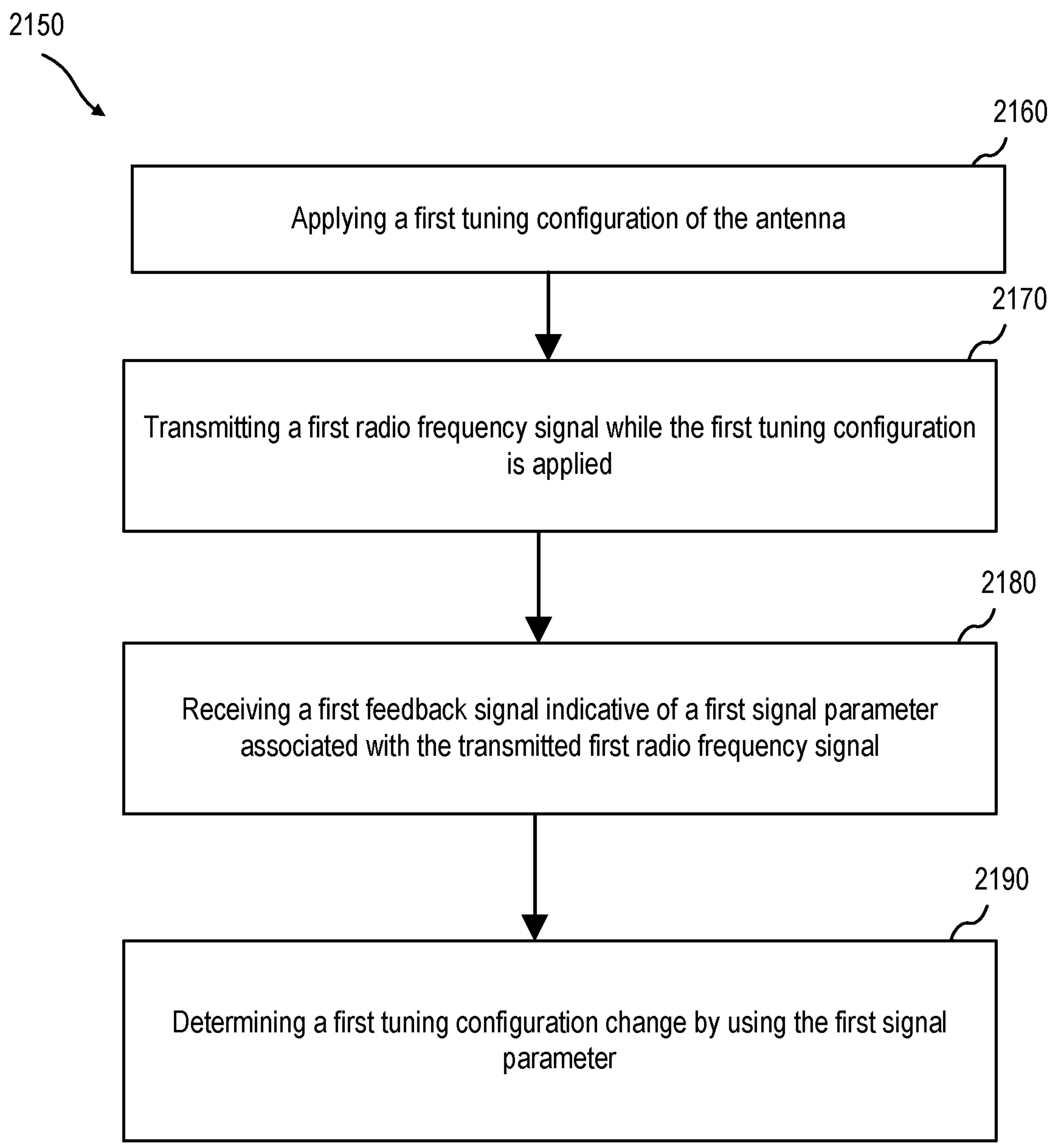
Figure 22:
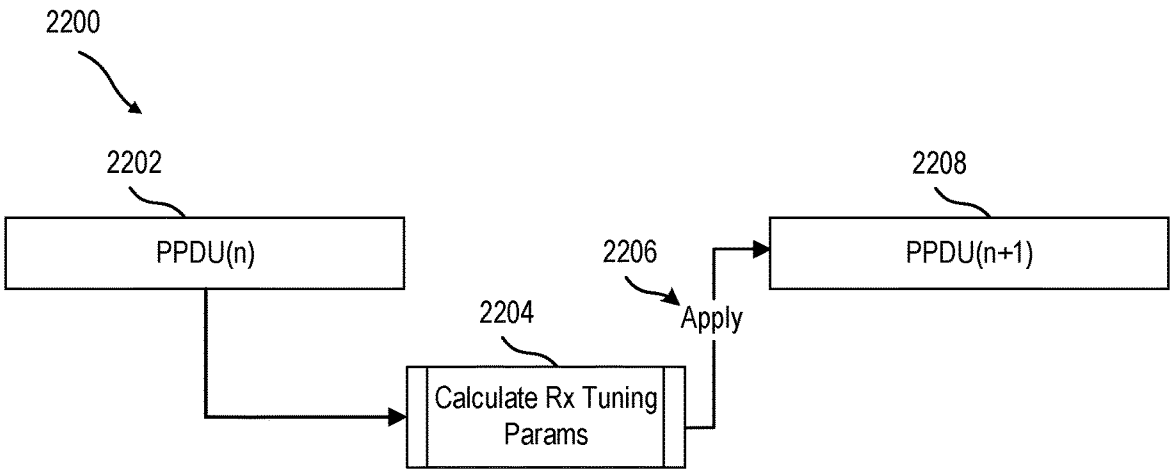
Figure 23:
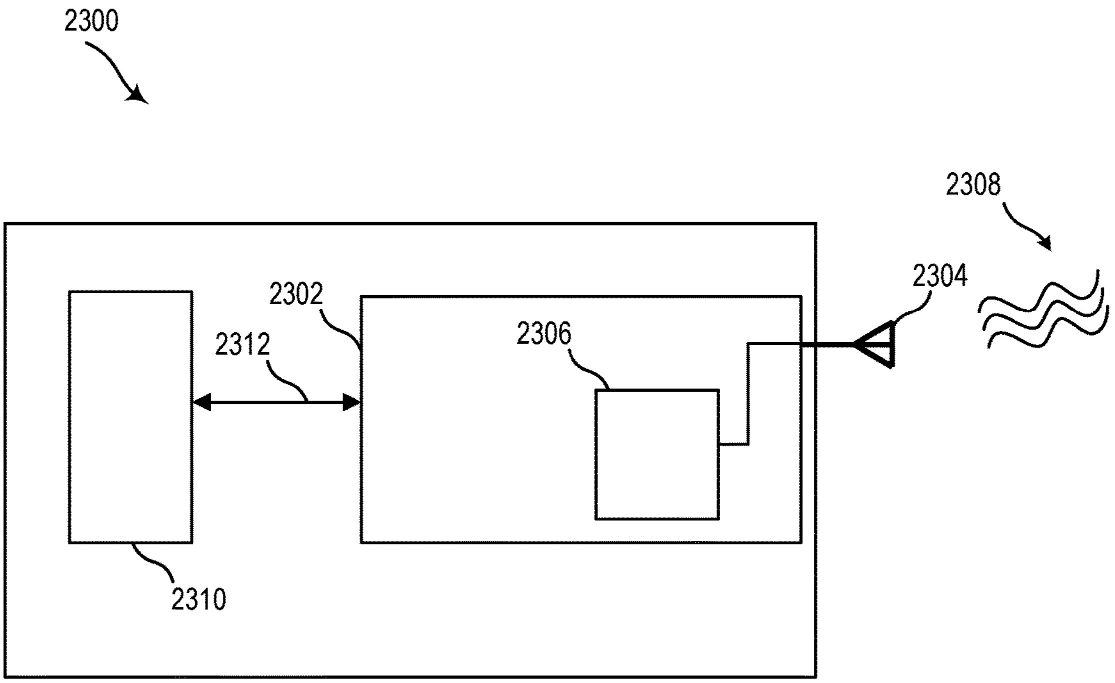
Figure 24:
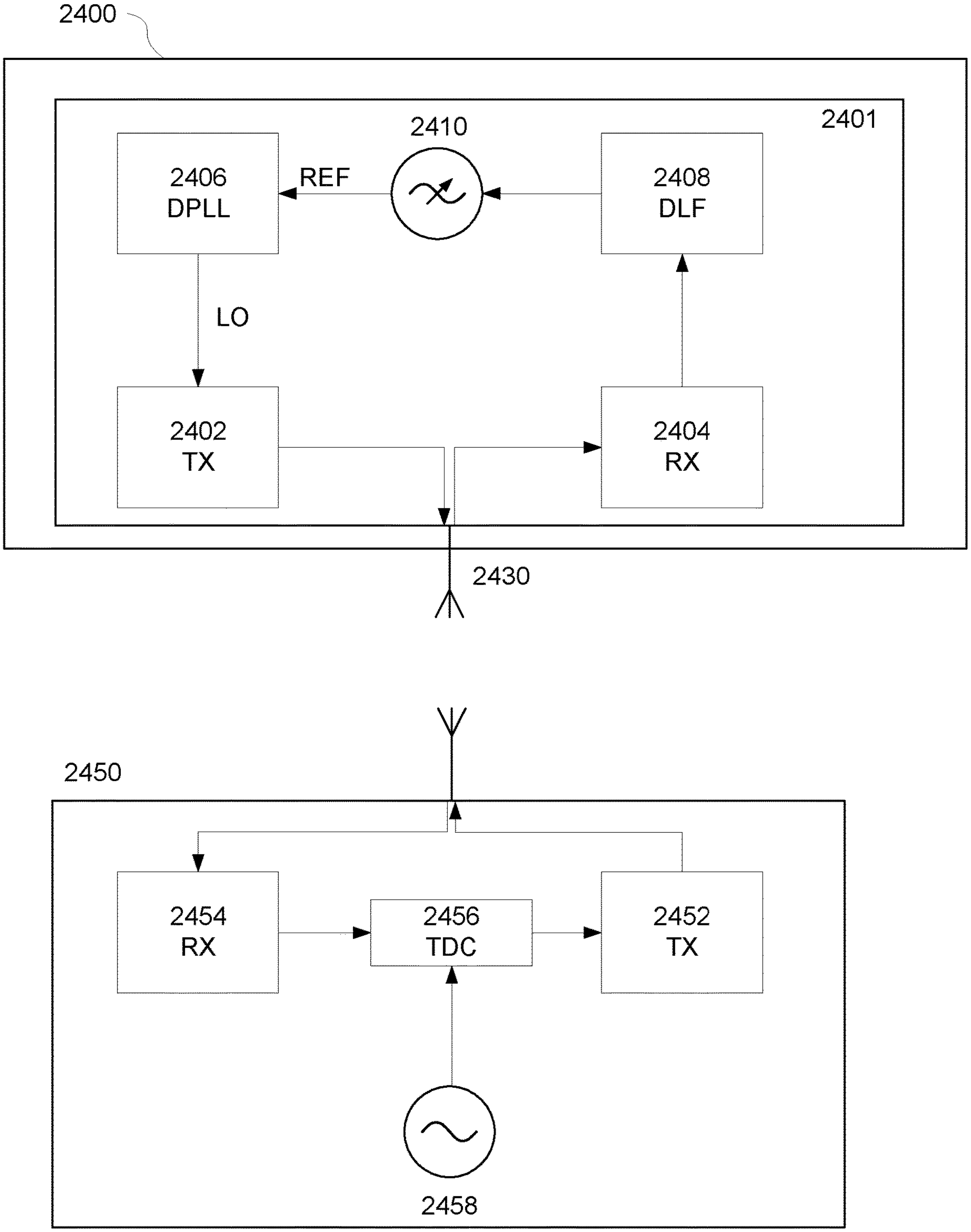
Figure 25:
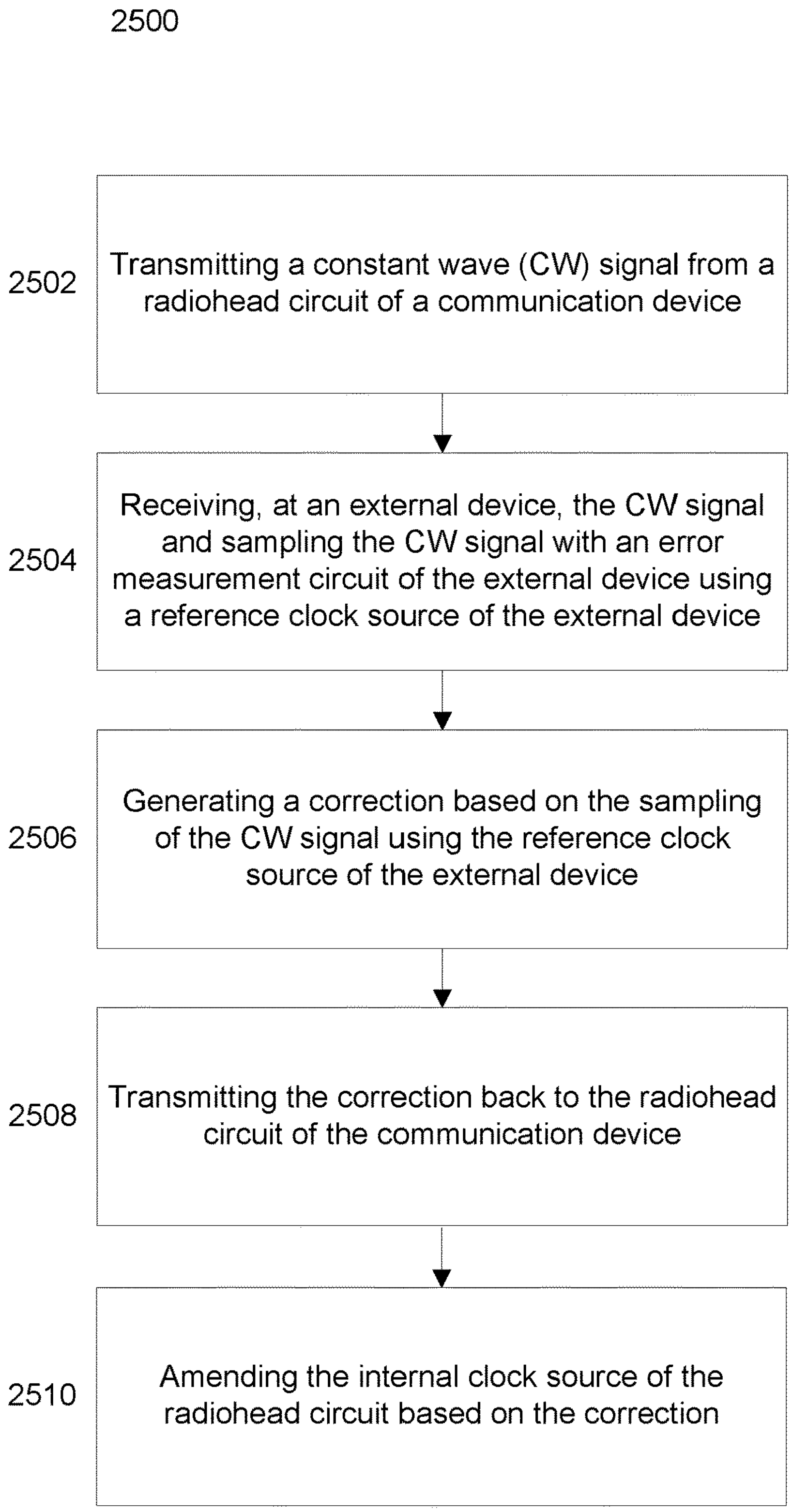
Figure 26:
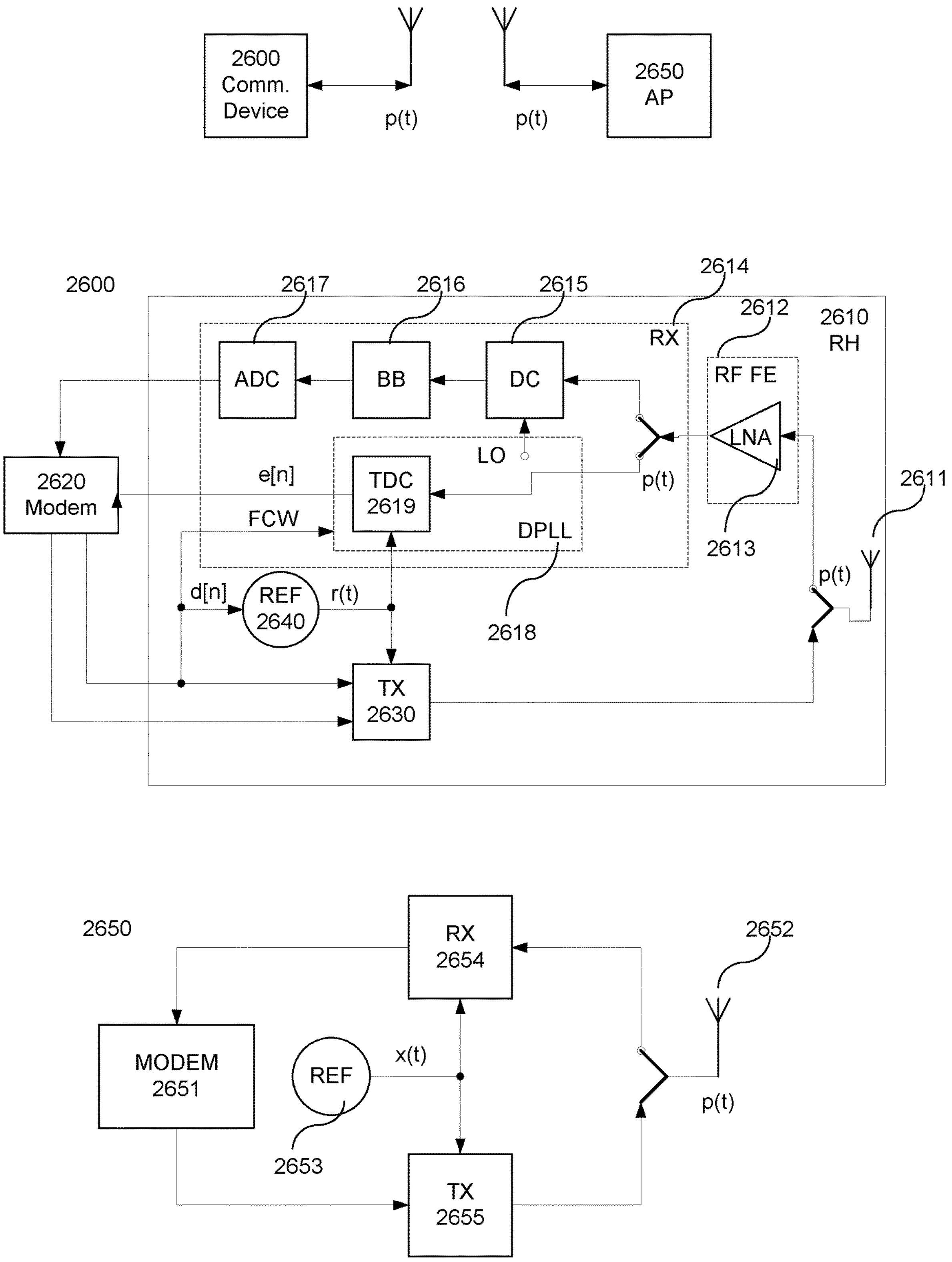
Figure 27:
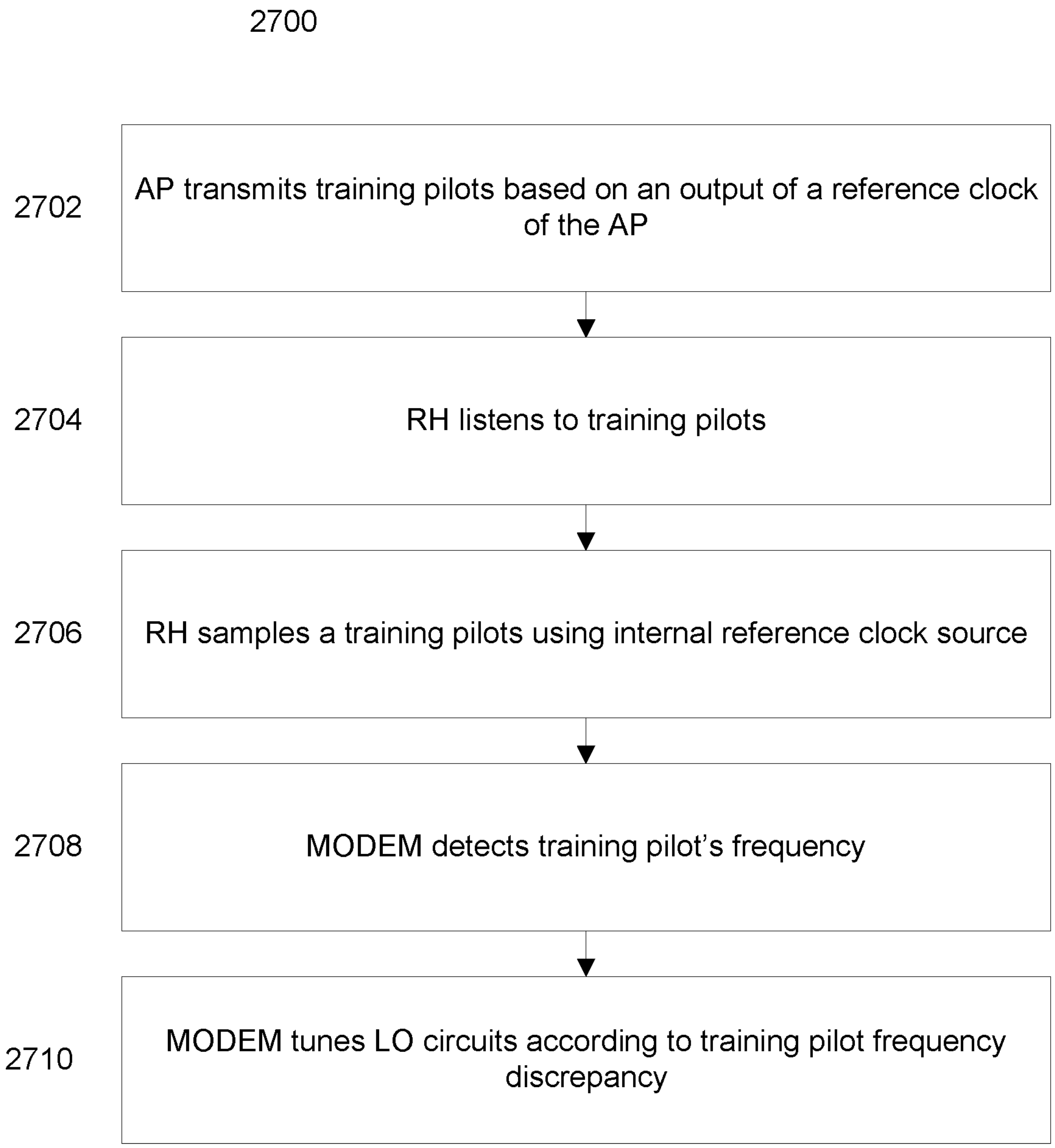
Figure 28:
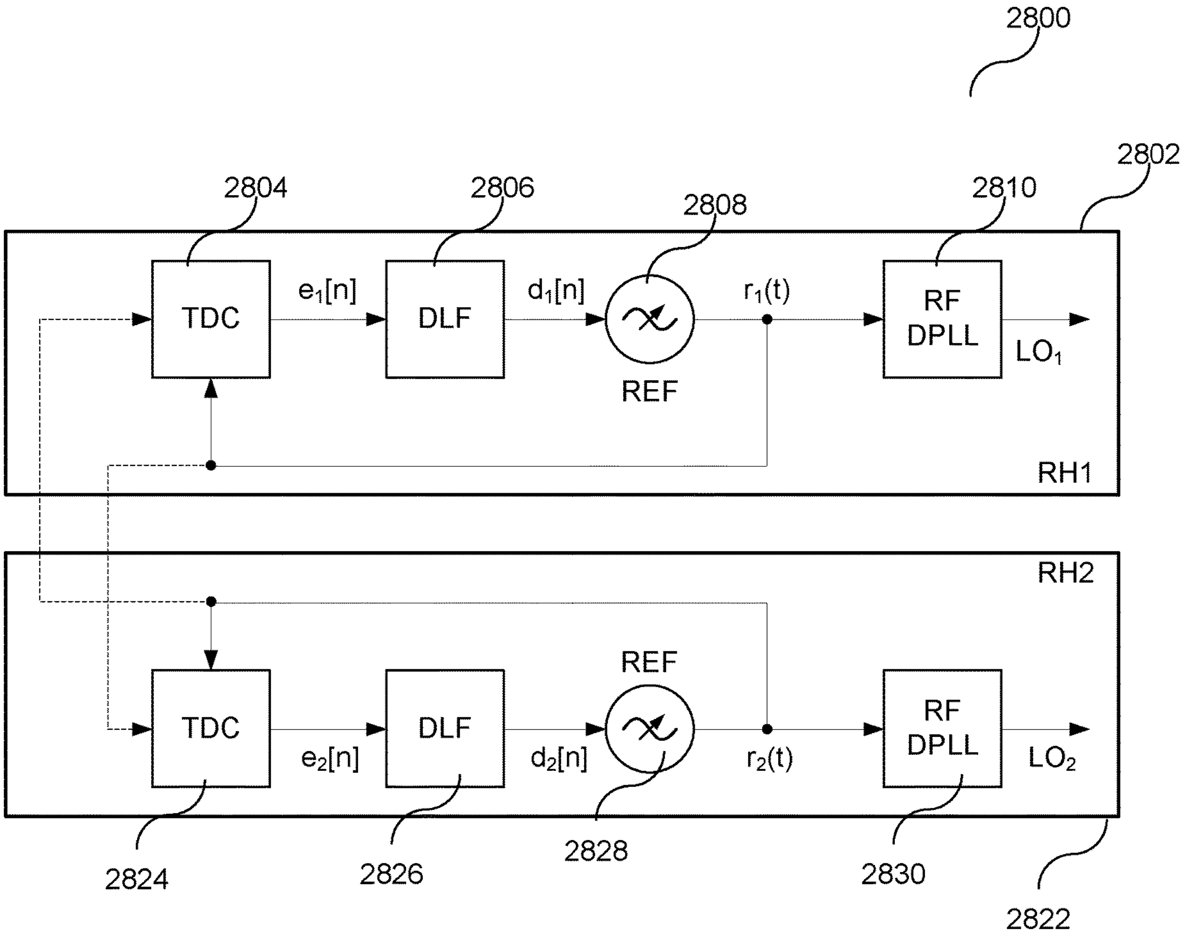
Figure 29:
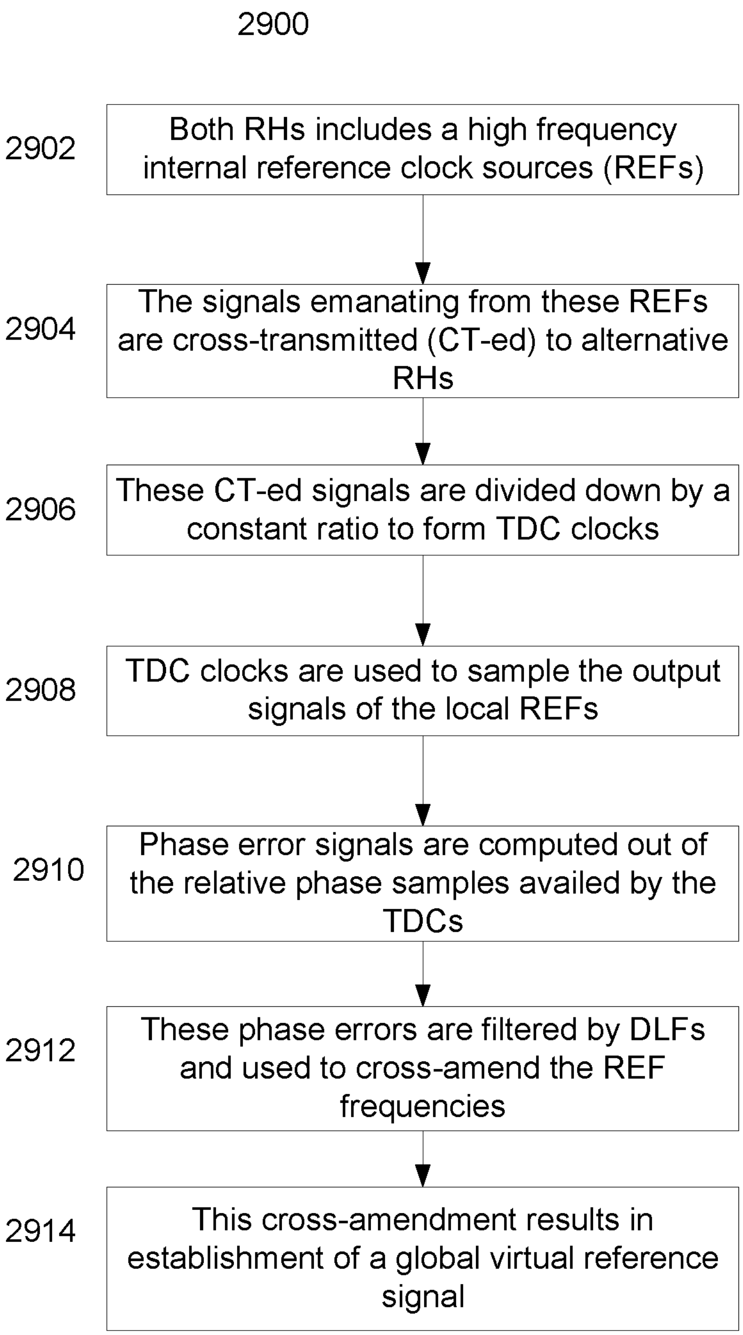
Figure 30:
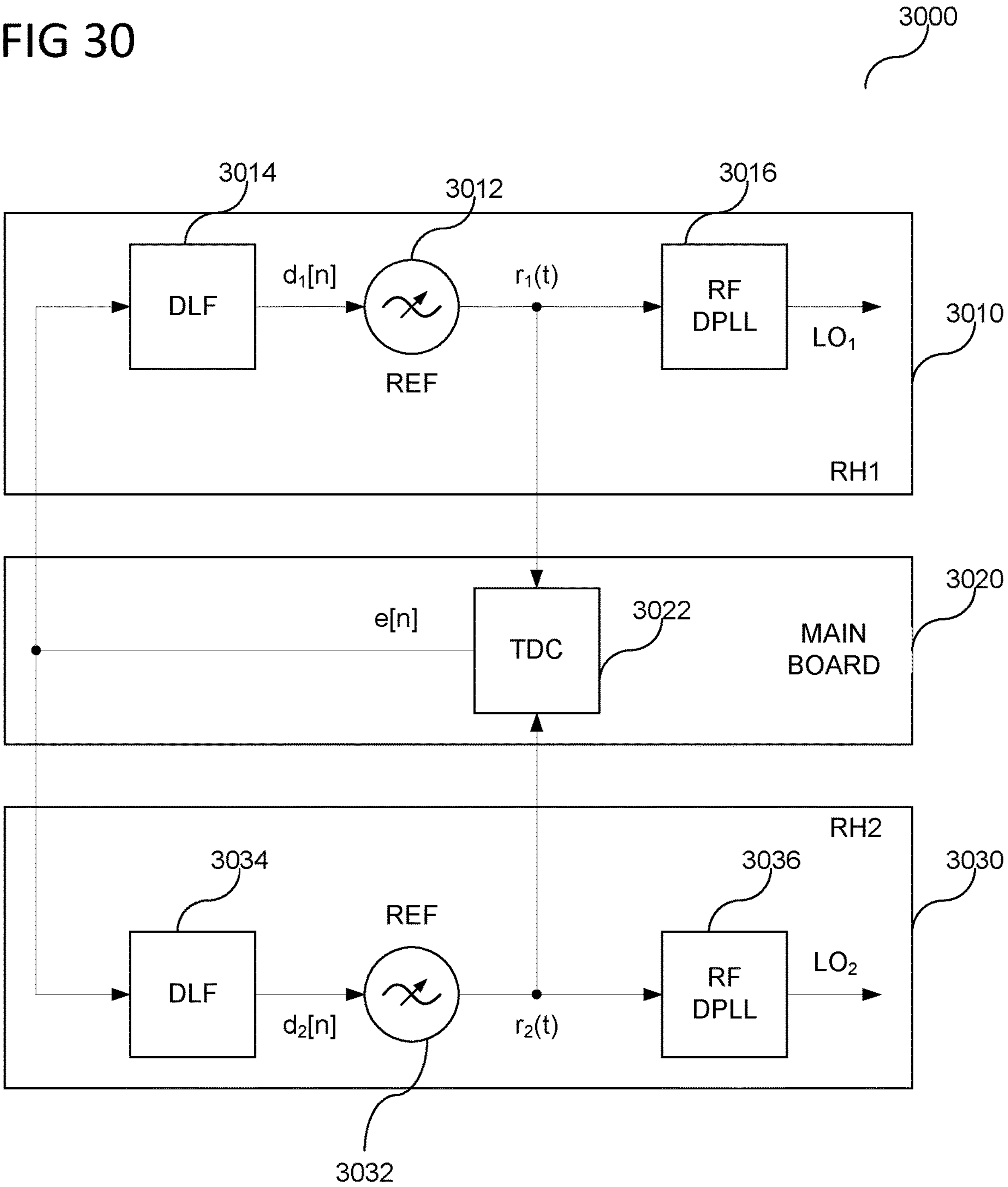
Figure 31:
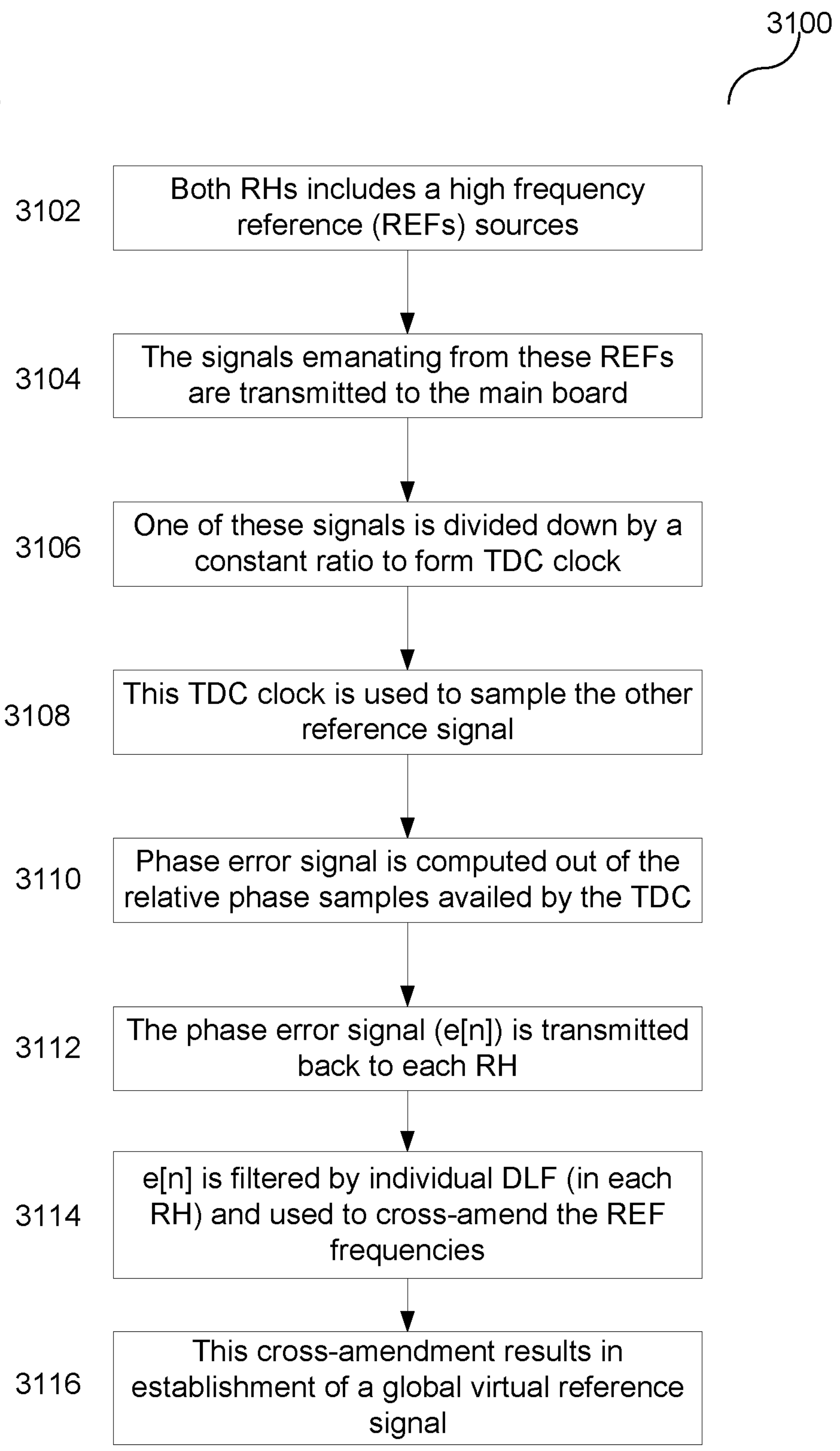
Figure 32:
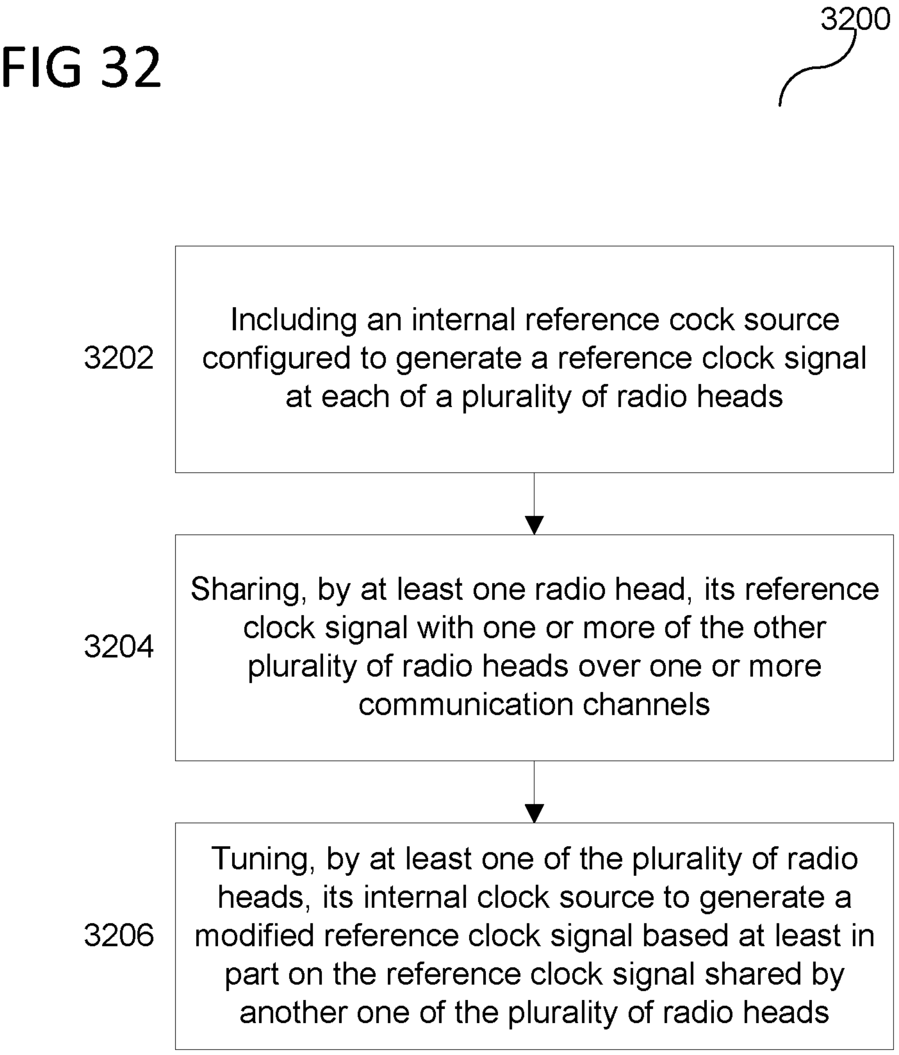
Figure 33:
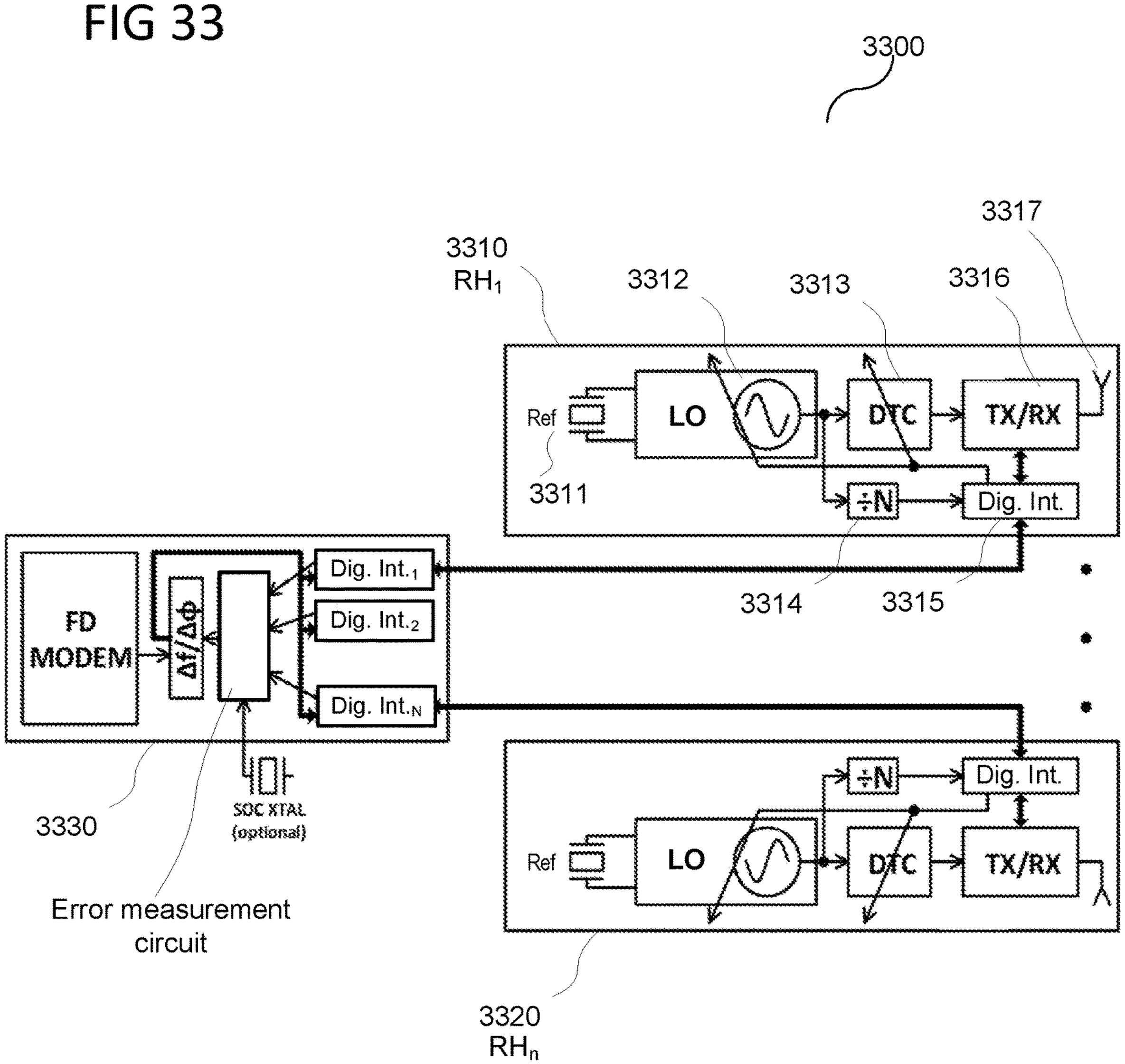
Figure 34:
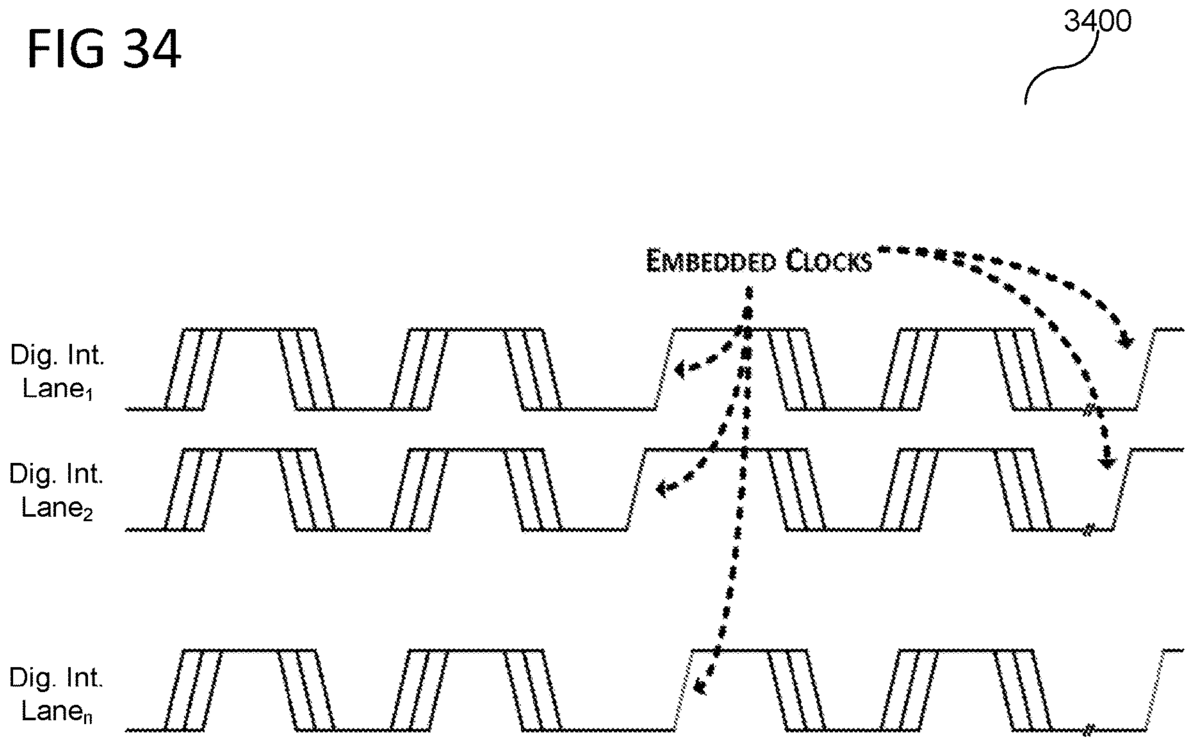
Figure 35:
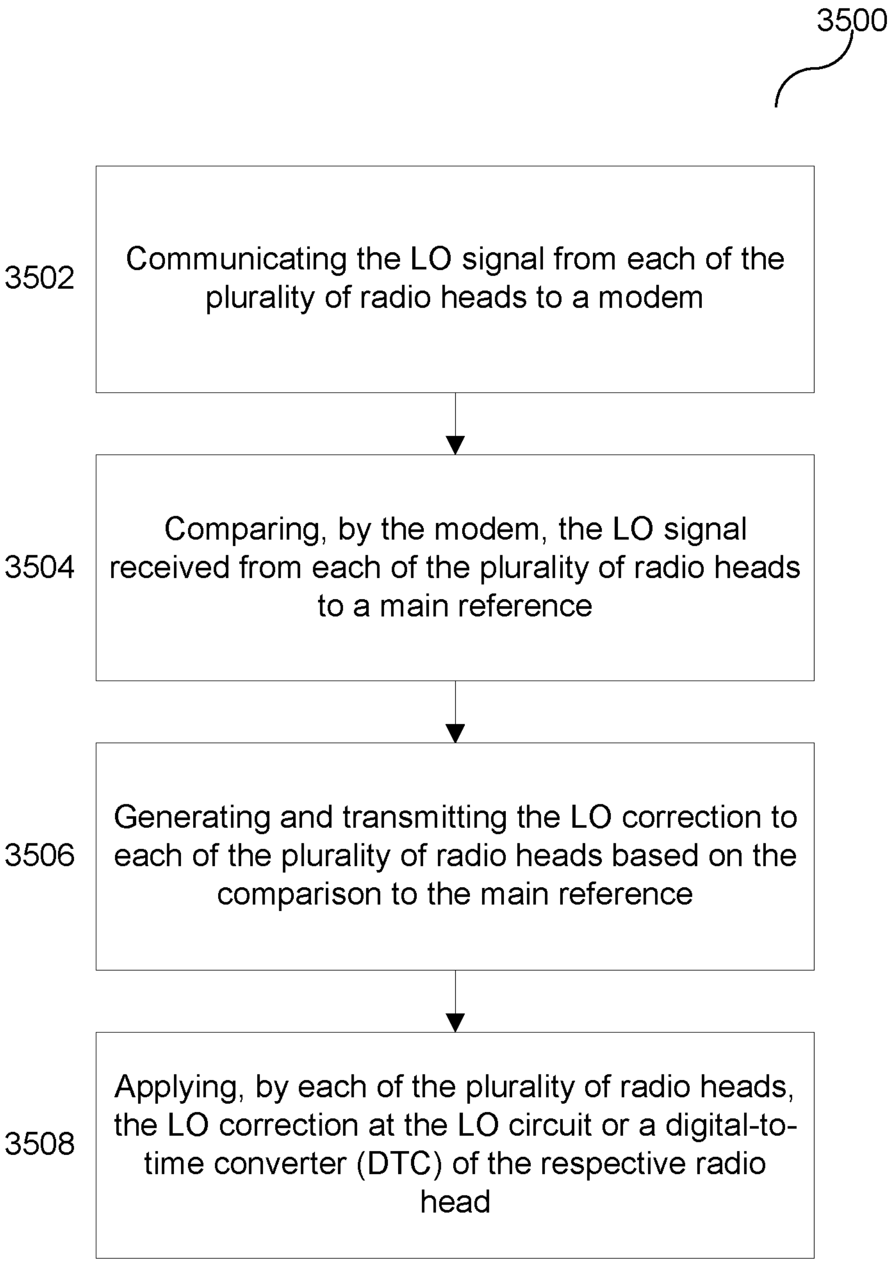
Figure 36:
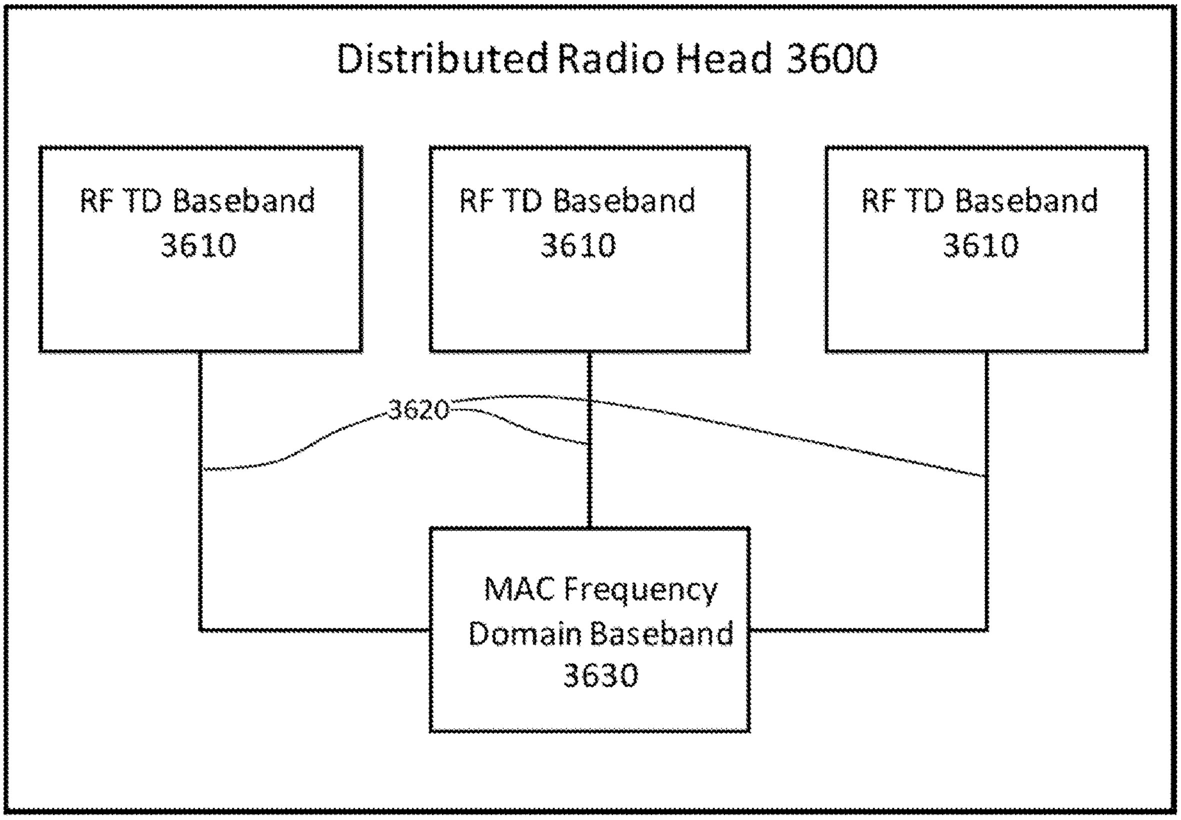

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which:

FIG. 1 exemplarily shows a block diagram of a wireless communication device including a conventional radiohead system;

FIG. 2 exemplarily shows a radiohead circuit in accordance with various aspects of this disclosure;

FIG. 3 exemplarily shows a distributed radio system in accordance with various aspects of this disclosure;

FIG. 4 exemplarily shows a RF front end portion in accordance with various aspects of this disclosure;

FIGS. 5 and 6 exemplarily show a transceiver chain in accordance with various aspects of this disclosure;

FIG. 7 exemplarily shows an antenna structure in accordance with various aspects of this disclosure;

FIG. 8 exemplarily shows a device in accordance with various aspects of this disclosure;

FIG. 9A exemplarily shows a schematic time diagram associated with a calibration in a communication device in accordance with various aspects of this disclosure;

FIG. 9B exemplarily shows a schematic time diagram associated with a calibration in a communication device in accordance with various aspects of this disclosure;

FIGS. 10A and 10B each exemplarily show a schematic flow diagram of a calibration method in accordance with various aspects of this disclosure;

FIGS. 11A and 11B each exemplarily show a communication device in a schematic view in accordance with various aspects of this disclosure;

FIG. 12 exemplarily shows a schematic signaling diagram associated with a calibration in accordance with various aspects of this disclosure;

FIG. 13A and FIG. 13B each exemplarily show a communication device in accordance with various aspects of this disclosure;

FIG. 14 exemplarily shows a schematic flow diagram of a method for determining a preferred transmission configuration in accordance with various aspects of this disclosure;

FIG. 15A and FIG. 15B each exemplarily show a communication device in a schematic view in accordance with various aspects of this disclosure;

FIG. 16A and FIG. 16B each exemplarily show a schematic signaling diagram associated with determining a preferred transmission configuration in accordance with various aspects of this disclosure;

FIG. 17 exemplarily shows a schematic flow diagram of a method of tuning an antenna of a radiohead circuit in accordance with various aspects of this disclosure;

FIG. 18 exemplarily shows a radiohead circuit in a schematic view in accordance with various aspects of this disclosure;

FIGS. 19A and 19B exemplarily show a structure of a radio frequency signal in accordance with various aspects of this disclosure;

FIG. 20 exemplarily shows a schematic flow diagram of a method of tuning an antenna of a radiohead circuit in accordance with various aspects of this disclosure;

FIG. 21A and FIG. 21B each exemplarily show a schematic flow diagram of a method of tuning an antenna of a radiohead circuit in accordance with various aspects of this disclosure;

FIG. 22 exemplarily shows a method of tuning an antenna of a radiohead circuit in a schematic view in accordance with various aspects of this disclosure;

FIG. 23 exemplarily shows a communication device in a schematic view in accordance with various aspects of this disclosure;

FIG. 24 exemplarily shows a diagram of a communication device and an external device for implementing a wireless reference synchronization scheme in accordance with various aspects of this disclosure;

FIG. 25 exemplarily show a process flowchart for a communication device with a plurality of radiohead circuits to synchronize the radiohead circuits using an external device in accordance with various aspects of this disclosure;

FIG. 26 exemplarily shows a series of diagrams of a communication device and an external device for implementing wireless reference synchronization schemes in accordance with various aspects of this disclosure;

FIG. 27 exemplarily shows a process flowchart for a communication device with a plurality of radiohead circuits to synchronize the radiohead circuits using an external device in accordance with various aspects of this disclosure;

FIG. 28 exemplarily shows a diagram for two radiohead circuits configured to align the phases of their respective internal reference clock sources in accordance with various aspects of this disclosure;

FIG. 29 exemplarily shows a process flowchart for a communication device with a plurality of radiohead circuits to generate a global virtual reference signal for the plurality of radiohead circuits in accordance with various aspects of this disclosure;

FIG. 30 exemplarily shows a diagram for two radiohead circuits configured to align the phases of their respective internal reference clock sources in accordance with various aspects of this disclosure;

FIG. 31 exemplarily shows a process flowchart for a communication device with a plurality of radiohead circuits to generate a global virtual reference signal for the plurality of radiohead circuits in accordance with various aspects of this disclosure;

FIG. 32 exemplarily shows a process flowchart for a communication device with a plurality of radiohead circuits to generate a global virtual reference signal for the plurality of radiohead circuits in accordance with various aspects of this disclosure;

FIG. 33 exemplarily shows a diagram of a distributed radiohead system in accordance with various aspects of this disclosure;

FIG. 34 exemplarily shows a signal diagram showing the embedding of the LO signals in the digital downlink communication from each of the radiohead circuits to the central processor in accordance with various aspects of this disclosure;

FIG. 35 exemplarily shows a process flowchart for a distributed radiohead system to synchronize the clocks of a plurality of radiohead circuits in accordance with various aspects of this disclosure; and FIG. 36 exemplarily shows a distributed radiohead system in accordance with various aspects of this disclosure.

DESCRIPTION

The following detailed description refers to the accompanying drawings that show, by way of illustration, exemplary details and aspects in which aspects of the present disclosure may be practiced.

As demand for wireless data traffic increases, wireless communication devices may require more wireless transceivers (e.g., multiple input multiple output (MIMO) technology, distributed input/distributed output (DIDO) networks, and/or multi-radio systems) to support wider bandwidths (BW), e.g., a BW of 320 MHz or more, and/or higher-order modulations schemes, e.g., 4k Quadrature Amplitude Modulation (QAM), or higher order modulation schemes. As demand for more efficient wireless communication devices (e.g., smaller size, less power consumption, higher performance, less material, lower costs), wireless communication devices may require greater integration while avoiding interference caused by the greater integration.

However, conventional implementations of the transceiver circuit and antenna and conventional cable connectivity schemes offer limited integration abilities due to cable losses, interference, thermal issues, and power consumption limitations. For example, in current wireless communication devices, such as those devices compliant with WiFi, Bluetooth (BT), GSM, CDMA, UMTS, LTE, or 5G or subsequent communication standards, the transceiver circuit is separate and remote from the antenna. In some cases, the integrated transceiver and front-end module is called a "radiohead" or "radio head".

In general, a radiohead can be considered as the radio equipment or RF circuitry for wirelessly communicating with other devices or networks. A radiohead includes a wireless transceiver for receiving and transmitting RF signals. Further the radiohead, as a transmitter can convert a digital signal to RF analog signal and amplify the converted signal to a desire power level so that an antenna connected to the transmitter radiates the RF signal. As a receiver, the radiohead can receive an RF signal from the antenna and then amplify the RF signal and further convert it back to a digital signal.

Said differently, a radiohead can be considered as the (integrated) RF transceiver combined with a front-end module (FEM) part that is specifically related to a specific antenna, and includes the least amount of signal processing. The FEM, in general, can include circuitry between a receiver's antenna input up to and including the mixer stage. Ideally, a radiohead will be located or placed with the antenna/module or in close proximity to one so that one will be able to see multiple radiohead instances in a design with multiple antennas. This is contrast from the classic partitioning by function where there is a multi-channel transceiver connected to multiple front-end modules (or networks) and multiple antennas.

FIG. 1 shows a block diagram of a wireless communication device including a conventional radiohead system. Referring to FIG. 1, the wireless communication device 1 includes a baseband integrated circuit 3 for baseband signal processing, a centralized radiohead circuit 6 for radio frequency signal processing, and one or more discrete antennas 5. The radiohead circuit 6 and antennas 5 are separate modules that are connected using a specialized radio frequency (RF) cable, e.g., coax cable, as a feed line to communicate RF electrical signals between the radiohead circuit and the antennas. Typically, as high-performance mini coax cables are costly components, only a single mini coax cable to each antenna is used due to cost and space constraints. Moreover, the RF electrical signals still suffer impedance mismatches and accumulated insertion losses even on a high performance specialized RF cable depending on the cable length.

The radiohead circuit 6 may include an RF integrated circuit (IC) 2 including one or more RF transceivers (TRX) and a common RF front end (FE) 4. The RF IC 2 may receive one or more data and control signals and operate to receive a communication signal from the baseband IC and generate an RF electrical signal from the communication signal for radio transmission from the device 1 or receive an RF electrical signal and generate a communication signal from the RF electrical signal for providing to the baseband IC. The RF FE 4 may convert an RF electrical signal into a format for transmission via the antenna(s) 5 and/or convert a signal received from the antenna(s) 5 into an RF electrical signal for the RF IC.

As the number of antenna elements in a communication device increases, a radiohead circuit may include more co-located RF transceivers. However, the use of co-located RF transceivers and RF transceiver chains based on a conventional centralized radiohead circuit and antennas may present technical inefficiencies, disadvantages and/or technical problems and pose limitations on overall system performance and capabilities that are difficult to overcome.

For example, co-located RF transceivers can cause cross interference problems which may introduce design or physical constraints limiting integration. These size or physical constraints also reduce scalability potential, e.g., increase in transceiver chain footprint which limits the overall radiohead circuit performance and increases cost.

For another example, using a conventional RF coax cable to connect antennas to a radiohead circuit may result in a cable loss, e.g., in excess of 2 dB at 60 cm. The cable size and cable loss may limit system performance and/or antenna placement, and/or may increase system cost. Moreover, the cable loss may limit smart antenna applications, for example, Voltage Standing Wave Ratio (VSWR) correction and/or the like. Accordingly, various technical limitations including cross interference, power consumption limitations, thermal limitations, fanout, and/or RF circuit complexity need to be overcome to efficiently realize the integration of co-located RF transceiver chains.

Further, as the radiohead circuit and antennas are provided in different packages, packaging parasitics may have deleterious effects on the electrical designs of integrated circuits for radio frequencies. As a result, additional processing is needed to mitigate the signal degradations, thereby further increasing costs.

Further, certain combinations of radiohead circuits and antennas may be incompatible or difficult to combine. For example, RF components and antenna components may interfere with each other.

Accordingly, advanced digital Complementary Metal-Oxide-Semiconductor (CMOS) processes or different circuit layout design and arrangement may be needed to facilitate increasing numbers of RF transceiver chains.

Today, there is a need for RF circuitry that can realize high performance wireless communication, have a compact and flexible form-factor design, be cost-effective, and able to meet modular certification requirements. These demands can be met by the wireless communication devices described herein.

The present disclosure describes various aspects relating to a low-cost, low-power, compact RF transceiver arrangement with increased silicon integration while avoiding or overcoming the various technical limitations associated with integrating co-located transceiver chains and integrating co-locating RF circuit and antenna circuit. For example, in some examples, a System-in-Packages (SIP) approach is used where two or more different dies are placed into a common package either side-by-side or stacked on top of each other. By combining dies of different technology and functionalities (e.g., RF, analog, digital) into one package, SIP provides substantial performance benefits, including, eliminating or reducing packaging parasitics. For another example, the present disclosure describes various aspects facilitating the placement of RF components co-located with or near an antenna while still providing optimized system performance.

The present disclosure relates to a radiohead circuit for a distributed radiohead system, where at least a portion of the radiohead circuit is co-located with an antenna. For example, the radiohead RF circuit and antenna circuit may be coupled to each other within a common enclosure. For another example, the antenna may be integrated with the silicon into a compact radiohead circuit package. That is, the radiohead RF circuit and antenna circuit may be formed on separate silicon dies/boards that are positioned near each other. The radiohead RF circuit and antenna circuit may be coupled to each other within a common module or system package. The present disclosure describes various ways of integrating the antenna and at least a portion of the radiohead circuit. Various aspects of the present disclosure describe interconnection structures and partitioning arrangements to simplify manufacturing, reduce manufacturing costs, improve transmission and reception quality, and/or improve energy efficiency. For example, each of these improvements derived from co-locating the RF circuit and the antenna circuit can incrementally reduce manufacturing cost by $0.5-$1.5/improvement (depending on SISO vs MIMO etc.) (eliminating lengthy specialized RF cables), improve key performance indicators (KPIs), and enable new use cases and experiences in wireless communication that are impossible to realize without a distributed radiohead system. The improvements to KPIs include eliminating insertion loss of 2-4 dB to provide higher power/range, better reception sensitivity, and/or reduced current for improved battery life.

In a distributed radiohead circuit arrangement according to various aspects of the present disclosure, the transceiver chain may be divided into a time-domain processing physical (TD PHY) portion and a frequency-domain processing physical (FD PHY) portion. The TD PHY portion can be co-located with one or more antennas. The TD PHY portion and the one or more antennas may be integrated. The TD PHY portion and the FD PHY portion may be separate and remotely located. The TD PHY portion and the FD PHY portion can be connected to each other through a digital interface to communicate digitized baseband RF signals. In one example, a Serially Time-Encoded Protocol (STEP) interface (developed by Intel Corporation) may be an optical or electrical signal interface.

The TD PHY portion may contain the radiohead RF circuit, the analog-to-digital/digital-to-analog (AD/DA) converters, the up/down converters, and line conditioning or impedance matching circuit. The TD PHY portion includes an optical/electrical interface circuit. The TD PHY portion may also have circuit for operation and management processing capabilities.

The TD PHY portion may include a transmitter chain that is configured to convert a digital baseband RF signal to an RF electrical signal and amplify the RF electrical signal to the desired power level for radiation. The TD PHY portion may include a receiver chain that is configured to receive the desired band of an induced RF electrical signal from an antenna and amplify the RF electrical signal and convert it into a digital baseband RF signal.

In some devices, there may be multiple TD PHY portions. Each TD PHY portion may be connected to a respective FD PHY portion. Alternatively, one or more TD PHY portions may be connected to an FD PHY portion.

Further in some aspects of the disclosure, there may not be a clear TD/FD split. For example, a single DSP part may be implemented or included for processing a sampled RF/analog signal on a per-transceiver basis and another DSP part is implemented or included to operatively implement equalization, demodulation, and other suitable multi-chain functions.

The digital front ends (DFEs) described herein may be considered, the TD portion and the DSP part responsible for the modulation/demodulation (modem) may be considered as the FD portion.

FIG. 2 illustrates a radiohead (RH) circuit 100 in accordance with various aspects of the present disclosure. The RHs 100 of FIG. 2, can avoid the above-noted problems. As shown, the radiohead circuit 100 includes a separate or individual transceiver chain, among other things incorporated into a compact design.

FIG. 36 shows an exemplary representation of distributed radiohead system 3600. For wireless communication, the distributed radiohead system or distributed radio system may include two main aspects or functionalities, represented as RF TD Baseband 3610 and MAC Frequency Domain Baseband 3630.

The RF TD Baseband 3610 functionalities include transmitting, receiving, filtering, and amplifying RF signals. Each RF TD Baseband 3610 may be integrated, co-located, or in the proximity of a respective antenna or antenna structure. The RF TD Baseband 3610 functionalities are performed in the time domain. The RF TD Baseband 3610 may further include frequency locking means to accurately or precisely generate analog signals at a desired frequency.

In addition, the RF TD Baseband 3610 can perform analog-to-digital and digital-to-analog conversions and up/down conversions. Up/down conversion includes shifting the frequency of a signal between from baseband (low frequencies) to RF (high frequencies) or vice versa. The RF TD Baseband 3610 can transform a digital signal into an analog signal or produce a digital signal from an analog signal. As such, the RF TD Baseband 3610 can include a digital interface.

Each of the RF TD Baseband 3610 may be integrated with an antenna and independently distributed. The individual nature of each RF TD Baseband 3610 can allow for easy modular certification approval.

The second main functional aspect of the distributed radiohead system 3600 is provided by the MAC Frequency Domain Baseband 3630. The MAC Frequency Domain Baseband 3630 is responsible for controlling the flow of signals the transmission medium and provide radio controls. The provided radio controls can include modulation/demodulation and encoding/decoding of signals. The signal processing performed by the MAC Frequency Domain Baseband 3630 can be done in the frequency domain. For example, the MAC Frequency Domain Baseband 3630 can perform FD processing based on a combination of two or more receive signals from the RF TD Basebands 3610 as well generate two or more transmit signals for the two or more RF TD Basebands 3610.

In the distributed radiohead system 3600, the MAC Frequency Domain Baseband 3630 is physically separated from the RF TD Baseband 3610 or is located on a platform physically separate from the RF TD Basebands 3610. The digital signals between the RF TD Baseband 3610 and the MAC Frequency Domain 3630 can be transmitted by means of a digital interface or digital links 3620. The signals between the RF TD Baseband 3610 and the MAC Frequency Domain 3630 may be in a phase alignment but not necessarily in frequency alignment with each other.

The radiohead 100 or radiohead circuit 100 may form part of radio or radio system, such a distributed radio system (DRS). A DRS generally can include a plurality or large number of antennas (or radioheads) distributed widely across a large coverage area and connected to an access point. A DRS implemented with the radiohead circuits 100 can have or implement several enhanced functionalities as well as performance capabilities with respect to wireless communications. This includes MIMO, digital beamforming, and multi-band operation. Further, a DRS implemented with the radiohead circuits 100 can realize higher robustness due to redundancy and flexibility of data reception and transmission, provide higher data transfer rates, have lower latencies, and provide an increased bandwidth. Further, the DRS can more easily be expanded or upscaled with additional radiohead circuits 100.

The increased bandwidth that may be provided by the distributed radio system is of key importance for applications that require the exchange of large quantities of data. The low latency ensured by the DRS and the radiohead circuit 100 can open the way for implementations in time-sensitive or time-critical scenarios, which require fast and reliable responses, such as the control of self-driving vehicles, the execution of medical procedures, or the realization of industrial processes.

In the example of FIG. 3, wireless communication device 300 includes a plurality of radiohead circuits 100 (e.g., radiohead circuits 100*a*-100N, also collectively radiohead circuits 100) which are each coupled to a modem 220, which may also be a system-on-chip (SoC). The modem 220 may include a digital interface (e.g., a digital baseband interface) for communicating with the radiohead circuits 100. The communication device 300 can include a distribution of separate or independent radiohead circuits 100*a*-N, where N can be used to represent any suitable number of radiohead circuits. In other words, at least some of the RHs 100 may be non-collocated. The radiohead circuits 100 enable wireless communication using modulated electromagnetic radiation through a non-solid medium. The communication device 300 may be configured to implement or may be considered as a Distributed Radio System (DRS) or distributed radiohead system.

As shown in the example of FIG. 3, the DRS architecture of communication device 300 can support the connection of multiple RHs 100, e.g., more than two RHs, to a single modem or modem 220, and can include dynamic selection of active RHs. This capability may be valuable, for example, for "transformer" and/or "detachable" form-factors, where at a first system configuration it may be better to have antennas at a first location, and at a second system configuration, e.g., different from the first system configuration, it may be better to have the antennas at a different location.

The communication device 300 can support high order MIMO (Multiple Input Multiple Output) systems, for example, by adding more RHs 100 as needed and connecting such RHs 100 to the modem 220, which can create a distributed system rather than prevalent collocated radio system. The DRS scheme implemented by the communication device 300 may support improved thermal and RF interference, for example, as the RHs 230 may be separated and/or remote, which may allow more flexibility and/or ease in multi-antenna MIMO systems, e.g., 4×4 MIMO and 8×8 MIMO systems.

The wireless communication device 300 implemented as DRS, can be used in several contexts, including, without limitation, 5G, Next Generation Wifi. In addition, the DRS may also be used in automotive contexts, including for self-driving cars and vehicle networks (e.g., V2X).

Referring back to FIG. 2, an individual integrated radiohead (RH) or radiohead circuit 100, may include at least one antenna or antenna structure 130. The dashed line 132 indicates that the antenna may be connected or part of the RH 100 by a connection means, such as a detachable connector. In other cases, the antenna may be integrated within the RH 100 by other means.

The radiohead circuit 100 includes a RF front end or RF front end portion 140 and a transceiver chain or radio circuit or radio circuit portion 150.

The RH 100 can have a compact design by integrating various of its components on a single platform, e.g., die or structure. More cost savings can be realized by the reduction or elimination of cable connections (e.g., coax cables). This advantageously can help realize a lower bill of materials cost, a reduction in production costs, and thus allowing for more lower cost devices.

In addition to physical costs, elimination or reduction of physical components (e.g., cables and cable connections) in the RHs 100 can provide power savings. These power savings or lower energy consumption further leads to an increase in the life time of the components, a longer battery life, and overall lower operational and maintenance costs.

In the example of FIG. 2, the radiohead circuit 100 may include collocation of the antenna 130, the RF front end portion 140, and the transceiver chain 150. In other words, the antenna 130, the RF front end 140, and the transceiver chain/radio circuit 150 may be placed or integrated together to create the RH 100. The RF front end 140 and the radio circuit 150 or transceiver (TRx) chain, (e.g. a 1×1 TRx chain) can be configured with components and/or logic to transmit an RF transmit signal via the antenna 130, and/or to receive an RF receive signal via the antenna 130. The integrated radiohead circuit 100 can be configured for concurrent operation over a plurality of wireless communication frequency bands. For example, the RH 100 may be configured to communicate over a first frequency band, e.g., the 2.4 GHZ band, and to communicate over a second frequency band, e.g., the 5 GHZ and/or 6-7 GHz bands.

As shown, for each RH 100, the antenna 130 is coupled to the RF front end 140, and the RF front end 140 is coupled to the radio circuit 150 or transceiver (TRx) chain. The RF front 140 may be configured to amplify signals received from or provided to the antenna 130 and can support the RH 100 operating in a transmit and in a receive mode. In some aspects, the RF front end 140 may include a transmit/receive switch to switch between transmit mode and receive mode operations. The RH 100 can include in some cases a separate receive signal path and transmit signal path. The RF front end 140 may include RF components such as, but not limited to, a power amplifier (PA), a low-noise amplifier (LNA), switches, etc.

FIG. 4 shows an RF front end portion 140 that may be implemented in the radiohead circuit 100. A receive signal path (Rx path) of the RF front end 140 of FIG. 4 includes an LNA (low noise amplifier) 410 for amplifying received RF signals and provides the amplified received RF signals as an output. A transmit signal path (Tx path) of the RF front end 140 of FIG. 4 includes a PA (power amplifier) 430 for amplifying input RF signals. One or more filters may be included for generating suitable RF signals for transmission and reception. In addition, the RF front ends 140 of FIG. 4 may include other components 420 or circuit, such as, for example, a tuner or matching network, switches, multiplexers, and/or other circuit for coupling the RF front end 140 to the antenna 130. In addition, other components may be included to support both transmit and receive modes.

The RF front end 140 may include a millimeter wave and/or one or more sub-millimeter wave radio frequency integrated circuits (RFICs). In some implementations, the one or more sub-millimeter wave RFICs may be physically separated from the millimeter wave RFICs.

The RF front end 140 of at least FIG. 2 can provide signals obtained from the antenna 100 to the transceiver chain/radio circuit 150. The transceiver chain or radio circuit 150 can interface between the RF front end 140 and one or more other components. In the communication device 300 of FIG. 3, each radiohead circuit 100 may interface with the modem 220 to enable or facilitate the wireless communication.

FIG. 5 shows one example of the radio circuit or transceiver circuit 150. As shown, the transceiver chain/radio circuit can include components such as a mixer circuit 510, synthesizer circuit 520 (e.g., local oscillator), filter circuit 530 (e.g., baseband filter), amplifier circuit 540, analog-to-digital converter (ADC) circuit 550, digital-to-analog (DAC) circuit 560, processing circuit 570, and other suitable digital front end (DFE) components 580, to name a few. The processing circuit may include a processor, such as a time-domain and/or frequency domain processor(s)/components in at least one example.

The other components 580 may include logic components, modulation/demodulation elements, and an interface circuit for interfacing with another component, e.g., a SoC, or the modem 220 in the example of FIG. 3. In at least one example, such an interface may be a digital interface, such as, e.g., a Common Public Radio Interface (CPRI).

DFE (digital front end) components may include any suitable number and/or type of components configured to perform functions known to be associated with digital front ends. This may include digital processing circuit, portions of processing circuitry, one or more portions of an on-board chip having dedicated digital front end functionality (e.g., a digital signal processor), etc. The DFE components may selectively perform specific functions based upon the operating mode of the radiohead circuit 100 and, for example, may facilitate beamforming. Digital front end components may also include other components associated with data transmission such as, for instance, transmitter impairment correction such as LO correction, DC offset correction, IQ imbalance correction, and ADC skew, digital pre-distortion (DPD) calculation, correction factor (CF) calculation, and pre-emphasis (pre. emp.) calculation. To provide additional examples, the digital front end components may facilitate or perform receiver or transmitter digital gain control (DGC), up-sampling, down-sampling, zero crossing detection algorithms, phase modulation, perform beam management, digital blocker cancellation, received signal strength indicator (RSSI) measurements, DPD and calibration accelerators, test signal generation, etc.

In at least one example, the transceiver chain 150 can include a receive signal path which may include mixer circuit 510, amplifier circuit 540 and filter circuit 530. In some aspects, the transmit signal path of the transceiver chain 150 may include filter circuit 530 and mixer circuit 510. The transceiver chain 150 may also include synthesizer circuit 520 for synthesizing a frequency signal for use by the mixer circuit 510 of the receive signal path and the transmit signal path. In some aspects, the mixer circuit 510 of the receive signal path may be configured to down-convert RF signals received from the RF front end 140 based on the synthesized frequency provided by synthesizer circuit 520.

In some aspects, the output baseband signals and the input baseband signals may be digital baseband signals. In such aspects, the radio circuit 150 may include analog-to-digital converter (ADC) 550 and digital-to-analog converter (DAC) circuit 560.

In at least one example, the transceiver chain 150 may also include a transmit signal path (Tx path) which may include circuit to up-convert baseband signals provided by the modem 220 and provide RF output signals to the RF front end 140 for transmission. In some aspects, the receive signal path of the radio circuit 150 may include mixer circuit 510, amplifier circuit 540 and filter circuit 530. In some aspects, the transmit signal path of the radio circuit 150 may include filter circuit 530 and mixer circuit 510. The radio circuit 150 may include synthesizer circuit 520 for synthesizing a frequency signal for use by the mixer circuit 510 of the receive signal path and the transmit signal path. The mixer circuit 510 of the receive signal path may be configured to down-convert RF signals received from the RF front end 140 based on the synthesized frequency provided by synthesizer circuit 520.

In various aspects, amplifier circuit 540 may be configured to amplify the down-converted signals and filter circuit may be a low-pass filter (LPF) or band-pass filter (BPF) configured to remove unwanted signals from the down-converted signals to generate output baseband signals. Output baseband signals may be provided to another component, e.g., a modem 220, for further processing. In some aspects, the output baseband signals may be zero-frequency baseband signals, although this is not a requirement.

The mixer circuit 510 for a receive signal path may include passive mixers, although the scope of this disclosure is not limited in this respect. In some aspects, the mixer circuit 510 for a transmit signal path may be configured to up-convert input baseband signals based on the synthesized frequency provided by the synthesizer circuit 520 to generate RF output signals for the RF front end 140. The modem 120 may provide the baseband signals and the filter circuit 540 may filter the baseband signals.

In some aspects, the mixer circuit 510 of the receive signal path and the mixer circuit 510 of the transmit signal path may include two or more mixers and may be arranged for quadrature downconversion and upconversion, respectively. In some aspects, the mixer circuit 510 of the receive signal path and the mixer circuit 510 of the transmit signal path may include two or more mixers and may be arranged for image rejection (e.g., Hartley image rejection). In some aspects, the mixer circuit 510 of the receive signal path and the mixer circuit 510 may be arranged for direct downconversion and direct upconversion, respectively. In some aspects, the mixer circuit 510 of the receive signal path and the mixer circuit 510 of the transmit signal path may be configured for super-heterodyne operation.

In some dual-mode aspects, a separate radio IC circuit may be provided for processing signals for each spectrum, although the scope of this disclosure is not limited in this respect.

In some aspects, the synthesizer circuit 520 may be a fractional-N synthesizer or a fractional N/N+1 synthesizer, although the scope of the aspects is not limited in this respect as other types of frequency synthesizers may be suitable. For example, synthesizer circuit 520 may be a delta-sigma synthesizer, a frequency multiplier, or a synthesizer including a phase-locked loop with a frequency divider.

The synthesizer circuit 520 may be configured to synthesize an output frequency for use by the mixer circuit 510 of the radio circuit 150 based on a frequency input and a divider control input. In some aspects, the synthesizer circuit 520 may be a fractional N/N+1 synthesizer.

In some aspects, frequency input may be provided by a voltage controlled oscillator (VCO), although that is not a requirement. In various aspects, divider control input may be provided by a processing component of the radio circuit 150, or may be provided by any suitable component, such as an external component like the modem 220 in the case of FIG. 3. For example, the modem 220 may provide a divider control input depending on the desired output frequency. In some aspects, a divider control input (e.g., N) may be determined from a look-up table based on a channel indicated by external component.

In some aspects, synthesizer circuit 520 of the radio circuit 150 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some aspects, the DLL may include a set of cascaded, tunable, delay elements, a phase detector, a charge pump and a D-type flip-flop. The delay elements may be configured to break a VCO period up into No equal packets of phase, where Nd is the number of delay elements in the delay line. In this way, the DLL provides negative feedback to help ensure that the total delay through the delay line is one VCO cycle.

In some aspects, synthesizer circuit 520 may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuit to generate multiple signals at the carrier frequency with multiple different phases with respect to each other. In some aspects, the output frequency may be a LO frequency (fLO). In some aspects, the RF circuit 506 may include an IQ/polar converter.

While the transceivers described herein include traditional super-heterodyning schemes or architectures, other type of transceiver or transmitter architectures and schemes may be used. In some aspects, the transceiver chain 150 may include components so as to implement a near zero IF scheme, a Direct Conversion scheme, or a digital transmission schemes, such as, for example, a Digital IQ transmission, a Digital Polar transmission, and the like.

In one example, the transceiver chain 150 may include a transmit path that includes or implements a direct digital transmitter (DDT). That is, in one simple example, a DDT may include a digital signal processor, a RF digital-to-analog converter (RFDAC), a RF filter/antenna coupler. Further, a DDT may be implemented with or without an IQ-mixer. In general, a RF-DAC may be included on a RFIC to convert digital input into a RF signal. A DDT may include other digital components such as numerically controlled oscillator (NCO) and digital mixers for shifting an input signal to desired frequency. The use of a DDT can reduce the number of analog components needed in the transmitter or transmit path. For example, an analog LOs, analog filters, analog mixers, and etc., may be eliminated from the RFIC when a direct digital transmitter such as DDT is employed. Further, the use of a digital transmitter or digital transmission schemes such may bring energy savings and efficiencies. FIG. 6 shows one example of a transceiver chain/radio circuit 150 that may be implemented in the radiohead circuit 100. The receive signal path (Rx path) circuit down-converts RF signals received from the RF front end 140 and provides baseband signals. Specifically, the receive signal path may include a mixer 510*b* and an ADC 550. The transmit signal path (Tx path) circuitry up-converts baseband signals provided by, e.g., a modem 220 and provides RF output signals to the RF front end 140 for transmission. Specifically, the transmit signal path may include a DAC 560 and a mixer 510*a*. The transceiver chain shown in FIG. 6 includes a synthesizer circuit, specifically, at least one local oscillator (LO) 520 to generate reference signals for the mixers 510*a* and 510*b*.

The antenna 130 for each radiohead circuit 100 may include a single antenna for transmission and reception. In other cases the antenna or antenna structure 130 may include multiple transmit antennas in the form of a transmit antenna array and multiple receive antennas in the form of a receive antenna array.

In other cases, the antenna 130 may be one or more antennas to be used as transmit and receive antennas. In such cases, the RF front end 140 may include, for example, a duplexer, to separate transmitted signals from received signals. For example, as shown in FIG. 7, the antenna or antenna structure 130 may include an RF antenna connector 135 that interfaces between the radiator of the antenna 130 and the RF front end 140. Further, FIG. 7 shows a multiple antenna feed (e.g., 131*a*, 131*b*, . . . 131N) from the RF antenna connector 135 to the antenna radiator.

Referring back to FIG. 3, the modem 220 (or SoC) may include components, for receiving signals (e.g., digital baseband signals) from each of the radiohead circuits. In at least one example, the modem 220 may include, or may be implemented, partially or entirely, by circuit and/or logic, e.g., one or more processors including circuit and/or logic, memory circuit and/or logic, Media-Access Control (MAC) circuit and/or logic, Physical Layer (PHY) circuit and/or logic, baseband (BB) circuit and/or logic, a BB processor, a BB memory, Application Processor (AP) circuit and/or logic, an AP processor, an AP memory, and/or any other circuit and/or logic. For example, the modem 220 can perform baseband processing on the digital baseband signals may be processed by the modem 220 to recover data included in wireless data transmissions. The modem 220, for example may include processor circuit for controlling and/or arbitrating transmit and/or receive functions of the radiohead circuit 100, performing one or more baseband processing functions (e.g., media access control (MAC), encoding/decoding, modulation/demodulation, data symbol mapping, error correction, etc.). In one or more aspects, the modem may include one or more processors to perform PHY frequency domain (FD) and/or PHY time domain (TD) processing, e.g., of signals.

In aspects, functions of the modem 220 can be implemented in software and/or firmware executing on one or more suitable programmable processors, and may be implemented, for example, in a field programmable gate array (FPGA), application specific integrated circuit (ASIC), etc.

In one example, the modem 220 may include a processor configured to generate a message, for example, in the form of a frame, field, information element and/or protocol data unit, for example, a MAC Protocol Data Unit (MPDU); and/or configured to convert the message into a PHY Protocol Data Unit (PPDU), e.g., a PHY Layer Convergence Procedure (PLCP) PDU, for example, by processing the message generated, e.g., by encoding the message, modulating the message and/or performing any other additional or alternative processing of the message. In other aspects, a processor of the modem 220 may be configured to perform any other additional or alternative functionality and/or may include any other additional or alternative components to generate and/or process a message to be transmitted.

As described before, the modem 220 as shown in FIG. 3 may be coupled to each respective radiohead circuit 100*a*-N via any suitable type of communication link or links (160*a*-160N). In at least one aspect, the communications links 160*a*-160N are digital links. The use of digital links can reduce expenses by eliminating the need for cable and connectors while performance can also be improved. Cables and connectors can add cost to designs and can impose physical design constraints in devices. The use of digital links or a digital link interface between the modem 220 and one or more radiohead circuits 100 can facilitate high data transfer rates. That is, the digital links 160*a*-160N may include a high speed digital I/O, e.g., a STEP interface or any other interface. The cable or link for the digital links 160*a*-160N may be much less sensitive to length, e.g., cost and performance wise, and, accordingly, the RHs 100 may be placed at practically any distance from the modem 220, for example, at lower cost. Further of importance is that the use or inclusion of a digital signal and control interface to the radiohead allows fulfillment of a key requirement for modular regulatory certification.

In some cases, the modem 220 and the RHs 100 of the communication device 300 may be placed closed together or integrated compactly. This may be necessary to optimize performance for certain classes of devices, such as IoT 4.0 type devices.

In some cases, as shown in FIG. 3, the modem 220 may communicate with a network 250, such as, a core network. Further, as shown, the communication device 300 can wireless communicate with the nodes 250 (e.g., nodes 250*a* and 250*b*) which may be an access point, base station, or the like.

FIG. 8 illustrates a block diagram of an exemplary device or system in accordance with an aspect of the disclosure. The components of the device 800 are provided for ease of explanation, and in other cases, the device 800 can include additional, less, or alternative components as those shown in FIG. 8.

As shown in the example of FIG. 8, the device 800 can include processing circuit 810, a memory 820, and can include a communication device, such as the communication device 300, including a plurality of radiohead circuits 100, e.g., radiohead circuits such as radiohead circuit 100 having integrated transceiver chain/radio circuit 150, RF front end 140, antenna(s) 130. As explained, the communication device 300 can implement or support a DRS. The device 800 can also include a modem or SoC connected to the radiohead circuits. For example, device 800 may include one or more power sources, display interfaces, peripheral devices, ports (e.g., input, output), etc.

The device 800 may be used for products involving 5G, Wifi, BT, UWB, or any suitable wireless network products. The device 800 may also be used for any device supporting data-intensive applications, including streaming video (e.g., 4K, 8K video) or augmented/virtual reality (AR/VR) devices. The device 800 may also be used for vehicles, e.g., to help support a self-driving car and/or to be used as vehicle network. For example, the device 800 may be used for Vehicle-to-everything (V2X) which includes vehicle-to-vehicle (V2V) and vehicle-to-infrastructure (V2I). The global automotive V2X market size is expected to reach USD 10,318.3 Million by 2027.

The processing circuit 810 may include any suitable number and/or type of computer processors, such as, for facilitating control of the device/system 800. In some cases, the processing circuit 810 may include a baseband processor (or suitable portions thereof) implemented by the device 800. In other cases, the processing circuit 800 may be one or more processors that are separate from the baseband processor (e.g., one or more digital signal processors. Additionally or alternatively, other examples may include various functions discussed herein by the processing circuit 800.

The processing circuit 810 may be configured to carry out instructions to perform arithmetical, logical, and/or input/output (I/O) operations, and/or to control the operation of one or more components of the device. For example, the processing circuit 810 can include one or more microprocessors, memory registers, buffers, clocks, etc. Moreover, aspects include processing circuit 810 communicating with and/or controlling functions associated with the memory 820 and/or functions of the radio.

The memory 820 may store data and/or instructions such that, when the instructions are executed by the processing circuit 810, the processing circuit 810 performs the various functions described herein. The memory 820 may be implemented as a non-transitory computer readable medium storing one or more executable instructions such as, for example, logic, algorithms, code, etc. Instructions, logic, code, etc., stored in the memory 820 may enable the aspects disclosed herein to be functionally realized.

In various aspects, the device 800 may be implemented as any suitable type of device configured to transmit and/or receive wireless signals in accordance with any suitable number and/or type of communication protocols. Further, the device 800 may be implemented as a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet-of-Things (IoT) device, a wearable device, a handheld device an off-board device, a hybrid device, a vehicular device, a non-vehicular device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like. In other examples, the device 800 may be implemented as an access point or base station. The device 800 may implement one or more aspects as described herein to facilitate transmitting wireless signals in accordance with a particular frequency or band of frequencies, such as mm-wave frequencies, for example, as further described herein. The prolonged lifetime (e.g., the extended battery life) that is associated with the reduced power consumption, in combination with the high data rate, make the radiohead circuits 100 particularly attractive for portable devices (e.g., smartphones, tablets, laptops) and also for installation in electrical vehicles (e.g., self-driving cars or remotely controllable drones).

The RHs 100 provide flexibility in terms of antennas to be implemented with vendor specific antennas. For example, this flexibility can be advantageous for cases where the wireless devices 800 are being made for with a large number different types of laptops, which each can include different constraints on antenna design and antenna placement.

In other cases, other devices may have form-factor constraints that are suitable for RHs 100 or the communication device 300 including such RHs. For example, the antenna area of some PCs can more design, physical, and other constraints than even smartphones, such as PCs having 5 mm think display side. By contrast current smartphones are rarely thinner than 7 mm. As such, the use of the communication device 300 with the flexibility of RHs 100 in terms of scalability and placement location is advantageous to work with such PC constraints.

In a communication device, the functioning of the components that take part to the transmission and/or to the reception of radio frequency signals may deviate over time from a predefined (e.g., target or desired) functioning, for example due to temperature drift effects or due to the occurrence of nonlinearities in the transmission path or in the receiver path. A calibration or re-calibration of such components may thus be recommended or required, for example after a predefined time (e.g., at periodic intervals), or in case a need for a calibration is determined, so that the communication device may operate according to the predefined functionalities. By way of example, a calibration may be based on the transmission (and reception) of over the air signals, which are used to determine whether (and what type) of calibration may be needed. A calibration based on over the air signals is however time- and resource-consuming, since time-slots are occupied for the calibration. In particular, in a communication device not configured according to a distributed radio system (DRS) concept it may not be possible to perform simultaneous or concurrent calibration of multiple transceiver chains. The crosstalk among different (e.g., adjacent) transceiver chains, e.g. among the respective transmitter portions or receiver portions (illustratively, among the respective loopback paths), may prevent the calibration of multiple chains at the same time. The crosstalk among transmitter portions of different transceiver chains may prevent performing simultaneous or concurrent calibrations that require the transmission of a signal to the air. This may lead to an increased time (e.g., an increased number of time slots) to be dedicated to a calibration, which may slow down the operation of the communication device.

FIG. 9A shows a time diagram 902 associated with a calibration of a communication device according to various aspects. The time diagram 902 may describe the calibration of a communication device not configured according to a distributed radio system solution, e.g. a device in which crosstalk among different transceiver chains prevents the calibration of multiple transceiver chains at the same time.

In such a device, a first calibration 904 of a first chain (as shown in the portion 906 associated with a first chain or "chain A") and a second calibration 908 of a second chain (as shown in the portion 910 associated with a second chain or "chain B") are carried out at different time points, e.g. are shifted in time and a calibration flow is not synchronized). The transmission of data from different chains (or the reception of data at different chains) may then happen simultaneously or concurrently. As shown in the time diagram 902, a first data transmission 912 from the first chain (or a first data reception at the first chain) and a second data transmission 914 from the second chain (or a second data reception at the second chain) may be carried out at the same time (e.g., a data flow is synchronized).

Various aspects may be related to providing a calibration in a communication device that may provide a more efficient time- and resource-utilization. Various aspects may be based on the realization that in a communication device including a plurality of (e.g., integrated) radiohead circuits crosstalk issues related to calibration may be reduced or mitigated or substantially eliminated, thus increasing the flexibility and the speed of a calibration. Various aspects may be related to calibrating a radiohead circuit independently on whether another radiohead circuit (illustratively, in a same communication device) is being calibrated. Illustratively, various aspects may related to calibrating a radiohead circuit without having to wait for the calibration of another radiohead circuit to finish, e.g. without having to worry about possible crosstalk issues during the calibration. Various aspects may be related to calibrating a plurality of radiohead circuits in parallel with one another (or at least partially in parallel with one another). The parallel calibration allows reducing the number of time slots taken from the network for the calibration(s) (e.g., by half in case two radiohead circuits are calibrated in parallel with one another). The calibration described herein may improve, among others, MIMO performance in a communication device. The calibration described herein may allow reducing the air-time taken for calibrations, which is important, for example, in multiple TX platforms, and reducing system complexity to find calibration slots.

In some aspects, each radiohead circuit may include a respective transceiver chain (also referred to herein as transceiver circuit). In a distributed radio system solution, the transceiver chains (e.g., each including a respective loopback path) may be disposed in different modules, and may be isolated from one another so as to prevent crosstalk during transmission or reception of a signal. Various aspects may be related to calibrating a transceiver chain independently on whether another transceiver chain (in the same communication device, e.g. in a different radiohead circuit of the same communication device) is being calibrated. Various aspects may be related to calibrating a plurality of transceiver chains in parallel (or at least partially in parallel) with one another.

FIG. 9B shows a time diagram 920 associated with a calibration of a communication device according to various aspects. The time diagram 920 may describe the calibration of a communication device configured according to a distributed radio system solution. Illustratively, the time diagram 920 may describe the calibration of a communication device including a plurality of radiohead circuits. In some aspects, the time diagram 920 may describe the calibration of a communication device configured as described in relation to FIG. 2 and/or in relation to FIG. 8.

In some aspects, one or more processors (e.g., of the communication device, or of the individual radiohead circuits, as described in further detail below) may be configured to carry out a first calibration 922 of a first radiohead circuit (as shown in the portion 924 associated with a first radiohead circuit or "radiohead A") and a second calibration 926 of a second radiohead circuit (as shown in the portion 928 associated with a second radiohead circuit or "radiohead B") out at a same time point, e.g. concurrently or simultaneously or at least partially simultaneously with one another (in some aspects, a calibration flow may be synchronized or at least partially synchronized). In some aspects, the transmission of data from different radiohead circuits or the reception of data at different radiohead circuits may then happen simultaneously (e.g., a data flow may be synchronized). As shown in the time diagram 920, the one or more processors may be configured to carry out a first data transmission 930 from the first radiohead circuit (or a first data reception at the first radiohead circuit) and a second data transmission 932 from the second radiohead circuit (or a second data reception at the second radiohead circuit) at the same time.

FIG. 10A shows a schematic flow diagram of a calibration method 1000, e.g. a method for calibrating one or more radiohead circuits of a communication device. The communication device may include a plurality of radiohead circuits, e.g. a first radiohead circuit and a second radiohead circuit, as described in further detail below. The method 1000 may include, in 1010, instructing a calibration of a radiohead circuit such that the calibration is performed independently on whether another radiohead circuit (illustratively, in a same communication device) is being calibrated. In the exemplary scenario described in the following, the method 1000 may include instructing at least one of a first calibration of the first radiohead circuit or a second calibration of the second radiohead circuit such that the at least one of the first calibration or the second calibration is performed independently from whether the other one of the first calibration or the second calibration is being performed. A calibration of a radiohead circuit may be understood, in some aspects, as a calibration of one or more components of the radiohead circuit, as described in further detail below. Illustratively, the method 1000 may include instructing at least one of a first calibration of the first radiohead circuit or a second calibration of the second radiohead circuit such that the first radiohead circuit carries out the first calibration independently from whether the second radiohead circuit is carrying out the second calibration and/or such that the second radiohead circuit carries out the second calibration independently from whether the first radiohead circuit is carrying out the first calibration.

In some aspects, instructing a calibration of a radiohead circuit such that the calibration is performed independently on whether another radiohead circuit is being calibrated may include instructing a calibration of a radiohead circuit and another calibration of another radiohead circuit such that the calibration and the other calibration are performed concurrently with one another or at least partially simultaneously with one another. Illustratively, it may include instructing a calibration of a radiohead circuit and another calibration of another radiohead circuit such that the radiohead circuit carries out the calibration and the other radiohead circuit carries out the other calibration concurrently with one another or at least partially simultaneously with one another.

The term "at least partially simultaneously" as used herein may describe that two or more processes (e.g., two or more calibrations) have at least a partial overlap in time, e.g. occur in an at least partially shared time window. In some aspects, in case two or more processes are described as being performed at least partially simultaneously it is understood that the two or more processes may be performed (completely) simultaneously with one another (e.g., may have a same starting time and a same end time, and, for example, may occur continuously over a same period of time). In some aspects, in case two or more processes are described as being performed at least partially simultaneously it is understood that the two or more processes may be performed in parallel with one another (or at least partially in parallel with one another). In some aspects, simultaneously may be understood as existing or occurring at the same time, e.g. as exactly coincident.

The term "concurrently" as used herein may describe that two or more processes (e.g., two or more calibrations) have at least a partial overlap in time. As an example, a process (e.g., a calibration) occurring or being carried out concurrently with another process (e.g., another calibration) may be understood such that a start time of the process lies within a time window in which the other process occurs (or vice versa), without the two processes having necessarily a same start time and a same end time. Two (or more) concurrent events, e.g. two or more concurrent processes, may occur intermittently over a given period of time.

Instructing a calibration may be understood, in some aspects, as controlling the device to be calibrated in such a way that the device may carry out the calibration. In some aspects, instructing a calibration may include providing one or more instructions to the device to be calibrated to initiate and/or to perform a calibration, as described in further detail below.

FIG. 10B shows a schematic flow diagram of a calibration method 1050, e.g. a method for calibrating one or more radiohead circuits of a communication device. The method 1050 may include, in 1060, instructing a plurality of calibrations of a plurality of radiohead circuits (illustratively, in a same communication device) such that the plurality of calibrations are performed at least partially simultaneously with one another. In the exemplary scenario described in the following, the method 1050 may include instructing a first calibration of the first radiohead circuit and a second calibration of the second radiohead circuit such that the first calibration and the second calibration are performed at least partially simultaneously with one another. In some aspects, the method 1050 may include instructing a first calibration of the first radiohead circuit and a second calibration of the second radiohead circuit such that the first radiohead circuit (e.g., one or more first processors of the first radiohead circuit) carries out the first calibration in parallel with the second radiohead circuit (e.g., one or more second processors of the second radiohead circuit) carrying out the second calibration.

In some aspects, additionally or alternatively, the method 1050 may include instructing a plurality of calibrations of a plurality of radiohead circuits such that the plurality of calibrations are performed concurrently with one another, e.g. instructing a first calibration of the first radiohead circuit and a second calibration of the second radiohead circuit such that the first calibration and the second calibration are performed concurrently with one another. Illustratively, the method 1050 may include instructing a first calibration of the first radiohead circuit and a second calibration of the second radiohead circuit such that the first radiohead circuit carries out the first calibration and the second radiohead circuit carries out the second calibration concurrently with one another.

FIG. 11A and FIG. 11B each shows schematically a communication device 1100 according to various aspects. The communication device 1100 may include a plurality of radiohead circuits. In the exemplary configuration shown in FIG. 11A and FIG. 11B the communication device 1100 may include a first radiohead circuit 1102 and a second radiohead circuit 1104. It is however understood that the communication device 1100 may include more than two radiohead circuits, e.g. three, four, five, ten, or more than ten radiohead circuits. In some aspects, the communication device 1100 may be configured as the communication device described in relation to FIG. 2 and/or in relation to FIG. 8. In some aspects, a radiohead circuit (e.g., the first radiohead circuit 1102 and/or the second radiohead circuit 1104) may be configured as the radiohead circuit described in relation to FIG. 1 to FIG. 8.

In some aspects, the communication device 1100 may be configured according to a distributed radio system concept, e.g. the communication device 1100 may include a distributed radio system with a plurality of radiohead circuits. In some aspects, the communication device 1100 may include a plurality of distributed radio systems, each associated with respective one or more radiohead circuits (e.g., a first distributed radio system including the first radiohead circuit 1102 and a second distributed radio system including the second radiohead circuit 1104). In some aspects, the communication device 1100 may be a mobile communication device.

In some aspects, the communication device 1100 may include one or more processors 1106. The one or more processors 1106 may be configured to control one or more calibrations of the plurality of radiohead circuits of the communication device 1100. The one or more processors 1106 may be configured to instruct a calibration of a radiohead circuit such that the calibration of the radiohead circuit is carried out (in other words, performed) independently from whether another calibration of another radiohead circuit is being carried out. Illustratively, the one or more processors 1106 may be configured to instruct a calibration of a radiohead circuit such that the radiohead circuit carries out the calibration independently from whether another radiohead circuit is carrying out another calibration. In some aspects, the one or more processors 1106 may be configured to instruct a calibration of a radiohead circuit and another calibration of another radiohead circuit such that the calibration and the other calibration are carried out concurrently with one another or at least partially simultaneously with one another. Illustratively, the one or more processors 1106 may be configured to instruct a calibration of a radiohead circuit and another calibration of another radiohead circuit such that the radiohead circuit carries out the calibration and the other radiohead circuit carries out the other calibration concurrently or at least partially simultaneously with one another.

In the exemplary configuration shown in FIG. 11A and FIG. 11B, the one or more processors 1106 may be configured to instruct at least one of a first calibration of the first radiohead circuit 1102 or a second calibration of the second radiohead circuit 1104 such that the at least one of the first calibration or the second calibration is performed independently from whether the other one of the first calibration or the second calibration is being performed, e.g. such that at least one of the first radiohead circuit 1102 or the second radiohead circuit 1104 carries out a respective first calibration or second calibration independently from whether the other one of the first radiohead circuit 1102 or the second radiohead circuit 1104 is carrying out the respective first calibration or second calibration. In some aspects, instructing at least one of the first calibration or the second calibration may include instructing the first calibration and the second calibration such that the first calibration and the second calibration are performed concurrently or at least partially simultaneously with one another, e.g. such that the first radiohead circuit 1102 and the second radiohead circuit 1104 carry out the respective first calibration and second calibration concurrently or at least partially simultaneously with one another. Illustratively, the one or more processors 1106 may be configured to instruct an individual calibration of a radiohead circuit (without having to consider what is happening in the other radiohead circuits) or to instruct a plurality of concurrent or at least partially simultaneous calibrations.

In some aspects, the one or more processors 1106 may be configured to instruct the first calibration of the first radiohead circuit 1102 and the second calibration of the second radiohead circuit 1104 such that the first calibration and the second calibration are performed concurrently or at least partially simultaneously with one another. As described above, the (at least partial) parallel calibration of multiple radiohead circuits may reduce an overall calibration time, e.g. an overall number of time slots taken from the network.

In relation to FIG. 11A and FIG. 11B it is described that one or more processors of a communication device (e.g., the one or more processors 1106) may instruct a calibration of a radiohead circuit. It is however understood that also other devices or processors may be configured instruct a calibration. By way of example, a device external to the communication device may be configured to instruct a calibration. As another example, a radiohead circuit itself (e.g., one or more processors of a radiohead circuit) may be configured to instruct a calibration, as described in further detail below.

In some aspects, the one or more processors 1106 may be digitally coupled with one, or more than one, or each radiohead circuit of the communication device 1100. In the exemplary configuration shown in FIG. 11A and FIG. 11B the one or more processors 1106 may be digitally coupled with the first radiohead circuit 1102 and with the second radiohead circuit 1104, for example via a respective digital link (e.g., a first digital link 1108 and a second digital link 1110). A digital link may be, for example, a flexible flat cable, a flexible printed circuit cable, or the like. The digital link may provide bidirectional communication between the one or more processors 1106 and each of the radiohead circuits coupled thereto, for example in accordance with an asynchronous time-based protocol. In some aspects, the one or more processors 1106 may include a system on chip. In some aspects, the one or more processors 1106 may include a modem.

In some aspects, the one or more processors 1106 may be configured to carry out processing (e.g., signal processing) in the frequency domain. Illustratively, the one or more processors 1106 may be configured to process a frequency domain signal, e.g. to carry out Fourier analysis of a signal. In some aspects, the one or more processors 1106 may be configured to receive a time domain signal from a radiohead circuit, and to convert the time domain signal into a frequency domain signal to carry out signal processing.

FIG. 11B illustrates possible components that a communication device (e.g., the communication device 1100) and a radiohead circuit (e.g., the first radiohead circuit 1102, the second radiohead circuit 1104) may include. It is understood that the configuration shown in FIG. 11B is only an example, and a communication device or a radiohead circuit may include additional, less, or alternative components with respect to those shown (e.g., one or more of the components described in relation to FIG. 1 to FIG. 8).

In some aspects, a radiohead circuit may include a transceiver chain configured to transmit radio frequency transmit signals and to receive radio frequency receive signals. In the following, e.g. in relation to FIG. 9 to FIG. 12, a radio frequency transmit signal may be also referred to as transmit signal, and a radio frequency receive signal may be also referred to as receive signal. Illustratively, a radiohead circuit may include a transmitter circuit and a receiver circuit, which collectively may form or be part of a transceiver chain. In the exemplary configuration shown in FIG. 11B, the first radiohead circuit 1102 may include a first transceiver chain 1112 configured to transmit a first transmit signal and configured to receive a first receive signal. The second radiohead circuit 1104 may include a second transceiver chain 1114 configured to transmit a second transmit signal and configured to receive a second receive signal.

A transceiver chain may include one or more components for signal manipulation and processing, e.g. for manipulating a signal such that it may be transmitted and for manipulating a received signal such that it may be processed, e.g. as described in relation to FIG. 4 and FIG. 5. A transceiver chain (e.g., each of the first transceiver chain 1112 and the second transceiver chain 1114) may include at least one component of a list of components including or consisting of: a low noise amplifier circuit, a power amplifier circuit, a digital pre-distortion circuit, a down-sampling circuit, a local oscillator circuit, an antenna tuning circuit (e.g., including a matching network), a digital signal processing circuit, and a phase-modulation circuit.

In some aspects, a calibration of a radiohead circuit may include a calibration of the respective transceiver chain, e.g. of at least one component of the transceiver chain. The first calibration of the first radiohead circuit 1102 may include a first calibration of the first transceiver chain 1112, e.g. of at least one component of the first transceiver chain 1112. The second calibration of the second radiohead circuit 1104 may include a second calibration of the second transceiver chain 1114, e.g. of at least one component of the second transceiver chain 1114.

In some aspects, a calibration of a transceiver chain (e.g., the first calibration of the first transceiver chain 1112 and/or the second calibration of the second transceiver chain 1114) may include a linearity calibration of a power amplifier circuit, and/or a IQ mismatch (also referred to herein as IQ imbalance) calibration (or correction), and/or a digital predistortion calibration.

In some aspects, a calibration of a radiohead circuit (e.g., of the first radiohead circuit 1102 and/or the second radiohead circuit 1104) may include changing a matching network configuration, for example to account for different operating channels and/or to account for body proximity to an antenna of the radiohead circuit (or to account for other environmental changes impacting an antenna load). In some aspects, a calibration of a radiohead circuit may include configuring any platform circuitry or elements to impact antenna performance, antenna load, and the like. In some aspects, a calibration of a radiohead circuit may include changing any transceiver or frontend module (FEM) parameters, for example to account for changing conditions. It is understood that the calibrations described herein serve only as examples, and additional or alternative components, processes, and/or parameters may be included in a calibration of a radiohead circuit.

In some aspects, a radiohead circuit may include an antenna (e.g., the first radiohead circuit 1102 may include a first antenna 1116, and the second radiohead circuit 1104 may include a second antenna 1118). A radiohead circuit including an antenna may be understood herein as a radiohead circuit having an antenna associated thereto. By way of example, the antenna may be integrated in the radiohead circuit, illustratively together with the other components of the radiohead circuit (e.g., on a same silicon). As another example, the antenna may be external to the radiohead circuit and only coupled with (e.g., bonded to) the radiohead circuit (e.g., with a frontend circuit of the radiohead circuit). In some aspects, a transceiver chain may transmit the respective transmit signal and receive the respective receive signal via a respective antenna (e.g., the first transceiver chain 1112 via the first antenna 1116 and the second transceiver chain 1114 via the second antenna 1118).

In some aspects, a radiohead circuit may include a frontend circuit, also referred to herein as RF FE, (e.g., the first radiohead circuit 1102 may include a first frontend circuit 1120, and the second radiohead circuit 1104 may include a second frontend circuit 1122) providing an interface between the transceiver chain and the antenna of the radiohead circuit, as described for example in relation to FIG. 1 to FIG. 8. In some aspects, the respective frontend circuit may include the power amplifier circuit and/or the low noise amplifier circuit described above in relation to a transceiver chain. In some aspects, a calibration of a radiohead circuit may include a calibration of the respective frontend circuit (e.g., of at least one component of the frontend circuit) and/or of the respective antenna (e.g., a tuning of the antenna).

In some aspects, the transmission (and/or the reception) of the plurality of radiohead circuits of the communication device 1100 may be (at least partially) synchronized to assist performing multiple calibrations in parallel. In some aspects, the transmission (and/or the reception) of the first radiohead circuit 1102 may be synchronized with the transmission (and/or the reception) of the second radiohead circuit 1104. Illustratively, the first transceiver chain 1112 may be configured to transmit the first transmit signal in synchronization (in some aspects, within a same time slot) with the second transceiver chain 1114 transmitting the second transmit signal. Further illustratively, the first transceiver chain 1112 may be configured to receive the first receive signal in synchronization (in some aspects, within a same time slot) with the second transceiver chain 1114 receiving the second receive signal. In some aspects, a transceiver chain transmitting (or receiving) a signal in synchronization with another transceiver chain may be understood as the transceiver chain transmitting (or receiving) the signal concurrently, or at least partially simultaneously, or simultaneously with the other transceiver chain.

In some aspects, the one or more processors 1106 may be configured to process a transmit signal transmitted by a radiohead circuit (e.g., by the respective transceiver chain) and/or to process the response of the radiohead circuit to a received receive signal to determine calibration parameters (illustratively, calibration instructions), e.g. transmit calibration parameters and/or receive calibration parameters. In some aspects, the processing by the one or more processors 1106 of a transmit signal transmitted by a radiohead circuit may be understood as a processing of a signal generated by a radiohead circuit for subsequent transmission, e.g. a signal not actually transmitted but processed by the transceiver chain and/or by the frontend circuit in preparation for transmission via the antenna. In some aspects, the processing by the one or more processors 1106 of a transmit signal transmitted by a radiohead circuit may be understood as a processing of a signal actually transmitted by the radiohead circuit and, for example, received by another radiohead circuit or by the same radiohead circuit (e.g., by a radiohead circuit having a calibrated receiver path). A transmit calibration may also be referred to herein as transmission calibration, and transmit calibration parameters may also be referred to herein as transmission calibration parameters. A receive calibration may also be referred to herein as reception calibration, and receive calibration parameters may also be referred to herein as reception calibration parameters.

In some aspects, a transmit calibration or a receive calibration may include a radiohead circuit (e.g., its transceiver chain) transmitting a transmit signal and receiving the transmitted signal as receive signal (at the receiver path of the same transceiver). Illustratively, a radiohead circuit (e.g., its transmitter path and/or its receiver path) may be calibrated in accordance with information determined via a loopback path of the radiohead circuit. This may be implemented in a communication device including radiohead circuits having separated loopback paths (illustratively, not interfering with one another).

In some aspects, the one or more processors 1106 may be configured to process the first transmit signal to determine one or more first transmit calibration parameters. In some aspects, the one or more processors 1106 may be configured to process the second transmit signal to determine one or more second transmit calibration parameters. Illustratively, the one or more processors 1106 may be configured to evaluate a transmit signal to determine whether a calibration (and what type) of any one of the components along the transmitter path is to be performed.

In some aspects, the one or more processors 1106 may be configured to receive (for example, from the first radiohead circuit 1102) a first response signal indicative of a response of the first radiohead circuit 1102 (e.g., of the first transceiver chain 1112) to the first receive signal. The one or more processors 1106 may be configured to determine one or more first receive calibration parameters in accordance with the first response signal. In some aspects, the one or more processors 1106 may be configured to receive (for example, from the second radiohead circuit 1104) a second response signal indicative of a response of the second radiohead circuit 1104 (e.g., of the second transceiver chain 1114) to the second receive signal. The one or more processors 1106 may be configured to determine one or more second receive calibration parameters in accordance with the second response signal. Illustratively, the one or more processors 1106 may be configured to evaluate how a transceiver chain processes a received signal to determine whether a calibration (and what type) of any one of the components along the receiver path is to be performed. As described above, in some aspects, a receive signal at a transceiver may include a transmit signal transmitted by that same transceiver (e.g., the first receive signal may include the first transmit signal, or another transmit signal transmitted by the first transceiver, and the second receive signal may include the second transmit signal, or another transmit signal transmitted by the second transceiver). Illustratively, the transmission of a radiohead circuit may be looped back through the receiver path to calibrate the receiver path and/or the transmitter path. In some aspects, a receive signal at a transceiver may include a transmit signal transmitted by another transceiver (e.g., the first receive signal may include the second transmit signal, and the second receive signal may include the first transmit signal).

In some aspects, a transmit signal and/or a receive signal may be configured in a way that allows determining whether a calibration is to be performed. In some aspects, a transmit signal (e.g., the first transmit signal and/or the second transmit signal) and/or a receive signal (e.g., the first receive signal and/or the second receive signal) may be configured as a frame signal, or as a frame portion of a frame signal (e.g., the transmit signal or receive signal may include a frame portion that provides calibration information, for example a preamble portion), for example a transmit signal and/or a receive signal may be configured as described in further detail below in relation to FIG. 19A and FIG. 19B. Illustratively, the transmit signal or receive signal may be configured to hold regulatory, e.g. it may be a legal modulated frame (for example including PHY and MAC preambles).

In some aspects, the one or more processors 1106 may be configured to determine the (e.g., transmit and/or receive) calibration parameters based on predefined information associated with a transmit signal and/or with a response signal, e.g. based on a predefined or expected content of a transmit signal and/or of a response signal (illustratively, a content associated with a calibrated radiohead circuit and/or with a calibrated transceiver chain).

In some aspects, the one or more processors 1106 may be configured to determine the one or more first transmit calibration parameters in accordance with a comparison of the first transmit signal with an expected (e.g., predefined) first transmit signal (illustratively, a transmit signal that should be generated in case the first transceiver chain 1112 is correctly calibrated). In some aspects, the one or more processors 1106 may be configured to determine the one or more second transmit calibration parameters in accordance with a comparison of the second transmit signal with an expected second transmit signal (illustratively, a transmit signal that should be generated in case the second transceiver chain 1114 is correctly calibrated).

In some aspects, the one or more processors 1106 may be configured to determine the one or more first receive calibration parameters in accordance with a comparison of the first response signal with an expected first response signal associated with the first receive signal (illustratively, a response signal that should be generated in case the first transceiver chain 1112 is correctly calibrated). In some aspects, the one or more processors 1106 may be configured to determine the one or more second receive calibration parameters in accordance with a comparison of the second response signal with an expected second response signal associated with the second receive signal (illustratively, a response signal that should be generated in case the second transceiver chain 1114 is correctly calibrated).

In some aspects, the communication device 1100 may include a memory 1124 storing calibration data. The memory 1124 may store, for example, data on a predefined or expected behavior of a radiohead circuit (or a transceiver chain). In some aspects the memory 1124 may store an expected transmit signal, e.g. the expected first transmit signal and the expected second transmit signal. In some aspects, the memory 1124 may store an expected response signal, e.g. the expected first response signal and the expected second response signal. In some aspects, the memory 1124 may be coupled (e.g., communicatively coupled) with the one or more processors 1106. In some aspects, the memory 1124 may store transmit calibration parameters and/or receive calibration parameters that the one or more processors 1106 may retrieve.

In some aspects, a radiohead circuit may be configured to interpret the (e.g., transmit and/or receive) calibration parameters provided by the one or more processors 1106 and to act accordingly. In some aspects, a radiohead circuit may include one or more processors configured to carry out a calibration in accordance with the calibration parameters provided by the one or more processors 1106. In the exemplary configuration shown in FIG. 11A and FIG. 11B, the first radiohead circuit 1102 may include one or more first processors 1126 configured to calibrate the first transceiver chain 1112 in accordance with the one or more first transmit calibration parameters and/or in accordance with the one or more first receive calibration parameters. The second radiohead circuit 1104 may include one or more second processors 1128 configured to calibrate the second transceiver chain 1114 in accordance with the one or more second transmit calibration parameters and/or in accordance with the one or more second receive calibration parameters.

In some aspects, the one or more processors of a radiohead circuit may be configured to instruct a calibration, e.g. independently from the one or more processors of the communication device. Illustratively, the one or more processors of a radiohead circuit (e.g., the one or more first processors 1126 and/or the one or more second processors 1128) may be configured to instruct a calibration of the respective radiohead circuit (e.g., of the respective transceiver chain) without receiving any external instruction or signal.

FIG. 12 shows a schematic signaling diagram 1200 associated with a calibration, according to various aspects. The signaling diagram 1200 describes a transmit calibration, but it is understood that an analogous signaling diagram (e.g., analogous configurations of the one or more processors and of the radiohead circuits) may be provided for a receive calibration. The first portion 1202 may be associated with a time associated with one or more events. The second portion 1204 may be associated with events occurring in the frequency domain (e.g., performed in one or more processors of a communication device, for example in the one or more processors 1106). The third portion 1206 and the fourth portion 1208 may be associated with events occurring in the time domain (e.g., in a first and second radiohead circuit, for example in the first radiohead circuit 1102 and the second radiohead circuit 1104).

In some aspects, the one or more processors of a communication device (e.g., the one or more processors 1106) may be configured to instruct a calibration (e.g., a transmit calibration as shown in FIG. 12, or a receive calibration) by providing (e.g., transmitting) a calibration signal to the radiohead circuit(s) to be calibrated. In the exemplary configuration described herein, the one or more processors 1106 may be configured to instruct a first calibration of the first radiohead circuit 1102 by transmitting a first configuration signal 1210 to the first radiohead circuit 1102. The one or more processors 1106 may be configured to instruct a second calibration of the second radiohead circuit 1104 by transmitting a second configuration signal 1220 to the second radiohead circuit 1104. In some aspects, the one or more processors 1106 may be configured to transmit the first configuration signal 1210 and the second configuration signal 1220 in synchronization with one another (e.g., to perform the first calibration and the second calibration concurrently with one another or at least partially simultaneously with one another), e.g. at a same time 1230.

A configuration signal may include one or more instructions prompting an action by the radiohead circuit, e.g. prompting the transmission of a transmit signal, or the transmission of a response signal. In some aspects, the first configuration signal may include an instruction prompting a transmission of the first transmit signal by the first transceiver chain 1112. The second configuration signal may include an instruction prompting a transmission of the second transmit signal by the second transceiver chain 1114. Illustratively, the first transceiver chain 1112 may be configured to transmit the first transmit signal in response to the first configuration signal and the second transceiver chain 1114 may be configured to transmit the second transmit signal in response to the second configuration signal, e.g. as first and second time domain signals 1240.

As described above, the one or more processors 1106 may be configured to process 1250 the first transmit signal and the second transmit signal, and to determine first transmission parameters 1260 and second transmission parameters 1270 to be provided to the first radiohead circuit 1102 and the second radiohead circuit 1104.

In a communication device, the optimization of a transmitted signal aims at providing efficient and reliable communication, e.g. in different conditions and scenarios. A relevant parameter of a transmitted signal may be its power as output by the antenna (or antennas) via which the signal is transmitted. In a communication device not configured according to a distributed radio system concept it may not be possible to reliably measure the output power at an antenna since such a device is limited by the isolation between the transceiver chains on the silicon (SI), on the package (PKG), and on the printed circuit board (PCB). Illustratively, in a non-DRS solution the output signal may be sniffed either from the SI or from the antennas (e.g., antenna to antenna), but the coupling between the transceiver chains on the PCB and SI is approximately in the same order of the coupling between the antennas, and, as a consequence, it may not be possible to measure the signal from the antenna itself without distortions. All power meters and loopback receivers may measure the power at an antenna connector, which however does not reflect the real radiated power from the antenna. Loopback between antennas is limited due to leakage between the chip port as well at higher power, making it hard to distinguish between the antenna and on chip leakage feedbacks.

FIG. 13A shows schematically a communication device 1300 according to various aspects. The communication device 1300 may be a device not configured according to a distributed radio system solution. The communication device 1300 may include a first antenna 1302 associated with a first transceiver chain 1304 (e.g., coupled at a first terminal 1306, e.g. at a first antenna connector), and a second antenna 1308 associated with a second transceiver chain 1310 (e.g., coupled at a second terminal 1312, e.g. at a second antenna connector). The communication device 1300 may include a substrate 1314 (illustratively, a silicon and/or a package) on or in which the first transceiver chain 1304 and the second transceiver chain 1310 may be disposed. The first transceiver chain 1304 and the second transceiver chain 1310 may not be isolated from one another, such that there may be interactions, e.g. crosstalk, between the two transceiver chains (or between the two terminals), as indicated by the double arrows 1316 and 1318. The interaction between the chains may prevent reliably using one transceiver chain (and the antenna) to evaluate the output power of the other transceiver chain (and other antenna).

Various aspects may be related to providing reliable measurement of output power at an antenna (illustratively, at an antenna port associated with one or more antennas). Various aspects may be based on the realization that in a communication device including a plurality of radiohead circuits there is no or negligible coupling in the printed circuit board or silicon, and thus the signal that is captured by an antenna is clean. Various aspects may be based on the realization that in a communication device including a plurality of radiohead circuits the output of a transceiver chain (e.g., via the associated antenna) may be reliably evaluated by capturing it at another transceiver chain (e.g. via another antenna), so that the output of the transceiver chain may be optimized. In some aspects, an output power may be maximized. Illustratively, in a distributed radio system solution each radiohead circuit may measure another radiohead circuit's power at the antenna over the air by its receiver without distortions (as illustrated in FIG. 13B for a communication device including a first distributed radio system 1320 having a first antenna 1322, and a second distributed radio system 1324 having a second antenna 1326), and it may be possible to optimize the actual output of an antenna and not the input of the antenna. In some aspects a communication device may be provided, in which a preferred transmission configuration for a radiohead circuit is determined by analyzing the output of the radiohead circuit received at another radiohead circuit. This may allow maximizing output power over the air and gaining dBs of performance.

In some aspects, a preferred (or optimum) transmission configuration may be the configuration of a radiohead circuit (e.g., of its transceiver chain and/or of its antenna) that provides the output signal having the greatest signal power among the signals provided with the possible transmission configurations. In some aspects, a preferred transmission configuration may be the configuration that provides the greatest channel quality among the channel qualities provided by the possible transmission configurations.

FIG. 14 shows a schematic flow diagram of a method 1400 for determining a preferred transmission configuration of a radiohead circuit of a communication device according to various aspects. The communication device may include a plurality of radiohead circuits, e.g. a first radiohead circuit and a second radiohead circuit. The communication device may be configured according to a distributed radio system solution.

The method 1400 may include, in 1410, transmitting by a first transceiver chain of the first radiohead circuit a first radio frequency signal associated with a first transmission configuration and a second radio frequency signal associated with a second transmission configuration. A radio frequency signal associated with a transmission configuration may be understood as a radio frequency signal transmitted (or generated) using that transmission configuration. The method 1400 may include, in 1420, receiving at a second transceiver chain of the second radiohead circuit the first radio frequency signal and the second radio frequency signal. The method 1400 may include, in 1430, determining a first signal parameter (e.g., a first signal power or a first channel quality) associated with the first radio frequency signal received at the second transceiver chain and determining a second signal parameter (e.g., a second signal power or a second channel quality) associated with the second radio frequency signal received at the second transceiver chain. The method 1400 may include, in 1440, determining a preferred transmission configuration for the first transceiver chain by using the first signal parameter and the second signal parameter.

In some aspects, a method for determining a preferred transmission configuration as described herein may include sweeping the possible transmission configurations of a radiohead circuit (e.g., of its transceiver chain and/or of its antenna), and selecting the preferred transmission configuration by determining the transmission configuration associated with (illustratively, providing) the transmitted radio frequency signal having the greatest signal power (or providing the greatest channel quality) as detected by another radiohead circuit of the (same) communication device. In some aspects, the method may include sweeping the possible antenna tuner configurations and selecting the configuration that led to the maximal power at the other antenna. Illustratively, an antenna tuner (also referred to herein as antenna tuning circuit) may be configured dynamically according to the antenna's output optimum.

FIG. 15A and FIG. 15B each show schematically a communication device 1500 according to various aspects. The communication device 1500 may include a plurality of radiohead circuits. In the exemplary configuration shown in FIG. 15A and FIG. 15B the device 1500 may include a first radiohead circuit 1502 and a second radiohead circuit 1504. It is however understood that the communication device 1500 may include more than two radiohead circuits, e.g. three, four, five, ten, or more than ten radiohead circuits. In some aspects, the communication device 1500 may be configured as the communication device described in relation to FIG. 2 and/or in relation to FIG. 8. In some aspects, the communication device 1500 may be configured as the communication device 1100 described in relation to FIG. 11A and FIG. 11B.

In some aspects, the communication device 1500 may be configured according to a distributed radio system concept, e.g. the communication device 1500 may include a distributed radio system with a plurality of radiohead circuits, or may include a plurality of distributed radio systems, each associated with respective one or more radiohead circuits (e.g., a first distributed radio system including the first radiohead circuit 1502 and a second distributed radio system including the second radiohead circuit 1504). In some aspects, the communication device 1500 may be a mobile communication device.

In some aspects, a radiohead circuit may include a transceiver chain configured to transmit a plurality of radio frequency signals each associated with a respective transmission configuration (e.g., to transmit each signal by using a respective transmission configuration). A transceiver chain may further be configured to receive the plurality of radio frequency signals transmitted by another transceiver chain. In the exemplary configuration shown in FIG. 15A and FIG. 15B, the first radiohead circuit 1502 may include a first transceiver chain 1506 configured to transmit (in some aspects, to generate) a first radio frequency signal associated with a first transmission configuration and to transmit a second radio frequency signal associated with a second transmission configuration (illustratively, different from the first transmission configuration, for example different in at least one of an impedance, an aperture, and/or a gain of an antenna of the radiohead circuit). The second radiohead circuit 1504 may include a second transceiver chain 1508 configured to receive the first radio frequency signal and the second radio frequency signal. In some aspects, a radio frequency signal may be understood as an over the air signal transmitted by a radiohead circuit and received at another radiohead circuit. The strategy described herein may be understood, in some aspects, as an over the air (OTA) calibration of a distributed radio system.

In some aspects, the communication device 1500 may include one or more processors 1510. The one or more processors 1510 may be configured to process the signals received at a radiohead circuit to determine a preferred transmission configuration for another radiohead circuit transmitting the signals. In this exemplary configuration, the one or more processors 1510 may be configured to determine a first signal parameter associated with the first radio frequency signal received at the second transceiver chain 1508 and a second signal parameter associated with the second radio frequency signal received at the second transceiver chain 1508.

The one or more processors 1510 may be configured to determine a preferred transmission configuration for a radiohead circuit (e.g., for a transceiver chain) by analyzing the signal parameters associated with the signals transmitted by that radiohead circuit, e.g. by finding the transmission configuration that provides the radio frequency signal having the optimum signal parameter. In this exemplary configuration, the one or more processors 1510 may be configured to determine a preferred transmission configuration for the first transceiver chain 1506 by using the first signal parameter and the second signal parameter.

In some aspects, the one or more processors 1510 may be configured as the one or more processors 1106 described in relation to FIG. 11A and FIG. 11B. As described above, the one or more processors 1510 may be digitally coupled with one, or more than one, or each radiohead circuit of the communication device 1500, e.g. with the first radiohead circuit 1502 and with the second radiohead circuit 1504, for example via a respective digital link (e.g., a first digital link 1512 and a second digital link 1514). In some aspects, the one or more processors 1510 may include a system on chip. In some aspects, the one or more processors 1510 may include a modem. The one or more processors 1510 may be configured to carry out processing in the frequency domain.

Determining a signal parameter may include, in some aspects, processing the radio frequency signal received at a transceiver chain to calculate or to evaluate the associated signal parameter. Determining the preferred transmission configuration by using the determined signal parameters may include, in some aspects, comparing the signal parameters with one another and/or with one or more predefined values to determine the optimum signal parameter and select the associated transmission configuration.

In some aspects, a signal parameter may include a signal power (in the following referred to as power) received at a transceiver chain (in some aspects, at an antenna). Illustratively, the first signal parameter may include a first power of the first radio frequency signal received at the second transceiver chain 1508, and the second parameter may include a second power of the second radio frequency signal received at the second transceiver chain 1508. It is understood that a signal power is only an example of a possible signal parameter that may be used to select a preferred transmission configuration, and other parameters may be possible (e.g., a channel quality, a signal amplitude, a signal to noise ratio, and the like).

In some aspects, the one or more processors 1510 may be configured to select as preferred transmission configuration the transmission configuration associated with the radio frequency signal having the greatest power. In this exemplary configuration, the one or more processors 1510 may be configured to select the first transmission configuration as preferred transmission configuration in case the first power is greater than the second power, and to select the second transmission configuration as preferred transmission configuration in case the second power is greater than the first power.

In some aspects, a communication channel may exist between different radiohead circuits, e.g. between different transceiver chains (or different antennas). A radio frequency signal may be associated with a respective communication channel, e.g. may be transmitted over that communication channel. A signal parameter may be indicative of a quality (e.g., a channel quality) of the channel associated with the radio frequency signal. The one or more processors 1510 may be configured to select as preferred transmission configuration the transmission configuration associated with the radio frequency signal providing the greatest channel quality. In this exemplary configuration, the first radio frequency signal may be associated with a first communication channel and the second radio frequency signal may be associated with a second communication channel between the first transceiver chain 1506 and the second transceiver chain 1508. The first signal parameter may be indicative of a first quality of the first communication channel, and the second signal parameter may be indicative of a second quality of the second communication channel. The one or more processors 1510 may be configured to select the first transmission configuration as preferred transmission configuration in case the first quality is greater than the second quality, and to select the second transmission configuration as preferred transmission configuration in case the second quality is greater than the first quality. In some aspects, e.g. in relation to FIG. 14 to FIG. 16B, a channel quality may be understood as a signal quality.

It is understood that the determination of the preferred transmission configuration may involve more than a first radio frequency signal and a second radio frequency signal, e.g. depending on the number of available transmission configurations (e.g., one, more than one, or each transmission configuration may be tested). The one or more processors 1510 may be configured to determine the preferred transmission configuration by determining a respective signal parameter for each radio frequency signal and by using each of the determined signal parameters. In some aspects, the first transceiver chain 1506 may be further configured to transmit a third radio frequency signal associated with a third transmission configuration. The second transceiver chain 1508 may be further configured to receive the third radio frequency signal. The one or more processors 1510 may be configured to determine a third signal parameter (e.g., a third power or a third channel quality) associated with the third radio frequency signal received at the second transceiver chain 1508, and to determine a preferred transmission configuration for the first transceiver chain 1506 by using the first, second, and third signal parameters.

It is also understood that the determination of the preferred transmission configuration may also be carried out in the other direction, i.e. the first radiohead circuit 1502 may be used to determine a preferred transmission configuration for the second radiohead circuit 1504. In some aspects, the second transceiver chain 1508 may be further configured to transmit a fourth radio frequency signal associated with a fourth transmission configuration and to transmit a fifth radio frequency signal associated with a fifth transmission configuration. The first transceiver chain 1506 may be further configured to receive the fourth radio frequency signal and the fifth radio frequency signal. The one or more processors 1510 may be further configured to determine a fourth signal parameter (e.g., a fourth power or a fourth channel quality) associated with the fourth radio frequency signal received at the first transceiver chain 1506 and a fifth signal parameter (e.g., a fifth power or a fifth channel quality) associated with the fifth radio frequency signal received at the first transceiver chain 1506, and to determine a preferred transmission configuration for the second transceiver chain 1508 by using the fourth and fifth signal parameters.

The one or more processors 1510 may be configured to select the fourth transmission configuration as the preferred transmission configuration in case the fourth power is greater than the fifth power (or in case the fourth channel quality is greater than the fifth channel quality), and to select the fifth transmission configuration as the preferred transmission configuration in case the fifth power is greater than the fourth power (or in case the fifth channel quality is greater than the fourth channel quality).

It is understood that the determination of the preferred transmission configuration for the second transceiver chain 1508 may involve more radio frequency signals. In some aspects, the second transceiver chain 1508 may be configured to transmit a sixth radio frequency signal associated with a sixth transmission configuration. The first transceiver chain 1506 may be configured to receive the sixth radio frequency signal. The one or more processors 1510 may be configured to determine a sixth signal parameter (e.g., a sixth power or a sixth channel quality) associated with the sixth radio frequency signal received at the first transceiver chain 1506, and to determine the preferred transmission configuration for the second transceiver chain 1508 by using the fourth, fifth, and sixth signal parameters.

In some aspects, the determination of the preferred transmission configuration for different transceiver chains may be performed in synchronization with one another, e.g. simultaneously or at least partially simultaneously. The sweep of the possible transmission configuration (and the transmission of the associated signals) may be synchronized (or at least partially synchronized). Illustratively, the first transceiver chain 1506 and the second transceiver chain 1508 may be configured to transmit the respective radio frequency signals in synchronization (e.g., concurrently or at least partially simultaneously) with one another. The one or more processors 1510 may be configured to process concurrently or at least partially simultaneously the signals received at the different transceiver chains to determine the preferred transmission configurations.

As described above, for example in relation to FIG. 11A and FIG. 11B, a transceiver chain may include one or more components for signal manipulation and processing. A transceiver chain (e.g., each of the first transceiver chain 1506 and the second transceiver chain 1508) may include at least one component of a list of components including or consisting of: a low noise amplifier circuit, a power amplifier circuit, a digital pre-distortion circuit, a down-sampling circuit, a local oscillator circuit, an antenna tuning circuit (e.g., including a matching network), a digital signal processing circuit, and a phase-modulation circuit.

In some aspects, a transmission configuration of a transceiver chain may include a configuration of one or more of the components of that transceiver chain. In this exemplary scenario described herein, the first transmission configuration may include a first configuration of one or more of the components of the first transceiver chain 1506, and the second transmission configuration may include a second configuration of one or more of the components of the first transceiver chain 1508. The third transmission configuration may include a configuration of one or more of the components of the first transceiver chain 1506. Analogously, the fourth and fifth transmission configurations (as well as the sixth transmission configuration) may include, respectively, a fourth and fifth (or sixth) configuration of one or more of the components of the second transceiver chain 1508. A configuration of a component of a transceiver chain may include a gain of an amplifier, a down-sampling rate, a processing rate, a modulation rate or amplitude, a configuration of a variable capacitor, only as examples. In some aspects, a transmission configuration of a transceiver chain may include a transmission scheme according to which a signal is transmitted, e.g. a transmission rate, a throughput, and the like.

FIG. 15B illustrates possible components that a communication device (e.g., the communication device 1500) and a radiohead circuit (e.g., the first radiohead circuit 1502 and the second radiohead circuit 1504) may include. It is understood that the configuration shown in FIG. 15B is only an example, and a communication device or a radiohead circuit may include additional, less, or alternative components with respect to those shown, e.g. one or more of the components described above, for example in relation to FIG. 1 to FIG. 8.

As described, for example, in relation to FIG. 11A and FIG. 11B, a radiohead circuit may include an antenna (e.g., the first radiohead circuit 1502 may include a first antenna 1516, and the second radiohead circuit 1504 may include a second antenna 1518). As described above, an antenna may be integrated in the radiohead circuit or an antenna may be external to the radiohead circuit and only coupled with the radiohead circuit (e.g., with a frontend circuit of the radiohead circuit). A transceiver chain may transmit the respective radio frequency signal(s) and receive the respective radio frequency signal(s) via a respective antenna (e.g., the first transceiver chain 1506 via the first antenna 1516 and the second transceiver chain 1508 via the second antenna 1518).

Illustratively, a radio frequency signal received at a transceiver chain may be understood, in some aspects, as a signal received at the associated antenna, and a radio frequency signal transmitted by a transceiver chain may be understood as a signal transmitted by or via the associated antenna.

As described above, in some aspects, a radiohead circuit may include a frontend circuit (e.g., the first radiohead circuit 1502 may include a first frontend circuit 1520, and the second radiohead circuit 1504 may include a second frontend circuit 1522) providing an interface between the transceiver chain and the antenna of the radiohead circuit. A transceiver chain and the associated antenna may be coupled to one another, e.g. via or through the respective frontend circuit.

In some aspects, a transmission configuration may include a configuration of the antenna, e.g., a tuning of the antenna, such as an impedance tuning, an aperture tuning, or a tuning of the gain of the antenna. In the exemplary scenario described herein, the first transmission configuration may include a first tuning of the first antenna 1516 (e.g., a first impedance tuning, a first aperture tuning, a first tuning of the gain), and the second transmission configuration may include a second tuning of the first antenna 1516 (e.g., a second impedance tuning, a second aperture tuning, a second tuning of the gain). The third transmission configuration may include a third tuning of the first antenna 1516 (e.g., a third impedance tuning, a third aperture tuning, a third tuning of the gain). Similarly, the fourth and fifth (as well as the sixth) transmission configurations may include, respectively a fourth and fifth (and sixth) tuning of the second antenna 1518. In some aspects, a configuration of an antenna may be understood as a configuration of a matching network associated with (e.g., coupled to) the antenna.

In some aspects, as described for example in relation to FIG. 7, an antenna may include one or more antenna elements (e.g., an array of antenna elements). A tuning of an antenna may include a tuning of one, or more than one, or each of the antenna elements. The first and second tuning (as well as the third tuning) of the first antenna 1516 may include, respectively a respective first or second (or third) impedance tuning and/or a respective first or second (or third) aperture tuning and/or a respective tuning of a first or second (or third) gain of one, or more than one, or each of the antenna elements of the first antenna 1516. Similarly, the fourth tuning and the fifth tuning (as well as the sixth tuning) of the second antenna 1518 may include respective impedance tuning, aperture tuning, and/or gain tuning of one, or more than one, or each of the antenna elements of the second antenna 1518.

As described above, in some aspects, a radiohead circuit may include respective one or more processors, which may be configured to convert a (e.g., received) radio frequency signal in the time domain into a radio frequency signal in the frequency domain, e.g. such that the one or more processors 1510 of the communication device 1500 may process the signal (e.g., to determine the associated signal parameter). In the configuration described herein, the first radiohead circuit 1502 may include one or more first processors 1524 and the second radiohead circuit 1504 may include one or more second processors 1526, the processors being configured to convert a (e.g., received) radio frequency signal in the time domain into a radio frequency signal in the frequency domain.

In some aspects, the one or more processors of a radiohead circuit may be configured to receive instructions and/or parameters from the one or more processors 1510 of the communication device 1500, e.g. indicative of the determined transmission configuration, and may be configured to control the respective transceiver chain and/or the respective antenna accordingly. The one or more first processors 1524 may be configured to receive the preferred transmission configuration for the first transceiver chain 1506. The first transceiver chain 1506 may be configured (in some aspects, may be controlled) to transmit a further radio frequency signal in accordance with (e.g., using) the preferred transmission configuration. The one or more second processors 1526 may be configured to receive the preferred transmission configuration for the second transceiver chain 1508. The second transceiver chain 1508 may be configured to transmit a further radio frequency signal in accordance with (e.g., using) the preferred transmission configuration.

In some aspects, the one or more processors of a radiohead circuit may be configured to determine the preferred transmission configuration of another radiohead circuit, illustratively without relying on processing by the one or more processors 1510. As an example, the one or more processors of a radiohead circuit may determine signal parameters and/or the preferred transmission configuration associated with another radiohead circuit in case the processing of a received signal in the time domain may suffice in identifying whether and what type of calibration may be needed. A radiohead circuit may be configured to communicate the determined signal parameters and/or preferred transmission configuration to the other radiohead circuit, e.g. via direct communication, via a dedicated over the air signal, or through the one or more processors of the communication device.

In some aspects, the communication device 1500 may include a memory 1528 (e.g., communicatively coupled with the one or more processors 1510 and/or with the radiohead circuits) storing transmission configuration data, for example the memory 1528 may store one or more preferred transmission configurations (e.g., determined as described above). In some aspects, a transceiver chain of a radiohead circuit may be configured to transmit the respective radio frequency signals according to a preferred transmission configuration stored in the memory 1528 and associated with that transceiver chain (e.g., a preferred transmission configuration that the one or more processors of the respective radiohead circuit may retrieve and/or that the one or more processors of the communication device may retrieve). In some aspects, the memory 1528 may store a plurality of possible transmission configurations (e.g., a plurality of possible configurations of an antenna, e.g. of a matching network). The plurality of possible transmission configurations may be ordered, e.g. in order of different (for example, increasing or decreasing) antenna impedance, antenna aperture, antenna gain, only as examples. A transceiver chain (or the one or more processors of the radiohead circuit) may be configured to change a transmission configuration by selecting one of the immediately adjacent configurations, e.g. to monitor the effects on the signal without abrupt modifications.

FIG. 16A and FIG. 16B each show a respective schematic signaling diagram 1600 and 1650 associated with a calibration and a parallel calibration of a transmission configuration, according to various aspects. In the signaling diagram 1600, the first portion 1602 may be associated with events occurring in the frequency domain (e.g., performed in one or more processors, for example in the one or more processors 1510), the second portion 1604 and the third portion 1606 may be associated with events occurring in the time domain (e.g., in first and second radiohead circuits, for example in the first radiohead circuit 1502 and in the second radiohead circuit 1504). In the signaling diagram 1650, the first portion 1652 may be associated with a time associated with one or more events, the second portion 1654 may be associated with events occurring in the frequency domain, the third portion 1656 and the fourth portion 1658 may be associated with events occurring in the time domain.

In some aspects, a radiohead circuit (e.g., its transceiver chain) may be calibrated prior to searching for the optimum transmission configuration. In some aspects, the calibration of a radiohead circuit may be carried out as described above in relation to FIG. 9 to FIG. 12. A transmit calibration may be carried out on the transceiver chain sweeping the possible transmission configurations and a receive calibration may be carried out on the transceiver chain receiving the transmitted radio frequency signals.

As shown in the diagram 1600, the one or more processors 1510 may be configured to instruct a first transmit calibration, 1608, of the first transceiver chain 1506 prior to transmission, 1612, of the respective radio frequency signals (e.g., of the first and second radio frequency signals, and of any further radio frequency signal), and the one or more processors may be configured to instruct a second receive calibration, 1610, of the second transceiver chain 1508 prior to reception of radio frequency signals (e.g., of the first and second radio frequency signals, and of any further radio frequency signal). The one or more processors 1510 may be configured to instruct the calibrations such that the radiohead circuits carry out the transmit calibration and the receive calibration before (or during) transmission and reception of the radio frequency signals.

The one or more processors 1510 may be configured to instruct a calibration by transmitting transmit calibration parameters and receive calibration parameters to the radiohead circuit(s), e.g. parameters determined as described above in relation to FIG. 9 to FIG. 12. The one or more processors 1510 may be configured to instruct the first transmit calibration by transmitting one or more first transmit calibration parameters to the first radiohead circuit 1502 and to instruct the second receive calibration by transmitting one or more second receive calibration parameters to the second radiohead circuit 1504.

It is understood that the one or more processors 1510 may be configured to calibrate the radiohead circuits also in the case the determination of the preferred transmission configuration was carried out in the other direction. The one or more processors 1510 may be configured to instruct a first receive calibration, 1618, of the first transceiver chain 1506 prior to reception of the radio frequency signals (e.g., of the fourth and fifth radio frequency signals, and of any further signal), and to instruct a second transmit calibration, 1616, of the second transceiver chain 1508 prior to transmission, 1620, of the respective radio frequency signals (e.g., of the fourth and fifth radio frequency signals, and of any further signal). The one or more processors 1510 may be configured to instruct the first receive calibration by transmitting one or more first receive calibration parameters to the first radiohead circuit 1502 and to instruct the second transmit calibration by transmitting one or more second transmit calibration parameters to the second radiohead circuit 1504.

Following the calibration, the determination of the preferred transmission configuration may be carried out as described above, with determination of the respective signal parameters, 1614 1622, determination of the respective transmission configuration 1624, and communication to the radiohead circuits of the respective transmission configuration 1626 1628.

In some aspects, as shown in time diagram 1650, the one or more processors 1510 may be configured to instruct the first transmit calibration and the first receive calibration in synchronization with one another, 1660, and/or to instruct the second transmit calibration and the second receive calibration in synchronization with one another, 1662. Illustratively, the radiohead circuits may carry out the calibrations at a same time, 1664, such that the radiohead circuits may carry out the calibrations (and transmissions) concurrently with one another or at least partially simultaneously with one another.

Following the synchronized calibrations, the determination of the preferred transmission configurations may be carried out as described above, e.g. with synchronized transmission of the respective radio frequency signals, 1666 1668, determination of the respective signal parameters, 1670, determination of the respective transmission configuration 1672, and communication to the radiohead circuits of the respective transmission configuration 1674 1676.

In a radiohead circuit there are two parameters that may be adjusted by antenna tuning, namely the antenna gain (illustratively, the directivity to a specific source) and the reflected voltage standing wave ratio (VSWR), for example indicative of the power reflected back towards a low noise amplifier. However, it may happen that tuning an antenna to achieve the optimum of one of these parameters leads to the other parameter not being optimized, and thus finding the optimum of one of these parameters does not necessarily lead to an improved performance.

Various aspects may be based on the realization that more reliable adjustments to the reception and/or the transmission of a radio frequency signal in a radiohead circuit may be provided by determining one or more signal parameters associated with the radio frequency signal. The determined parameters may be indicative of a quality of the communication, for example of the communication between a radiohead circuit receiving the signal and a radiohead circuit transmitting the signal.

Various aspects may be based on adjusting how a radiohead circuit receives a radio frequency signal (illustratively, on adjusting a signal reception in a radiohead circuit), e.g. on adjusting a signal reception scheme and/or an antenna tuning configuration, in accordance with a quality of the reception (in some aspects, in accordance with a signal to noise ratio associated with the received signal). Various aspects may be based on adjusting how a radiohead circuit transmits a radio frequency signal (illustratively, on adjusting a signal transmission in a radiohead circuit), e.g. on adjusting a signal transmission scheme and/or an antenna tuning configuration, in accordance with a quality of the transmission (in some aspects, in accordance with one or more network performance indicators).

Various aspects may be based on tuning an antenna of a radiohead circuit in accordance with one or more signal parameters associated with a radio frequency signal received at the antenna, and various aspects may be based on tuning an antenna of a radiohead circuit in accordance with one or more signal parameters associated with a radio frequency signal transmitted via the antenna. The strategy described herein may improve the receiver performance, e.g. in terms of tuning speed or in terms of quality of the reception, and/or the transmitter performance, e.g. in terms of throughput. The strategy described herein may ensure, for example, robustness over VSWR changes.

In some aspects, tuning a reception or a transmission of a radio frequency signal in a radiohead circuit may include a tuning of the antenna of the radiohead circuit (e.g., a tuning of a matching network associated with the antenna), illustratively an antenna tuning. Various aspects may be related to an antenna tuning method which includes sweeping the possible tuning configurations of the antenna to determine the optimum tuning configuration in accordance with one or more signal parameters associated with a radio frequency signal received at the antenna or transmitted via the antenna. Tuning an antenna in accordance with a radio frequency signal received at the antenna may ensure that the tuning is actually optimized for the communication between the radiohead circuit and the device transmitting the radio frequency signal (e.g., another radiohead circuit transmitting the signal).

A signal reception scheme as described herein (also referred to as reception scheme) may define the way the radiohead circuit receives a radio frequency signal, e.g., a signal reception scheme may include one or more rules according to which the radiohead circuit interacts with the network for receiving a radio frequency signal. A signal transmission scheme as described herein (also referred to as transmission scheme) may define the way the radiohead circuit transmits a radio frequency signal, e.g. a signal transmission may include one or more rules according to which the radiohead circuit interacts with the network for transmitting a radio frequency signal. A reception scheme and/or a transmission scheme may include (e.g., define) a throughput at which signals are received or transmitted, only as an example. A throughput may be understood herein, for example in relation to FIG. 17 to FIG. 23, as a number of radio frequency signals transmitted by a radiohead circuit over a certain period of time, and/or as a number of radio frequency signals received at a radiohead circuit over a certain period of time.

An antenna tuning configuration as described herein may include (e.g., define), for example, an impedance of the antenna, an aperture of the antenna, a gain of the antenna, and the like, as described in further detail below. An antenna tuning configuration may be understood, in some aspects, as a configuration of a matching network associated with (e.g., coupled to) the antenna. An antenna tuning configuration may also be referred to herein as tuning configuration, for example in relation to FIG. 17 to FIG. 23.

In the following two possible implementations of the tuning strategy mentioned above will be described. In a first implementation, described for example in relation to FIG. 17 to FIG. 20, the tuning is carried out in the radiohead circuit itself, i.e. the processing of a received radio frequency signal is carried out in the radiohead circuit (e.g., in the time domain). The processing in the radiohead circuit may ensure a faster tuning, and may provide the possibility of tuning the antenna receiving the radio frequency signal during the reception of the radio frequency signal (e.g., based on a first portion of the signal and prior to receiving a second portion of the signal). The first implementation may be provided, for example, for tuning of an antenna of a radiohead circuit receiving a radio frequency signal.

In the second implementation, described for example in relation to FIG. 21A to FIG. 23, the tuning is carried out in a communication device including the radiohead circuit, i.e. the communication device (illustratively, one or more processors of the communication device) may carry out processing of the received radio frequency signal (e.g., in the frequency domain). The processing in the communication device may be slower (illustratively, a slow flow) compared to the processing in the radiohead circuit but it may ensure a more robust analysis. The second implementation may be provided, for example, for tuning a radiohead circuit receiving a radio frequency signal and for tuning a radiohead circuit transmitting the signal. Illustratively, the processing of the received radio frequency signal may provide an indication about whether (and how) to adjust the signal reception and an indication about whether (and how) to adjust the signal transmission.

In some aspects, a signal parameter may include a signal to noise ratio associated with a received (or transmitted) radio frequency signal. In some aspects, a signal parameter may include an error vector magnitude associated with the received (or transmitted) radio frequency signal. In some aspects, for example in the first implementation, the signal to noise ratio may be used to determine a preferred antenna tuning configuration. In some aspects, for example in the second implementation, the signal to noise ratio and/or the error vector magnitude may be used to determine a preferred antenna tuning configuration. Illustratively, various aspects may be based on using a signal to noise ratio (and/or an error vector magnitude) instead of voltage standing wave ratio for empirically finding an optimal configuration (since tuning the antenna may influence the antenna directivity and LNA's matching, which may affect gain and noise).

In some aspects, for example in the second implementation, a signal parameter may be associated with the network over which the radio frequency signal is transmitted and received. Illustratively, in some aspects, a signal parameter may include or may be understood as a network parameter, e.g. as a network performance indicator (in other words, as a key performance indicator of the network). In some aspects, a signal parameter may include an utilization of airlink resources (also referred to herein as airlink utilization). In some aspects, a signal parameter may include a throughput, e.g. an instantaneous throughput. A signal parameter may include a network performance indicator, for example, in the second implementation, in which a signal (or a plurality of signals) fully received at the receiver side may provide information about the network (illustratively, about the connection between the transmitting device and the receiving device).

It is understood that the signal parameters described herein serve only as examples, and additional or alternative parameters associated with a radio frequency signal received at or transmitted by a radiohead circuit may be used for the tuning strategy described herein.

In the following, the determination of a change (e.g., a change in an antenna tuning configuration, in a reception scheme, or in a transmission scheme) may be described in relation to one type of signal parameter, it is however understood that a combination of different signal parameters (e.g., among those described above, or other parameters) may be used for each determination.

In the following, the tuning is described in relation to one radiohead circuit. It is however understood that the tuning may be carried out on a plurality of radiohead circuits, e.g. concurrently or at least partially simultaneously (in some aspects, in parallel), for example in case more than one radiohead circuit is receiving the same signal, or in case more than one radiohead circuit is being used to transmit the same signal (e.g., in case of beamforming).

FIG. 17 shows a schematic flow diagram of a method 1700 of tuning an antenna of a radiohead circuit according to various aspects.

By way of illustration, the method 1700 may include sweeping the possible tuning configurations of the antenna while receiving a radio frequency signal; determining a respective signal to noise ratio associated with each tuning configuration; and selecting as preferred tuning configuration the tuning configuration providing the greatest signal to noise ratio. Illustratively, a DRS receiver may sweep the tuner and estimate signal to noise ratio until finding optimal configuration for the specific transmitting device.

The method 1700 may include, in 1710, applying a first tuning configuration and a second tuning configuration (illustratively at or for the antenna, for example a first configuration of a matching network associated with the antenna, and a second configuration of the matching network).

The method 1700 may include, in 1720, receiving a radio frequency signal at the antenna while the first tuning configuration is applied, and receiving the same radio frequency signal at the antenna while the second tuning configuration is applied.

The method 1700 may include, in 1730, determining (e.g., measuring or calculating) a first signal to noise ratio associated with the received radio frequency signal and the first tuning configuration. The method 1700 may include, in 1740, determining a second signal to noise ratio associated with the received radio frequency signal and the second tuning configuration.

In some aspects, the radio frequency signal may include a legacy preamble portion, and the method may include determining the signal to noise ratios associated with the different antenna tuning configurations for the received legacy preamble portion, e.g. prior to receiving a data portion of the signal, as described in further detail below.

The method 1700 may include, in 1750, determining (e.g., selecting or calculating) a preferred tuning configuration by using the first signal to noise ratio and the second signal to noise ratio.

FIG. 18 shows a radiohead circuit 1800 in a schematic view according to various aspects. The radiohead circuit 1800 may be configured, in some aspects, as the radiohead circuit described in relation to FIG. 1 to FIG. 8. In some aspects, the radiohead circuit 1800 may be part of a distributed radio system in a communication device. Stated in a different fashion, a communication device may include the radiohead circuit 1800, or a plurality of radiohead circuits 1800. It is understood that the configuration shown in FIG. 18 serves only as example, and the radiohead circuit 1800 may include additional, less, or alternative components with respect to those shown.

The radiohead circuit 1800 may include an antenna 1802 and an antenna tuning circuit 1804 configured to tune the antenna 1802. The antenna tuning circuit 1804 may be configured to apply different tuning configurations for the antenna 1802, e.g. may be configured to sweep the possible tuning configurations for the antenna 1802. By way of example, the antenna tuning circuit 1804 may be configured to tune the antenna 1802 by applying a first tuning configuration and a second tuning configuration. In some aspects, the antenna 1802 and the antenna tuning circuit 1804 may be coupled to one another. As described above, a radiohead circuit including an antenna may be understood herein as a radiohead circuit having an antenna associated thereto, e.g. an antenna integrated in the radiohead circuit, or an antenna external to the radiohead circuit and only coupled with the radiohead circuit.

The antenna 1802 may be configured to receive a same radio frequency signal during the sweep of the possible tuning configurations. In the exemplary scenario described herein, the antenna 1802 may be configured to receive a radio frequency signal 1806 while the first tuning configuration is applied (in other words, while the antenna tuning circuit 1804 applies the first tuning configuration), and to receive the same radio frequency signal 1806 while the second tuning configuration is applied (in other words, while the antenna tuning circuit 1804 applies the second tuning configuration).

Receiving a same radio frequency signal while different tuning configurations are applied may be understood, in some aspects, as starting to apply the different tuning configurations when or after the radio frequency signal arrives at the antenna and changing the tuning configurations while the signal is being received, i.e. before the reception of the signal is completed. Illustratively, receiving a same radio frequency signal while different tuning configurations are applied may be understood as receiving parts of the same radio frequency signal each with a respective tuning configuration (in other words, may be understood as receiving parts of the same radio frequency signal each while the antenna tuning circuit 1804 applies a respective tuning configuration).

In some aspects, the radiohead circuit 1800 may include one or more processors 1808 configured to determine a signal parameter (e.g., a signal to noise ratio) associated with the received radio frequency signal 1806 for each tuning configuration. In the exemplary scenario described herein, the one or more processors 1808 may be configured to determine (e.g., to measure or to calculate) a first signal to noise ratio associated with the received radio frequency signal 1806 and the first tuning configuration, and to determine a second signal to noise ratio associated with the received radio frequency signal 1806 and the second tuning configuration. In some aspects, the one or more processors 1808 and the antenna tuning circuit 1804 may be coupled with one another. In some aspects, the one or more processors 1808 may be configured to carry out processing (e.g., signal processing) in the time domain, e.g. the one or more processors 1808 may be configured to process the received radio frequency signal 1806 in the time domain.

The one or more processors 1808 may be configured to determine (e.g., to select or to calculate) a preferred tuning configuration in accordance with the signal parameters. Illustratively, the one or more processors 1808 may be configured to determine the preferred tuning configuration by using the first signal to noise ratio and the second signal to noise ratio.

It is understood, that the operations carried out by the one or more processors 1808 described in relation to FIG. 18 may, in some aspects, be carried out by one or more processors (e.g., a modem) of a communication device including the radiohead circuit 1800, e.g. one or more processors digitally coupled with the radiohead circuit 1800.

In some aspects, a communication device external to the radiohead circuit 1800 (and external to a communication device including the radiohead circuit 1800), e.g. a mobile communication device connected with the radiohead circuit 1800, may transmit the received radio frequency signal 1806. Illustratively, the radiohead circuit 1800 may receive radio frequency signal 1806 via a communication channel between the radiohead circuit 1800 (e.g., the antenna 1802) and the (external) communication device. The external device may also include one or more radiohead circuits (e.g., one or more radiohead circuits 1800), and the radio frequency signal 1806 may be understood, in some aspects, as a signal transmitted by one or more radiohead circuits of the external device.

It is understood that the determination of the preferred tuning configuration may involve more than a first tuning configuration and a second tuning configuration, e.g. depending on the number of available tuning configurations.

The determination of the preferred tuning configuration may include one, two, more than two, or each of the possible tuning configurations. In some aspects, the antenna tuning circuit 1804 may be configured to tune the antenna 1802 by applying a third tuning configuration. The antenna 1802 may be configured to receive the same radio frequency signal 1806 while the third tuning configuration is applied (in other words, while the antenna tuning circuit 1804 applies the third tuning configuration). The one or more processors 1808 may be configured to determine a third signal to noise ratio associated with the received radio frequency signal 1806 and the third tuning configuration, and to determine the preferred tuning configuration by using the first signal to noise ratio, the second signal to noise ratio, and the third signal to noise ratio.

In some aspects, the one or more processors 1808 may be configured to control the antenna tuning circuit 1804 in accordance with the determined preferred tuning configuration. The antenna tuning circuit 1804 may be configured to tune the antenna 1802 by applying the preferred tuning configuration or by applying a tuning configuration in accordance with the determined preferred tuning configuration.

In some aspects, the one or more processors 1808 may be configured to determine the preferred tuning configuration by determining the configuration that provides the greatest signal to noise ratio. Illustratively, the one or more processors 1808 may be configured to determine as preferred tuning configuration the tuning configuration associated with the greatest signal to noise ratio among the determined signal to noise ratios. In the exemplary scenario described herein, the one or more processors 1808 may be configured to determine (e.g., to select) the first tuning configuration as preferred tuning configuration in case the first signal to noise ratio is greater than the second signal to noise ratio or to determine the second tuning configuration as preferred tuning configuration in case the second signal to noise ratio is greater than the first signal to noise ratio.

A signal to noise ratio may be the ratio of the power of the radio frequency signal received at the antenna to the power of the noise received (or measured) at the antenna while a tuning configuration is applied. In the exemplary scenario described herein, the one or more processors 1808 may be configured to determine the first signal to noise ratio as a first ratio of the power of the radio frequency signal 1806 to the noise power received while the first tuning configuration is applied, and to determine the second signal to noise ratio as a second ratio of the power of the radio frequency signal 1806 to the noise power received while the second tuning configuration is applied.

As described above, a tuning configuration of an antenna may be understood herein as a combination of one or more parameters that influence the way the antenna receives (or transmits) a radio frequency signal. By way of example, a tuning configuration may include an impedance tuning, an aperture tuning, and/or a tuning of the gain of the antenna. In the exemplary configuration described herein, the first tuning configuration may represent a first impedance tuning and/or a first aperture tuning and/or a first tuning of the gain of the antenna 1802. The second tuning configuration may represent a second impedance tuning and/or a second aperture tuning and/or a second tuning of the gain of the antenna 1802.

In some aspects, the antenna tuning circuit 1804 may include one or more controllable elements configured to control the impedance and/or the aperture and/or the gain of the antenna 1802. The one or more controllable elements may include, for example, one or more switches, one or more controllable resistors, one or more controllable capacitors, one or more controllable inductors, and the like. Applying a tuning configuration, or changing a tuning configuration, may include, in some aspects, controlling the one or more controllable elements to provide a (different) configuration of the one or more controllable elements. Illustratively, the antenna tuning circuit 1804 may include a matching network associated with (e.g., coupled to) the antenna 1802 (in some aspects, a plurality of matching networks). An antenna tuning configuration may include, in some aspects, a configuration of the matching network (e.g., the first tuning configuration may include a first configuration of the matching network, and the second tuning configuration may include a second configuration of the matching network). Applying a tuning configuration, or changing a tuning configuration, may include, in some aspects, applying or changing a configuration of the matching network. In some aspects, the antenna tuning circuit 1804 may include a controller configured to control the controllable elements (e.g., to control the matching network) to change the configuration. In some aspects, the antenna tuning circuit 1804 may be configured to be controlled by the one or more processors 1808 of the radiohead circuit 1800, or by one or more processors of a communication device including the radiohead circuit 1800.

As described above, for example in relation to FIG. 11A, FIG. 11B, FIG. 15A, and FIG. 15B, but not shown in FIG. 18, a radiohead circuit, e.g. the radiohead circuit 1800, may include a transceiver chain configured to receive a radio frequency signal via the antenna (e.g., via the antenna 1802) and to transmit a radio frequency signal via the antenna. In some aspects, the transceiver chain may include an antenna tuning circuit (e.g., the antenna tuning circuit 1804). As described above, but not shown in FIG. 18, a radiohead circuit may include a frontend circuit providing an interface between the transceiver chain and the antenna. In some aspects, a tuning configuration may include a gain of an amplifier circuit, e.g. of a low noise amplifier circuit, of the transceiver chain or of the frontend circuit of the radiohead circuit 1800. Illustratively, applying a tuning configuration may include, in some aspects, applying a certain gain of the low noise amplifier.

In some aspects, the radiohead circuit 1800 may include a memory (not shown) or may be communicatively coupled with a memory, e.g. a memory of a communication device in which the radiohead circuit 1800 may be included. The memory may store one or more preferred tuning configurations (e.g., associated with different signals, or with different devices, or with different scenarios, as examples), e.g. determined as described above. The antenna tuning circuit 1804 may be configured to tune the antenna 1802 by applying one of the preferred tuning configurations stored in the memory, e.g. by applying the preferred tuning configuration associated with the current received signal, or with the current transmitting device, or with the current scenario, as examples.

In some aspects, the memory may store a plurality of possible tuning configurations. The tuning configurations may be ordered, e.g. according to the associated impedance, and/or the associated aperture, and/or the associated gain, as examples. In some aspects, two adjacent configurations may have the smallest possible difference in the parameter used for ordering the configurations, e.g. the smallest possible impedance difference, or aperture difference, or gain difference. In some aspects, applying or changing a tuning configuration may include selecting one of the tuning configurations immediately adjacent to the current tuning configuration. This may provide evaluating whether the signal parameter is improving, e.g. whether the signal to noise ratio is increasing, without abrupt changes in the communication channel between the transmitting device and the receiving device.

FIG. 19A and FIG. 19B each show a structure of a radio frequency signal 1900, 1900*a*, 1900*b*, 1900*c* according to various aspects. The radio frequency signal 1900, 1900*a*, 1900*b*, 1900*c* shown in FIG. 19A and FIG. 19B may be a signal received at an antenna of a radiohead circuit, e.g. it may be the radio frequency signal 1806 received at the antenna 1802 of the radiohead circuit 1800. In some aspects, the radio frequency signal 1900, 1900*a*, 1900*b*, 1900*c* shown in FIG. 19A and FIG. 19B may be a signal transmitted by a radiohead circuit, as described above and as will be described in further detail below.

In some aspects, a radio frequency signal 1900, 1900*a*, 1900*b*, 1900*c* may be configured as a frame signal, e.g. may include a frame structure, for example configured in accordance with communication standards, such as IEEE 802.11 standards.

In some aspects, the frame signal may include a legacy portion 1902, 1902*a*, 1902*b*, 1902*c* and a non-legacy portion 1904, 1904*a*, 1904*b*, 1904*c*. A radiohead circuit (e.g., its one or more processors) may carry out the determination of the preferred tuning configuration based on the legacy portion 1902, 1902*a*, 1902*b*, 1902*c* (illustratively, during reception of the legacy portion), prior to reception of the non-legacy portion 1904, 1904*a*, 1904*b*, 1904*c*. The first implementation may be described, in some aspects, as in-frame antenna tuning. Using as tuning parameter the signal to noise ratio of frames that are received from a specific source may ensure obtaining an optimal combination of directivity, noise figure, and/or low noise amplifier's gain.

In the exemplary scenario described herein, the one or more processors 1808 may be configured to determine the first signal to noise ratio and the second signal to noise ratio from (or using) the legacy portion 1902, 1902*a*, 1902*b*, 1902*c* of the frame signal. The antenna tuning circuit 1804 may be configured to tune the antenna 1802 by applying the preferred tuning configuration prior to the antenna 1802 receiving the non-legacy portion 1904, 1904*a*, 1904*b*, 1904*c* of the frame signal.

In some aspects, the legacy portion 1902, 1902*a*, 1902*b*, 1902*c* may include a legacy preamble portion (also referred to herein as legacy preamble). The legacy preamble may include a legacy short training field (L-STF) 1906, a legacy long training field (L-LTF) 1908, and a legacy signal (L-SIG) field 1910. In some aspects, the antenna tuning circuit 1804 may be configured to tune the antenna 1802 by applying the preferred tuning configuration during (or after) reception of the legacy signal (L-SIG) field 1910.

Tuning the antenna may change the channel, so that, in some aspects, the antenna tuning circuit may be configured to carry out the tuning during the legacy preamble, prior to the antenna receiving data, e.g. prior to the antenna receiving high-throughput (HT)/very high-throughput (VHT)/high energy (HE) long training field (LTF), where channel estimation may be performed, as described in further detail below.

In some aspects, the frame signal may be configured according to different PHY Protocol Data Unit (PPDU) formats, such as different physical layer convergence procedure protocol data unit (PLCP PDU) formats, for example according to at least one of a high-throughput PHY Protocol Data Unit (HT PPDU) format, a very high-throughput PHY Protocol Data Unit (VHT PPDU) format, and a high PHY Protocol Data Unit (HE PPDU) format (or high energy single PHY Protocol Data Unit (HE SU PPDU) format), as shown in FIG. 19B.

In some aspects, the frame signal 1900*a* may be configured according to the HT PPDU format and may include a legacy preamble portion (as described above), a HT preamble portion 1912*a*, and a HT data portion 1914*a*. The HT preamble portion 1912*a* may include various fields, such as one or more HT signal fields (HT SIG) 1916, one or more HT short training fields (HT STF) 1918, and one or more HT long training fields (HT LTF) 1920. In some aspects, the antenna tuning circuit 1804 may be configured to tune the antenna 1802 by applying the preferred tuning configuration prior to the antenna 1802 receiving the HT preamble portion 1912*a*.

In some aspects, the frame signal 1900*b* may be configured according to the VHT PPDU format and may include a legacy preamble portion (as described above), a VHT preamble portion 1912*b*, and a VHT data portion 1914*b*. The VHT preamble portion 1912*b* may include various fields, such as one or more VHT signal fields (VHT SIG A, VHT SIG B) 1922 1924, one or more VHT short training fields (VHT STF) 1926, and one or more VHT long training fields (VHT LTF) 1928. In some aspects, the antenna tuning circuit 1804 may be configured to tune the antenna 1802 by applying the preferred tuning configuration prior to the antenna 1802 receiving the VHT preamble portion 1912*b*.

In some aspects, the frame signal 1900*c* may be configured according to the HE PPDU format or HE SU PPDU format and may include a legacy preamble portion (as described above), a HE preamble portion 1912*c*, and a HE data portion 1914*c*. The HE preamble portion 1912*c* may include various fields, such as one or more HE signal fields (HE SIG A) 1930, one or more HE short training fields (HE STF) 1932, and one or more HE long training fields (HE LTF) 1934. In some aspects, the frame signal 1900*c* may include a repeated L-SIG portion (RL SIG) 1936. In some aspects, the antenna tuning circuit 1804 may be configured to tune the antenna 1802 by applying the preferred tuning configuration prior to the antenna 1802 receiving the HE preamble portion 1912*c*.

FIG. 20 shows a schematic flow diagram of a method 2000 of tuning an antenna of a radiohead circuit (e.g., the antenna 1802 of the radiohead circuit 1800) according to various aspects. It is understood that the aspects described in relation to the method 2000 may apply also to the method 1700, and vice versa.

The method 2000 may include, in 2010, waiting for the LSTF. The LSTF of a received radio frequency signal may indicate that a frame signal is arriving, e.g. it is being received. Illustratively, the one or more processors 1808 may be configured to detect a start-of-packet upon reception of the legacy short training field (L-STF).

The method 2000 may include, in 2020, performing symbol timing synchronization (e.g., symbol detection and time synchronization) and (coarse) channel frequency synchronization during the LSTF (as indicated also in FIG. 19B). Illustratively, the one or more processors 1808 may be configured to perform symbol timing synchronization and channel frequency synchronization in accordance with the legacy short training field (L-STF).

The method 2000 may include, in 2030, performing symbol timing synchronization and (fine) channel frequency synchronization during the LLTF. The method 2000 may also include performing an initial channel estimation and a RX-impairment estimation during the L-LTF (as indicated also in FIG. 19B). Illustratively, the one or more processors 1808 may be configured to perform symbol timing synchronization and channel frequency synchronization in accordance with the legacy long training field (L-LTF).

The method 2000 may include, in 2040, decoding the L-SIG and, in 2050, estimating the RX tune parameters and configuring the radiohead circuit (in the time domain) during, or after, the L-SIG. Estimating the RX tune parameters may include determining a preferred tuning configuration for the radiohead circuit, e.g. for its antenna. The method 2000 may include applying the RX tune parameters after the L-SIG. Illustratively, the one or more processors 1808 may be configured to decode the legacy signal (L-SIG) field, and the antenna tuning circuit 1804 may be configured to tune the antenna 1802 by applying the preferred tuning configuration after the one or more processors have decoded the legacy signal (L-SIG) field.

The method 2000 may include, in 2060, receiving the PPDU, e.g. receiving the non-legacy portion (or part) of the frame signal, after the antenna tuning circuit has applied the Rx parameters.

As indicated in FIG. 20 the method 2000 may be carried out in the time domain and/or in the frequency domain, without limitation. Part of the method 2000 (e.g., of the processing) may be carried out in the time domain (e.g., by one or more processors of a radiohead circuit), and part of the method 2000 may be carried out in the frequency domain (e.g., by one or more processors of a communication device). However, it may also be possible to carry out the method 2000 entirely in the time domain or entirely in the frequency domain, or it may be possible to assign different parts as those indicated in FIG. 20 to the time domain or to the frequency domain, depending on the configuration of the specific radiohead circuit or communication device.

In some scenarios it may be preferable to perform the antenna tuning relying on a more robust, and in some cases more resource intensive, signal processing, which may be carried out, for example, in one or more processors (e.g., in the modem) of a communication device rather than in a radiohead circuit. Such signal processing may be implemented, for example, in case a fast response to a radio frequency signal being received is not necessary, or in case a plurality of radio frequency signals are expected from a same device. Illustratively, signal processing in the processor(s) of a communication device, e.g. processing in the frequency domain, may be implemented in scenarios that allow enough time to optimize the communication between the receiving device (e.g., the receiving radiohead circuit) and the transmitting device (e.g., the transmitting radiohead circuit) by using a more robust but slower strategy. This further implementation of the tuning strategy (in some aspects, of antenna tuning) will be described in further detail below, for example with reference to FIG. 21A to FIG. 23.

Various aspects may be related to adjusting signal reception and/or signal transmission in a radiohead circuit in accordance a signal parameter associated with a radio frequency signal, e.g. received at the radiohead circuit or transmitted by the radiohead circuit. In some aspects, the tuning of an antenna of a radiohead circuit may be determined by using the signal parameter, and the antenna may be tuned prior to receiving a further radio frequency signal or prior to transmitting a further radio frequency signal. Various aspects may be related to an antenna tuning between reception of (e.g., subsequent) signals from a same connected device or between transmission of (e.g., subsequent) signals to a same connected device. Various aspects may be related to a communication device including a radiohead circuit having an antenna configured to receive one or more radio frequency signals, and including one or more processors configured to determine an adjustment of an antenna tuning after at least one of the received radio frequency signal (in some aspects, after each received radio frequency signal, illustratively between consecutive radio frequency signals).

A signal parameter as described herein, for example in relation to FIG. 21A to FIG. 23 may also be referred to as receive signal parameter in case the signal parameter is associated with a radio frequency signal received at a radiohead circuit (e.g., at an antenna of the radiohead circuit), or may be referred to as transmit signal parameter in case the signal parameter is associated with a radio frequency signal transmitted by the radiohead circuit (e.g., via an antenna of the radiohead circuit). A tuning configuration (e.g., of an antenna) as described herein, for example in relation to FIG. 21A to FIG. 23 may also be referred to as tuning receive configuration in case the tuning configuration is associated with the reception of a radio frequency signal at a radiohead circuit, or may be referred to as tuning transmit configuration in case the tuning configuration is associated with the transmission of a radio frequency signal transmitted by the radiohead circuit. A radio frequency signal, for example in relation to FIG. 21A to FIG. 23, may also be referred to as radio frequency receive signal in case the radio frequency signal is received at a radiohead circuit, or as radio frequency transmit signal in case the radio frequency signal is transmitted by a radiohead circuit.

FIG. 21A shows a schematic flow diagram of a method 2100 of tuning a signal reception in a radiohead circuit, e.g. a method of tuning an antenna of a radiohead circuit according to various aspects. In some aspects, the radiohead circuit may be configured as described above, for example in relation to FIG. 17 to FIG. 20. The radiohead circuit may be part of a distributed radio system of a communication device. In some aspects, a communication device, e.g. configured as described above, may include the radiohead circuit.

By way of illustration, the method 2100 may include changing (in other words, adapting) a tuning configuration of the antenna after a radio frequency signal has been received at the antenna (in other words, after the antenna has received a radio frequency signal), in accordance with a determined signal parameter associated with the received radio frequency signal. In some aspects, a radio frequency signal that has been received at the antenna may be understood as a radio frequency signal completely transmitted and received, e.g. without additional portions yet to be transmitted or received.

In the exemplary configuration described herein, the method 2100 may include, in 2110, applying a first tuning configuration of the antenna (in some aspects, to or for the antenna).

The method 2100 may include, in 2120, receiving a first radio frequency signal while the first tuning configuration is applied. In some aspects, receiving a (first) radio frequency signal, e.g. in relation to the second implementation of the antenna tuning, may be understood as completely receiving the radio frequency signal (e.g., each part or portion of the signal).

The method 2100 may include, in 2130, determining (e.g., measuring or calculating) a first signal parameter associated with the received first radio frequency signal and the first tuning configuration. As described above, in some aspects, the signal parameter may be a (first) signal to noise ratio and/or a (first) error vector magnitude associated with the received radio frequency signal (e.g., measured on or with the received radio frequency signal). In some aspects, the signal parameter may be a (first) network parameter, e.g. a (first) airlink utilization or a (first) throughput.

The method 2100 may include, in 2140, determining a first tuning configuration change by using the first signal parameter. Illustratively, it may be determined (or at least estimated) how the tuning of the antenna should be modified to improve the signal reception (e.g., to increase the signal to noise ratio, to decrease the error vector magnitude, to make the airlink utilization converge to a target airlink utilization, or to make the throughput converge to a target throughput). By way of example, after a first radio frequency signal is received, the tuning configuration change may be determined in accordance with previously known information, e.g. a previous communication from that same device, a previous communication occurring in a same or similar scenario, and the like. Illustratively, the first change may be determined (or guessed) in accordance with historic data that may apply to the current situation, e.g. it may be a change that provided in the past the desired increase in signal to noise ratio or decrease in error vector magnitude, or the desired change in airlink utilization and/or throughput.

After the reception of the subsequent signals, the tuning configuration change may be determined by evaluating whether the signal parameter is improving, e.g. whether the signal to noise ratio is increasing, whether the error vector magnitude is decreasing, whether the airlink utilization is converging towards a target airlink utilization or whether the throughput is converging towards a target throughput. In case the signal parameter is improving, the tuning configuration change may be of a same type of the previous tuning configuration change (e.g., an impedance of the antenna that was increased may be further increased, a gain of the antenna that was increased may be further increased, and the like). In case the signal parameter is getting worse, the tuning configuration change may be of opposite type with respect to the previous tuning configuration change (e.g., an impedance of the antenna that was increased may be now decreased, a gain of the antenna that was increased may be now decreased, and the like).

In some aspects, the method 2100 may further include applying one or more further tuning configurations and receiving one or more further radio frequency signals. For each of the one or more further tuning configurations a tuning configuration change may be determined. Each of the one or more further tuning configurations may be determined by adapting the preceding tuning configuration in accordance with the corresponding tuning configuration change. By way of example, the method 2100 may include applying a second tuning configuration of the antenna, the second tuning configuration being determined in accordance with the first tuning configuration and the first tuning configuration change. Illustratively, the method 2100 may include determining a second tuning configuration of the antenna in accordance with the first tuning configuration and the first tuning configuration change, and applying the second tuning configuration of the antenna. The method 2100 may include receiving a second radio frequency signal while the second configuration is applied. The method 2100 may include determining a second signal parameter associated with the received second radio frequency signal and the second tuning configuration. The method 2100 may include determining a second tuning configuration change by using the second signal parameter.

In some aspects, additionally or alternatively, a method of tuning signal reception in a radiohead circuit (e.g., the method 2100) may include tuning a reception scheme of the radiohead circuit, e.g. a reception scheme according to which a transceiver chain of the radiohead circuit receives a radio frequency signal. A method of tuning a signal reception in a radiohead circuit (e.g., the method 2100) may include receiving a (first) radio frequency signal according to a (first) reception scheme. The method may include determining a (first) signal parameter associated with the received radio frequency signal and the reception scheme. The method may include determining a (first) reception scheme change by using the signal parameter.

A signal parameter may be associated with a tuning configuration (e.g., of an antenna of the radiohead circuit) and/or with a reception scheme according to which a radio frequency signal is received (and/or with a transmission scheme according to which a radio frequency signal is transmitted, as described below). Illustratively, a signal parameter may be indicative of the relevant configurations or elements used to receive the signal.

FIG. 21B shows a schematic flow diagram of a method 2150 of tuning a signal transmission in a radiohead circuit, e.g. a method of tuning an antenna of a radiohead circuit according to various aspects.

By way of illustration, the method 2150 may include changing (in other words, adapting) a tuning configuration of the antenna after a radio frequency signal has been transmitted via the antenna and has been received at another device (e.g., at another radiohead circuit), in accordance with a feedback signal provided by the device receiving the signal.

In the exemplary configuration described herein, the method 2150 may include, in 2160, applying a first tuning configuration of the antenna (in some aspects, to or for the antenna).

The method 2150 may include, in 2170, transmitting a first radio frequency signal while the first tuning configuration is applied. In some aspects, transmitting a (first) radio frequency signal, e.g. in relation to the second implementation of the antenna tuning, may be understood as completely transmitting the radio frequency signal (e.g., each part or portion of the signal).

The method 2150 may include, in 2180, receiving a (first) feedback signal indicative of a (first) signal parameter associated with the transmitted (first) radio frequency signal. As described above, in some aspects, the signal parameter may be a (first) signal to noise ratio and/or a (first) error vector magnitude associated with the received radio frequency signal (e.g., measured on or with the received radio frequency signal). In some aspects, the signal parameter may be a (first) network parameter, e.g. a (first) airlink utilization or a (first) throughput.

In some aspects, the feedback signal may be provided by the device (e.g., the radiohead circuit) receiving the transmitted radio frequency signal. By way of example, the feedback signal may include the signal parameter, e.g. as determined by the device that received the signal. As another example, the feedback signal may include information that may be processed to determine the signal parameter. In some aspects, the feedback signal may include a (first) acknowledgment signal indicative of a (e.g., successful or unsuccessful) reception of the transmitted radio frequency signal (e.g., a throughput may be determined in accordance with the acknowledgment signal).

The method 2150 may include, in 2190, determining a first tuning configuration change by using the first signal parameter (in some aspects, using the received feedback signal). Illustratively, it may be determined (or at least estimated) how the tuning of the antenna should be modified to improve the signal transmission (e.g., to increase the signal to noise ratio, to decrease the error vector magnitude, to make the airlink utilization converge to a target airlink utilization, or to make the throughput converge to a target throughput).

After the transmission of the subsequent signals, the tuning configuration change may be determined by evaluating whether the signal parameter is improving, as described above for the method 2100. In case the signal parameter is improving, the tuning configuration change may be of a same type of the previous tuning configuration change. In case the signal parameter is getting worse, the tuning configuration change may be of opposite type with respect to the previous tuning configuration change.

In some aspects, the method 2150 may further include applying one or more further tuning configurations and transmitting one or more further radio frequency signals, similarly to the description above in relation to the method 2100. By way of example, the method 2150 may include applying a second tuning configuration of the antenna, the second tuning configuration being determined in accordance with the first tuning configuration and the first tuning configuration change. Illustratively, the method 2150 may include determining a second tuning configuration in accordance with the first tuning configuration and the first tuning configuration change, and applying the second tuning configuration of the antenna. The method 2150 may include transmitting a second radio frequency signal while the second configuration is applied. The method 2150 may include receiving a second feedback signal indicative of a second signal parameter associated with the transmitted second radio frequency signal and the second tuning configuration. The method 2150 may include determining a second tuning configuration change by using the second signal parameter.

In some aspects, additionally or alternatively, a method of tuning signal transmission in a radiohead circuit (e.g., the method 2150) may include tuning a transmission scheme of the radiohead circuit, e.g. a transmission scheme according to which a transceiver chain of the radiohead circuit transmits a radio frequency signal. A method of tuning a signal transmission in a radiohead circuit (e.g., the method 2150) may include transmitting a (first) radio frequency signal according to a (first) transmission scheme. The method may include receiving a (first) feedback signal indicative of a (first) signal parameter associated with the transmitted (first) radio frequency signal and the (first) transmission scheme. The method may include determining a (first) transmission scheme change by using the signal parameter. Only as an example, in case the feedback signal includes an acknowledgement signal, a change in the throughput may be determined. Illustratively, in case the acknowledgment signal indicates successful reception of the signal the current throughput may be maintained or increased, and in case the acknowledgment signal indicates unsuccessful reception of the signal the current throughput may be decreased. A signal parameter (e.g., the first signal parameter) may be associated with a tuning configuration (e.g., of an antenna of the radiohead circuit) and/or with a transmission scheme according to which a radio frequency signal is transmitted. Illustratively, a signal parameter may be indicative of the relevant configurations or elements used to transmit the signal.

It is understood that the tuning of the reception and the tuning of the transmission, e.g. the method 2100 and the method 2150, may also be implemented (together) in a same communication device, that is the communication device (e.g., one or more processors thereof) may be configured to carry out (both) the tuning of the reception and the tuning of the transmission.

FIG. 22 shows a method 2200 of tuning an antenna of a radiohead circuit in a schematic view according to various aspects. In some aspects, the method 2200 may be an exemplary implementation of the method 2100. It is understood that the aspects described in relation to the method 2200 may apply also to the method 2100, and vice versa. It is also understood that, although not shown, an analogous exemplary implementation may be provided for the method 2150.

The method 2200 may include receiving a radio frequency signal 2202.

In some aspects, received radio frequency signal (e.g., the radio frequency signal 2202, the first radio frequency signal, the second radio frequency signal, etc.) may be configured as a frame signal (e.g., a first frame signal, a second frame signal, etc.), e.g. may include a frame structure, for example configured in accordance with communication standards, such as IEEE 802.11 standards. Illustratively, a received (or a transmitted) radio frequency signal may be configured as described above in relation to the radio frequency signal 1900, 1900*a*, 1900*b*, 1900*c* in FIG. 19A and FIG. 19B.

In some aspects, the frame signal (e.g., the first frame signal, the second frame signal, etc.) may be configured according to different PHY Protocol Data Unit (PPDU) formats, for example according to at least one of a high-throughput PHY Protocol Data Unit (HT PPDU) format, a very high-throughput PHY Protocol Data Unit (VHT PPDU) format, and a high energy PHY Protocol Data Unit (HE PPDU) format (or high energy single user PHY Protocol Data Unit (HE SU PPDU) format), as described above, for example in relation to FIG. 19B.

The method 2200 may include, 2204, calculating RX tuning parameters in accordance with the received radio frequency signal (e.g., the received frame signal, for example an n-th PPDU signal, PPDU(n)). The RX tuning parameters may be understood as the tuning configuration change described above and/or as the reception scheme change described above, e.g. as the next tuning configuration and/or reception scheme to apply for receiving the next radio frequency signal. The method 2200 may include calculating the Rx tuning parameters based on the entire received frame, e.g. based on the signal to noise ratio or error vector magnitude associated with the entire received frame.

The method 2200 may include, 2206, applying the determined Rx tuning parameters, e.g. the determined tuning configuration change (and/or reception scheme change) or the new tuning configuration (and/or new reception scheme) determined in accordance with the tuning configuration change (and/or with the reception scheme change). Illustratively, the method 220 may include applying the RX tuning parameters, e.g. the new tuning configuration and/or new reception scheme, prior to receiving the next radio frequency signal, e.g. the next frame.

The method 2200 may include receiving a further radio frequency signal 2208, e.g. a further frame signal, for example an further PPDU signal, PPDU(n+1).

In some aspects, the second implementation may be described as interframe antenna tuning. Interframe may be a slow flow, which may be done by the framework layer or MAC layer, and may look at the entire frames (e.g., at the signal to noise ratio or the error vector magnitude of the entire frames).

In some aspects, the tuning of signal reception (e.g., the method 2100) and/or signal transmission (e.g., the method 2150) may be carried out after each received/transmitted radio frequency signal. In some aspects, the tuning of signal reception (e.g., the method 2100) and/or signal transmission (e.g., the method 2150) may be carried out at periodic intervals, e.g. every 1 ms, every 5 ms, every 10 ms, only as examples. Illustratively, in some aspects, the tuning of signal reception and/or transmission may be carried out after a (e.g., predefined) number of radio frequency signals have been received and/or transmitted, e.g. one, two, five, ten signals, only as a numerical example.

FIG. 23 shows a communication device 2300 in a schematic view, according to various aspects. In some aspects, the communication device 2300 may be configured as the communication device described in relation to FIG. 2 and/or in relation to FIG. 8. In some aspects, the communication device 2300 may be configured as the communication device 1100 described in relation to FIG. 11A and FIG. 11B and/or as the communication device 1500 described in relation to FIG. 15A and FIG. 15B. It is understood that the configuration shown in FIG. 23 serves only as example, and the communication device 2300 (and/or the radiohead circuit 2302) may include additional, less, or alternative components with respect to those shown.

The communication device 2300 may include a radiohead circuit 2302. In some aspects, the radiohead circuit 2302 may be configured as the radiohead circuit described in relation to FIG. 1 to FIG. 8. In some aspects, the radiohead circuit 2302 may be configured as the radiohead circuit 1800 described in relation to FIG. 18.

The radiohead circuit 2302 may include an antenna 2304. As described above, an antenna (e.g., the antenna 2304) may be integrated in the radiohead circuit or an antenna may be external to the radiohead circuit and only coupled with the radiohead circuit (e.g., with a frontend circuit, not shown).

The radiohead circuit 2302 may include an antenna tuning circuit 2306 configured to tune the antenna 2304. The antenna tuning circuit 2306 configured to apply one or more tuning configurations of (in some aspects, to or for) the antenna 2304. In an exemplary case, the antenna tuning circuit 2306 may be configured to tune the antenna 2304 by applying a first tuning configuration. In some aspects, the antenna 2304 and the antenna tuning circuit 2306 may be coupled to one another (e.g., via or through a frontend circuit). In some aspects, the antenna tuning circuit 2306 may be configured as the antenna tuning circuit 1804 described in relation to FIG. 18.

The antenna 2304 may be configured to receive one or more radio frequency signals with the applied tuning configuration. In the exemplary case described herein, the antenna 2304 may be configured to receive a first radio frequency signal 2308 while the first tuning configuration is applied (in other words, while the antenna tuning circuit 2306 applies or is applying the first tuning configuration). In some aspects, the first radio frequency signal 2308 may be configured as described above, for example in relation to FIG. 19A, FIG. 19B, FIG. 21A, FIG. 21B, and FIG. 22, e.g. the first radio frequency signal 2308 may be configured as a (first) frame signal. In some aspects, the antenna 2304 may receive a radio frequency signal (e.g., the first radio frequency signal 2308, or further radio frequency signals) via a communication channel between the communication device 2300 and a device (e.g., a communication device, for example a mobile device, which may include another radiohead circuit) external to the communication device 2300.

The communication device 2300 may include one or more processors 2310 configured to process the one or more received radio frequency signals. In some aspects, the one or more processors 2310 may be configured as the one or more processors 1106 described in relation to FIG. 11A and FIG. 11B, and/or as the one or more processors 1510 described in relation to FIG. 15A and FIG. 15B. As described above, the one or more processors 2310 may be digitally coupled with one, or more than one, or each radiohead circuit of the communication device 2300, e.g. with the radiohead circuit 2302, for example via a respective digital link (e.g., the digital link 2312). In some aspects, the one or more processors 2310 may include a system on chip. In some aspects, the one or more processors 2310 may include a modem. The one or more processors 2310 may be configured to carry out processing in the frequency domain (e.g., to process the received first radio frequency signal 2308, and any further received radio frequency signal, in the frequency domain, e.g. after conversion of a received signal from the time domain into the frequency domain by one or more processors of the radiohead circuit 2302).

The one or more processors 2310 may be configured to determine a respective signal parameter (e.g., a respective signal to noise ratio, a respective error vector magnitude, a respective airlink utilization, or a respective throughput) associated with each received radio frequency signal and the corresponding tuning configuration. In the exemplary case described herein, the one or more processors 2310 may be configured to determine a first signal parameter (e.g., a first signal to noise ratio, a first error vector magnitude, a first airlink utilization, or a first throughput) associated with the received first radio frequency signal 2308 and the first tuning configuration.

The one or more processors 2310 may be configured to determine a tuning configuration change for a (e.g., each) tuning configuration in accordance with the associated signal parameter, as described above in relation to the method 2100. In the exemplary case described herein, the one or more processors 2310 may be configured to determine a first tuning configuration change by using the first signal parameter.

As described above, a received radio frequency signal may be configured as a frame signal. The one or more processors 2310 may be configured to determine a signal parameter associated with a received radio frequency signal in accordance with the entire content of the frame signal (e.g., after the entire frame has been received at the antenna 2304). By way of example, the one or more processors 2310 may be configured to determine the first signal parameter in accordance with the entire content of the received first radio frequency signal, e.g. of the received first frame signal.

In some aspects, the antenna tuning circuit 2306 may be configured to tune the antenna by applying a tuning configuration adapted in accordance with the tuning configuration change determined by the one or more processors 2310. In the exemplary case described herein, the antenna tuning circuit 2306 may be configured to tune the antenna by applying a second tuning configuration. The second tuning configuration may be determined in accordance with the first tuning configuration and the first tuning configuration change (e.g., the one or more processors 2310 may be configured to determine the second tuning configuration in accordance with the first tuning configuration and the first tuning configuration change).

As described above, for example in relation to FIG. 17 to FIG. 20, a tuning configuration of an antenna may be understood herein as a combination of one or more parameters that influence the way the antenna receives (or transmits) a radio frequency signal. By way of example, a tuning configuration may include an impedance tuning, an aperture tuning, and/or a tuning of the gain of the antenna. In the exemplary configuration described herein, the first tuning configuration may include a first impedance tuning and/or a first aperture tuning and/or a first tuning of the gain of the antenna 2304. The second tuning configuration may include a second impedance tuning and/or a second aperture tuning and/or a second tuning of the gain of the antenna 2304.

A tuning configuration change may represent a change in one or more of the parameters that influence the way the antenna receives (or transmits) a radio frequency signal. A change may include, for example, an increase or a decrease of the parameter, e.g. an increase or a decrease of the impedance, of the aperture, and/or of the gain of the antenna. In some aspects, a tuning configuration change (e.g., the first tuning configuration change, a second configuration change, and further tuning configuration changes) may represent a change in the impedance of the antenna 2304. Additionally or alternatively, a tuning configuration change may represent a change in the aperture of the antenna 2304. Additionally or alternatively, a tuning configuration change may represent a change in the gain of the antenna 2304.

In some aspects, the antenna tuning circuit 2306 (as described above for the antenna tuning circuit 1804) may include one or more controllable elements configured to control the impedance and/or the aperture and/or the gain of the antenna 2302. The one or more controllable elements may include, for example, one or more switches, one or more controllable resistors, one or more controllable capacitors, one or more controllable inductors, and the like. Applying a tuning configuration, or a tuning configuration change, may include, in some aspects, controlling the one or more controllable elements to provide a (different) configuration of the one or more controllable elements. Illustratively, the antenna tuning circuit 2306 may include a matching network associated with (e.g., coupled to) the antenna 2304 (in some aspects, a plurality of matching networks). An antenna tuning configuration may include, in some aspects, a configuration of the matching network. A tuning configuration change may include, in some aspects a change in a configuration of the matching network. In some aspects, the antenna tuning circuit 2306 may include a controller configured to control the controllable elements to change the configuration. In some aspects, the antenna tuning circuit 2306 may be configured to be controlled by one or more processors, e.g. of the radiohead circuit 2302 and/or of the communication device 2300.

As described above, for example in relation to FIG. 11A, FIG. 11B, FIG. 15A, and FIG. 15B, a radiohead circuit, e.g. the radiohead circuit 2302, may include a transceiver chain configured to receive a radio frequency signal via the antenna (e.g., via the antenna 2304) and to transmit a radio frequency signal via the antenna. In some aspects, the transceiver chain may include an antenna tuning circuit (e.g., the antenna tuning circuit 2306). As described above, not shown in FIG. 23, a radiohead circuit may include a frontend circuit providing an interface between the transceiver chain and the antenna. In some aspects, a tuning configuration may include a gain of an amplifier circuit, e.g. of a low noise amplifier circuit, of the transceiver chain or of the frontend circuit of the radiohead circuit 2302. Illustratively, applying a tuning configuration may include, in some aspects, applying a certain gain of the low noise amplifier. A tuning configuration change may include, in some aspects, a change (e.g., an increase or a decrease) of the gain of the low noise amplifier.

In some aspects, the signal reception and the antenna tuning may continue further, after the second tuning configuration has been applied, e.g. as long as the external device is transmitting or until an optimum tuning configuration has been found (e.g., the tuning configuration providing the greatest signal to noise ratio, the smallest error vector magnitude, or the target airlink utilization or throughput).

The antenna tuning circuit 2306 may be configured to tune the antenna 2304 by applying the adapted tuning configuration prior to receiving a further (e.g., subsequent) radio frequency signal (or at periodic intervals, as described above). In the exemplary case described herein, the antenna tuning circuit 2306 may configured to tune the antenna 2304 by applying the second tuning configuration prior to receiving a second radio frequency signal, e.g. a second frame signal.

The antenna 2304 may be configured to receive the second radio frequency signal while the second configuration is applied (in other words, while the antenna tuning circuit 2306 applies or is applying the second tuning configuration). The one or more processors 2310 may be configured to determine a second signal parameter (e.g., a second signal to noise ratio, a second error vector magnitude, a second airlink utilization, or a second throughput) associated with the received second radio frequency signal and the second tuning configuration. The one or more processors 2310 may be configured to determine a second tuning configuration change by using the second signal parameter. The antenna tuning circuit 2306 may be configured to tune the antenna 2304 by applying a third tuning configuration. The third tuning configuration may be determined in accordance with the second tuning configuration and the second tuning configuration change (e.g., the one or more processors 2310 may be configured to determine the third tuning configuration in accordance with the second tuning configuration and the second tuning configuration change).

In some aspects, the one or more processors 2310 may be configured to determine a tuning configuration change by using the signal parameter associated with the immediately antecedent tuning configuration change. The one or more processors 2310 may be configured to determine a tuning configuration change, for example, by comparing the current signal parameter with the immediately previous signal parameter (or with all the previous signal parameters associated with the same device transmitting the signals). By way of example, the one or more processors 2310 may be configured to determine the second tuning configuration change in accordance with a comparison of the second signal to noise ratio with the first signal to noise ratio. Additionally or alternatively, the one or more processors 2310 may be configured to determine the second tuning configuration change in accordance with a comparison of the first error vector magnitude with the second error vector magnitude. Additionally or alternatively, the one or more processors 2310 may be configured to determine the second tuning configuration change in accordance with a comparison of the first airlink utilization with the second airlink utilization, or with a comparison of the first throughput with the second throughput.

As described above in relation to the method 2100, the one or more processors 2310 may be configured to determine a tuning configuration change of the same type as the immediately previous tuning configuration change in case the signal parameter is improving (e.g., in case the signal to noise ratio is increasing, in case the error vector magnitude is decreasing, or in case the airlink utilization and the throughput are converging towards a respective target value), or a tuning configuration change of opposite type as the immediately previous tuning configuration change in case the signal parameter is not improving (e.g., in case the signal to noise ratio is decreasing or in case the error vector magnitude is increasing or in case the airlink utilization and the throughput are not converging towards a respective target value).

As described above, for example in relation to FIG. 17 to FIG. 20, a signal to noise ratio may the ratio of the power of the radio frequency signal received at the antenna to the power of the noise received (or measured) at the antenna while a tuning configuration is applied. In the exemplary scenario described herein, the one or more processors 2310 may be configured to determine the first signal to noise ratio as a first ratio of the power of the first radio frequency signal 2308 to the noise power received (at the antenna 2304) while the first tuning configuration is applied. The one or more processors 2310 may be configured to determine the second signal to noise ratio as a second ratio of the power of the second radio frequency signal to the noise power received (at the antenna 2304) while the second tuning configuration is applied.

An error vector magnitude may be a magnitude of a difference between one or more symbols included in a received radio frequency signal and one or more expected symbols of the received radio frequency signal. Illustratively, an error vector magnitude may represent a difference between ideal symbols and actual symbols associated with a received radio frequency signal. The one or more processors 2310 may be configured to determine an error vector magnitude in accordance with a difference between one or more actual symbols of a received radio frequency signal and one or more expected symbols of the received radio frequency signal. In the exemplary case described herein, the one or more processors 2310 may be configured to a first error vector magnitude in accordance with a first difference between one or more actual symbols of the received first radio frequency signal 2308 and one or more expected symbols of the received first radio frequency signal 2308. The one or more processors 2310 may be configured to a second error vector magnitude in accordance with a second difference between one or more actual symbols of the received second radio frequency signal and one or more expected symbols of the received second radio frequency signal.

In some aspects, additionally or alternatively, the tuning of the signal reception at the radiohead circuit 2302 may involve a reception scheme according to which the radiohead circuit 2302 receives a radio frequency signal, e.g. as described in relation to the method 2100.

In some aspects, additionally or alternatively, the transceiver chain of the radiohead circuit 2302 may be configured to receive a (first) radio frequency signal via the antenna 2304, e.g. to receive the first radio frequency signal 2308, according to a first reception scheme. The one or more processors 2310 may be configured to determine a first signal parameter associated with the received first radio frequency signal 2308 and the first reception scheme. The one or more processors 2310 may be configured to determine a first reception scheme change by using the first signal parameter.

The one or more processors 2310 (or one or more processors of the radiohead circuit 2302) may be configured to determine a new (e.g., a second) reception scheme in accordance with the first reception scheme and the first reception scheme change.

The transceiver chain may be configured to receive a further (e.g., a second) radio frequency signal via the antenna 2304 according to the second reception scheme. The one or more processors 2310 may be configured to determine a second signal parameter associated with the second received radio frequency signal and the second reception scheme. The one or more processors 2310 may be configured to determine a second reception scheme change by using the second signal parameter.

By way of illustration, the one or more processors 2310 may be configured to determine changes to a reception scheme in accordance with a quality of the communication between the radiohead circuit 2302 and the device (e.g., the other radiohead circuit) transmitting the signal. The reception scheme may be adjusted (e.g., by the one or more processors 2310 or by one or more processors of the radiohead circuit 2302) in accordance with the changes, to improve the signal reception at the radiohead circuit 2302.

In some aspects, additionally or alternatively, a signal transmission of the communication device 2300 may be adjusted, e.g. tuned, for example as described above in relation to method 2150.

In some aspects, a tuning of the antenna 2304 may be carried out in accordance with a feedback signal received from the device (e.g., another radiohead circuit) to which the radio frequency signal has been transmitted. Illustratively, in the exemplary scenario described herein, the transceiver chain of the radiohead circuit 2302 may be configured to transmit a first radio frequency signal via the antenna 2304 while the first tuning configuration is applied (in other words, while the antenna tuning circuit 2306 applies or is applying the first tuning configuration). In some aspects, a transmitted radio frequency signal, e.g. the transmitted first radio frequency signal may be configured as described above, for example in relation to FIG. 19A, FIG. 19B, FIG. 21A, FIG. 21B, and FIG. 22, e.g. a transmitted radio frequency signal may be configured as a (first) frame signal.

The one or more processors 2310 may be configured to receive one or more feedback signals indicative of signal parameters associated with a respective transmitted radio frequency signal. In the exemplary scenario described herein, the one or more processors 2310 may be configured to receive a first feedback signal indicative of a first signal parameter associated with the transmitted first radio frequency signal and the first tuning configuration.

The one or more processors 2310 may be configured to determine tuning configuration changes in accordance with the received feedback. Illustratively, the one or more processors 2310 may be configured to determine a first tuning configuration change by using the first signal parameter (or by using the first feedback signal), as described above in relation to the tuning of the signal reception.

As described, for example, in relation to method 2150, the feedback signal may be provided by the device (e.g., the radiohead circuit) receiving the transmitted radio frequency signal. The one or more processors 2310 may be configured to receive a feedback signal from the device that received the transmitted radio frequency signal, e.g. via over-the-air communication, via communication between radiohead circuits of the communication device 2300 and of the device that received the signal, as examples.

In some aspects, the antenna tuning circuit 2306 may be configured to tune the antenna by applying a tuning configuration adapted in accordance with the tuning configuration change determined by the one or more processors 2310, e.g. by applying a second tuning configuration determined in accordance with the first tuning configuration and the first tuning configuration change. Illustratively, the one or more processors 2310 may be configured to determine a second tuning configuration in accordance with the first tuning configuration and the first tuning configuration change, and the antenna tuning circuit 2306 may be configured to tune the antenna by applying the second tuning configuration.

In some aspects, the signal transmission and the antenna tuning may continue further, after the second tuning configuration has been applied, e.g. at periodic intervals or as long as an optimum tuning configuration has been found (e.g., the tuning configuration providing the greatest signal to noise ratio, the smallest error vector magnitude, or the target airlink utilization or throughput).

The antenna tuning circuit 2306 may be configured to tune the antenna 2304 by applying the adapted tuning configuration prior to transmitting a further (e.g., subsequent) radio frequency signal (or at periodic intervals, as described above). In the exemplary case described herein, the antenna tuning circuit 2306 may configured to tune the antenna 2304 by applying the second tuning configuration prior to transmitting a second radio frequency signal, e.g. a second frame signal.

The one or more processors 2310 may be configured to receive a second feedback signal indicative of a second signal parameter (e.g., a second signal to noise ratio, a second error vector magnitude, a second airlink utilization, or a second throughput) associated with the transmitted second radio frequency signal and the second tuning configuration. The one or more processors 2310 may be configured to determine a second tuning configuration change by using the second signal parameter. The antenna tuning circuit 2306 may be configured to tune the antenna 2304 by applying a third tuning configuration. The third tuning configuration may be determined in accordance with the second tuning configuration and the second tuning configuration change (e.g., the one or more processors 2310 may be configured to determine the third tuning configuration in accordance with the second tuning configuration and the second tuning configuration change).

In some aspects, additionally or alternatively, the tuning of the signal transmission by the radiohead circuit 2302 may involve a transmission scheme according to which the radiohead circuit 2302 (e.g., its transceiver chain) transmits a radio frequency signal, e.g. as described in relation to the method 2150.

In some aspects, additionally or alternatively, the transceiver chain of the radiohead circuit 2302 may be configured to transmit a (first) radio frequency signal via the antenna 2304 according to a first transmission scheme. The one or more processors 2310 may be configured to receive a first feedback signal indicative of a first signal parameter associated with the transmitted first radio frequency signal and the first transmission scheme. The one or more processors 2310 may be configured to determine a first transmission scheme change by using the first signal parameter. It is understood that the aspects described herein in relation to the configuration of the communication device 2300, of the radiohead circuit 2302 (and of its components, e.g. the transceiver chain and the antenna), and of the one or more processors 2310 for the tuning of the reception may be combined with the aspects described herein in relation to the configuration of the communication device 2300, of the radiohead circuit 2302 (and of its components, e.g. the transceiver chain and the antenna), and of the one or more processors 2310 for the tuning of the transmission, and vice versa.

The one or more processors 2310 (or one or more processors of the radiohead circuit 2302) may be configured to determine a new (e.g., a second) transmission scheme in accordance with the first transmission scheme and the first transmission scheme change.

The transceiver chain may be configured to transmit a further (e.g., a second) radio frequency signal via the antenna 2304 according to the second transmission scheme. The one or more processors 2310 may be configured to receive a second feedback signal indicative of a second signal parameter associated with the transmitted second radio frequency signal and the second transmission scheme. The one or more processors 2310 may be configured to determine a second transmission scheme change by using the second signal parameter.

By way of illustration, the one or more processors 2310 may be configured to determine changes to a transmission scheme in accordance with a quality of the communication between the radiohead circuit 2302 and the device (e.g., the other radiohead circuit) receiving the signal. The transmission scheme may be adjusted (e.g., by the one or more processors 2310 or by one or more processors of the radiohead circuit 2302) in accordance with the changes, to improve the signal transmission by the radiohead circuit 2302.

In some aspects, the communication device 2300 (and/or the radiohead circuit 2302) may include a memory (not shown), as described above. The memory may store one or more tuning configurations, and/or one or more reception schemes and/or one or more transmission schemes. The memory may store, in some aspects one or more tuning configuration changes, and/or one or more reception scheme changes, and/or one or more transmission scheme changes (e.g., associated with different signals, or with different devices, or with different scenarios, as examples), e.g. determined as described above. The antenna tuning circuit 2306 may be configured to tune the antenna 2304 by applying one of the tuning configurations stored in the memory and/or by adapting a tuning configuration by using one of the tuning configuration changes stored in the memory, for example in accordance with current received signal, or with the current transmitting device, or with the current scenario. In some aspects, the one or more processors 2310 (or a transceiver chain of the radiohead circuit 2302) may be configured to adapt a reception scheme or a transmission scheme by using one of the reception scheme changes or transmission scheme changes stored in the memory. The one or more of tuning configurations and/or reception schemes and/or transmission schemes may be ordered, e.g. according to predetermined parameters that may vary from one configuration to the next or from one scheme to the next. A tuning configuration and/or a reception scheme and/or a transmission scheme may be changed by selecting one of the immediately adjacent configurations or schemes, e.g. to monitor the effects on the signal without abrupt modifications.

Since the plurality of radiohead circuits in the radiohead systems may be distributed in different locations, i.e., the radiohead circuits may not be co-located, there may be no common reference clock source for the radiohead circuits to rely on. Accordingly, aspects of the present disclosure are directed towards minimizing drifting of the internal reference clock sources of the different radiohead circuits with respect to one another in order to effectively implement and maximize different communication schemes, e.g. MIMO, beamforming, etc. These communication schemes may rely on a high level of synchronization between the plurality of radiohead circuits in order to maximize transmission throughput and minimize errors in transmissions, among other factors. The synchronization signals distributed to each of the radiohead circuits as described herein may be, for example, the same synchronization signals, different synchronization signals that are synchronous with one another, different synchronization signals that are asynchronous with one another, synchronization signals that are synchronous to external reference and/or timing signals that have synchronous or asynchronous changes based on a configuration or other factors.

In some aspects, a communication device employing a distributed radiohead system (DRS) may be configured to wirelessly synchronize one or more radiohead circuits with an external device. Accordingly, one or more of the radiohead circuits of a communication device may be configured to be wirelessly synchronized with an external device in order to facilitate communications such a MIMO or beamforming, for example. Accordingly, the plurality of radiohead circuits may achieve synchronization of their potentially different clock signals via a remote fixed reference clock located at an external device. Furthermore, the schemes described herein may allow for a simplified internal component reference scheme within mobile communication devices.

In some aspects, the external device may be a wireless access point (AP) such as a wireless local area network (WLAN) AP configured to operate via a WLAN communication protocol, for example. The external device may include a reference clock providing the wireless communication system environment with an accurate reference clock signal. This accurate reference clock signal may provide timing and/or frequency parameters for one or more devices to operate via one or more radio access technologies (RATs). The communication protocol implemented by the external device, e.g. a WLAN protocol implemented by a WLAN AP, may rely on pilot slots for communications. The pilot slot times may be used to transmit a regional signal from the external device to a communication device with a plurality of radiohead circuits. The radiohead circuits of the communication device may then be configured to use the received pilots as an input to a time-to-digital converter (TDC) to sample the radiohead internal reference clock source. As a result of these samples, a correction signal may be obtained in order to correct the internal reference clock source so that it generates a reference clock signal that is synchronized with the reference clock signal of the external device.

The plurality of radiohead circuits, therefore, may each include an internal reference clock source such a local oscillator. The internal reference clock source may be configured to provide a local oscillator (LO) circuit of each of the radiohead circuits with a reference clock signal. The LO oscillator circuit may provide other components of the radiohead, such as one or more components of a transceiver circuit (i.e., transceiver chain), with a LO signal to utilize for processing received wireless signals and processing signals for transmission.

In some aspects, the plurality of radiohead circuits may be wirelessly connected to an external device, such as an AP. Accordingly, the plurality of radiohead circuits may use the AP as a point of reference for achieving synchronization between the radiohead circuits. This may be achieved by using the AP to analyze the signal pilots of either of the radiohead circuits and transmit back to the radiohead circuits the correction information which may subsequently be used to tune their internal reference sources thereby synchronizing it to that of the AP. Alternatively, the AP can itself be a source of pilot signals, which upon reception in a radiohead circuit, may be analyzed to tune the internal reference clock sources of each of the radiohead circuits so that they lock to the clock signal of the AP. In both cases, all of the radiohead circuits become synchronized to the AP and hence among themselves as well. An LO circuit of each of the radiohead circuits, e.g. a digital phase locked loop (DPLL), may be tuned to provide a LO signal to transceiver components of the radiohead, where the LO signal may be synchronized with that of the other radiohead circuits. In this sense, the schemes described herein may be implemented to align the phases of the LO signals of multiple radiohead circuits, thereby improving efficiency and maximizing throughput of the wireless communication system.

In some aspects, the external device may be able to identify that multiple radiohead circuits belong to a single communication device employing a DRS based on a unique identifier attributable to the communication device, e.g. a Medium Access Control (MAC) signature.

FIG. 24 shows an exemplary diagram of a communication device 2400 and an external device 2450 for implementing a wireless reference synchronization scheme according to some aspects. It is appreciated that FIG. 24 may be simplified for purposes of this explanation.

Communication device 2400 may include a plurality of radiohead circuits, although only one radiohead 2401 is shown for purposes of simplicity. Each of the plurality of radiohead circuits may include an antenna 2430, a transmitter 2402 and receiver 2404 (collectively, a transceiver circuit or transceiver chain), a DPLL 2406 which provides the transmitter 2402 and/or receiver 2404 with a LO signal (only shown for transmitter 2402 in FIG. 24), a digital loop filter (DLF) 2408, and an internal reference clock source 2410. The internal reference clock source may be crystal oscillator, a thin-film bulk acoustic resonator, a bulk acoustic wave resonator, a microelectromechanical system (MEMS) oscillator, or the like.

Generally speaking, the internal reference clock source 2410 provides the DPLL 2406 with a reference clock signal, which the DPLL 2406 uses to provide the other components of the communication device with a LO signal. The transmitter 2402, for example, may be configured to communicate via the antenna 2430 using a continuous waveform (CW) LO signal. In some aspects, these transmissions may serve as training pilot symbols.

The external device 2450, e.g. an AP, may be configured to receive these training pilots with the external device's receiver circuit (RX 2454) and use its TDC 2456 to obtain samples of the CW signal transmitted by communication device 2400 using an external device reference clock source 2458. It may then produce correction pilots based on the samples for communication back to communication device 2400 via the external device transmitter 2452.

The communication device 2400 may then receive the correction pilots at the receiver 2404, and use the received correction pilots to amend the contents of the DLF 2408. Based on the value (e.g., a digital value) stored in the DLF 2408 and/or the correction pilots received from the external device 2450, the communication device may be configured to tune its internal reference clock source 2410 so that the reference clock signal communicated to the DPLL is altered so as to produce a LO signal which is synchronized with the external device 2450.

FIG. 25 shows an exemplary process flowchart 2500 for a communication device with a plurality of radiohead circuits to synchronize the radiohead circuits using an external device, for example, as shown in FIG. 24, according to some aspects. It is appreciated that process flowchart 2500 may be simplified for purposes of this explanation.

Process flowchart 2500 illustrates a synchronization scheme in which the communication device with one or more radiohead circuits transmits a constant waveform (CW) signal to an external device (e.g., an AP). This CW signal may be based on a LO signal generated by one or more of the radiohead circuits of the communication device, e.g., by 2400 as shown in FIG. 24. This signal serves as a training pilot originating at the communication device radiohead circuit and bound to an external device. The external device, e.g. external device 2450, may sample the received training pilot signal with an error measurement circuit (e.g., TDC 2456) utilizing its own internal reference clock (e.g. 2458). Based on this sampling, the external device may determine a correction to transmit in a correction signal feedback to the communication device with the one or more radiohead circuits. The correction signal may, for example, include correction pilots with a frequency difference value. Each of the one or more radiohead circuits of the communication device (e.g., 2400) may receive the correction signal at its receiver (e.g., RX 2404) and feed a digital value to DLF 2408 based on the frequency difference value in the correction signal. The DLF 2408 may then amend its input to the internal reference clock source (e.g., 2410) in order to modify the REF signal provided to DPLL 2406, which, in turn, generates an amended LO signal.

Process flowchart 2500 may include the communication device transmitting a CW signal (e.g., training pilot) from each of one or more radiohead circuits of the communication device in 2502; receiving, at an external device, the CW signal and sampling the CW signal with an error measurement circuit of the external device using a reference clock source of the external device in 2504; generating a correction based on the sampling of the CW signal using the reference clock source of the external device in 2506; transmitting the correction back to the radiohead circuit of the communication device in 2508; and amending the internal clock source of the radiohead circuit of the communication device based on the correction in 2510. The correction may be in the form of correction pilots in a feedback correction signal as discussed with respect to FIG. 24, for example. The CW signal received by the external device may be an analog signal, and the TDC of the external device may generate digital corrections based on the sampling of the CW signal using the reference clock source of the external device.

FIG. 26 shows a series of exemplary diagrams providing a wireless reference synchronization scheme according to some aspects. It is appreciated that FIG. 26 may be simplified for purposes of this explanation. FIG. 26 depicts an alternative arrangement (to that depicted in FIG. 24) in which the external device serves as the origin of the CW training pilot signals and the communication device (such as 2400) uses its internal hardware to analyze these pilot signals and amend its internal reference accordingly, synchronizing it to the reference clock of the external device (e.g. AP).

The top most diagram shows communication device 2600 and an external device e.g., a WLAN AP (AP) 2650. Signal p(t) represents analog electric signals (continuous voltage/current) representing continuous time waveforms of the training pilot signals transmitted by the AP 2650 and received by the communication device 2600.

Communication device 2600 is shown with greater detail in the middle diagram of FIG. 26. Communication device 2600 may include a modem circuit 2620 and one or more radiohead circuits (RH) 2610, although for purposes of simplicity, only one RH 2610 is shown.

RH 2610 may include an antenna 2611, a radio frequency (RF) front-end (FE) circuit 2612 including a low-noise amplifier (LNA) 2613, as well as a receiver (RX) circuit 2614. The RX circuit 2614 may include a number of components for processing signals received by the RH 2610, including a DC 2615, a baseband circuit (BB) 2616, and an analog-to-digital converter (ADC) 2617, among others.

RH 2610 may also include a DPLL 2618 with a TDC 2619, a transmitter (TX) 2630, and internal reference clock source REF 2640. The antenna 2611 of RH 2610 may receive p(t) from AP 2650 and, after amplification by the LNA 2613, forward the received signal p(t), which may include the training pilots, to DPLL 2618 and the RX circuit 2614 chain. The training pilots may be processed by RX circuit 2614 chain and forwarded to modem circuit 2620, which may be configured to detect a frequency of the received training pilot signal.

In additional, the TDC 2619 in the DPLL 2618 may be configured to obtain samples of the training pilots using the internal reference clock source REF 2640 and provide the samples via a digital electric signal e[n] to the modem circuit 2620, where e[n] represents digital electric signals with discrete voltage/current levels representing the discrete time waveforms of phase errors derived by the TDC 2619 from the sampling process. Although not shown in FIG. 26, DPLL 2618 may also include a digital loop filter (DLF) and a digitally controlled oscillator (DCO). The internal reference clock source REF 2640 may be, for example, a crystal oscillator, a thin-film bulk acoustic resonator, a microelectromechanical system (MEMS) oscillator, or a bulk acoustic wave resonator.

Based on the detected frequency of the sampled training pilots from TDC 2619, modem circuit 2620 may be configured to perform an evaluation. This evaluation may include determining a discrepancy between the detected frequency of the sampled training pilots and an a priori known frequency of the training pilots. Modem circuit 2620 may then provide a frequency CW (FCW) to the TDC 2619 and may also provide d[n] to the internal reference clock source REF 2640, where d[n] represents a digital electric signal with discrete voltage/current levels representing the discrete time waveforms of frequency settings applied to the internal reference clock source REF 2640. The internal reference clock source REF 2640 may then modify the output r(t) provided to both the RX circuit 2614 and the TX circuit 2630, which in turn provides a modified LO signal to the RX circuit 2614, and may also provide the modified LO signal to the TX signal, although this is not explicitly shown in FIG. 26.

RH 2610 may be digitally coupled to modem circuit 2620 via one or more digital links, e.g., high throughput digital links. The digital links may be, for example, flexible flat cables, flexible printed circuit cables, or the like. The digital link may provide bi-directional communication between the modem circuit 2620 and each of the RHs 2610 in accordance with an asynchronous time-based protocol.

AP 2650 may also include its own modem circuit 2651, antenna 2652, and reference clock source REF 2653, as well as RX circuit 2654 and TX circuit 2655. Reference clock source REF 2653 may be a crystal oscillator or the like. The reference clock source REF 2653 may provide RX circuit 2654 and TX circuit 2655 (collectively, transceiver circuit) with x(t), which represents analog electric signals with a continuous voltage/current representing continuous time waveforms of the REF output. This x(t) may provide the basis for communicating p(t) from the AP 2650.

FIG. 27 shows an exemplary process flowchart 2700 according to some aspects, for example, with respect to the operations depicted in FIG. 26. It is appreciated that flowchart 2700 may be simplified for purposes of this explanation.

Process 2700 may include the AP transmitting training pilots based on a reference clock output of the AP 2702 and may further include one or more RHs of a communication device listening for and receiving the training pilots in 2704. In 2706, the RH samples the training pilots (e.g., by a TDC) using an internal reference clock source. These samples may be digitally transmitted to a modem of the communication device, which analyzes them to estimate the frequency of the training pilots. Based on the estimated frequency of the sampled training pilots, the modem may calculate the distance to the a priori known training pilot frequency which is detected in 2708. The modem may then initiate a tuning of the REF source and/or the LO circuits (e.g., such as DPLLs) of the RHs aiming at elimination of that distance in 2710.

In some aspects, FIG. 24 to FIG. 27 may be configured to operate in accordance with one or more of the examples set forth below in the example section.

In some scenarios, however, there may be no external device available to provide a common reference clock signal to each of the plurality of radiohead circuits of a communication device. In these cases, the radiohead circuits may need to be configured to generate a global virtual reference signal amongst themselves.

In some aspects, in the scenario that there is no central reference clock available to provide a common reference clock signal for the radiohead circuits, the radiohead circuits of a communication device may be configured to generate a virtual common reference clock signal. In doing so, the radiohead circuits may thereby maintain a common alignment amongst themselves in order to continue to perform wireless communications in an effective manner.

The benefits offered by such configurations and implementations provide for achieving synchronization between the radiohead circuits and allows for an easy way to implement a controlled phase shift in beam steering, for example. Furthermore, these implementations do not rely on an additional, central reference physical clock and allows for the radiohead circuits to be located apart from one another. These implementations are also highly configurable and can support a shift from single-input, single-output (SISO) to MIMO since they are not based on excess injected phase but rather on trimming of the internal reference clock source, e.g. resonator capacitance trimming.

In some aspects, the virtual common reference signal may be generated according to two options depending on whether there is an error measurement circuit, such as a main board TDC, commonly available to the plurality of radiohead circuits or not.

In the scenario that there is no commonly available error measurement circuit, the plurality of radiohead circuits may each be configured with a controlled reference loop. The controlled reference loop in each radiohead circuit may include an error measurement circuit, e.g. a TDC, in addition to a DLF and the internal reference clock source. The internal reference clock source may be a crystal oscillator, a thin-film bulk acoustic resonator, a microelectromechanical system (MEMS) oscillator, or a bulk acoustic wave resonator, for example, which provides a DPLL of the respective radiohead circuit with a reference clock signal so that the DPLL may provide the components of the radiohead circuit (e.g., in the transceiver) with a LO signal.

FIG. 28 shows an exemplary diagram 2800 for two radiohead circuits, a first radiohead circuit RH1 2802 and a second radiohead circuit RH2 2822, configured to align the phases of their respective internal reference clock sources, REF 2808, 2828, according to some aspects. It is appreciated that diagram 2800 may be simplified for purposes of this explanation. For example, although two radiohead circuits (RH1 2802 and RH2 2822) are shown, it is appreciated that the concept described herein may be scaled to other numbers of radiohead circuits, e.g. three or more.

Each of radiohead circuits RH1 2802 and RH2 2822 may include a TDC 2804, 2824, a DLF 2806, 2826, an internal reference clock source REF 2808, 2828, and a radio frequency (RF) DPLL 2810, 2830. The internal reference clock source REF 2808, 2828 may generate a reference signal for the RF DPLL 2810, 2830, which in turn generates a LO signal for the respective components of the radiohead circuit 2802, 2822.

In diagram 2800, $r_{1,2}(t)$ represent analog electric signals (of a continuous voltage/current) representing the continuous time waveforms of the internal reference clock source REF 2808, 2828 outputs in RH1 2802 and RH2 2822, respectively; $d_{1,2}[n]$ represent digital electric signals (of a discrete voltage/current level) representing the discrete time waveforms of frequency settings applied to the internal reference clock source REF 2808, 2828 in RH1 2802 and RH2 2822, respectively; and $e_{1,2}[n]$ represent digital electric signals (of a discrete voltage/current level) representing the discrete time waveforms of phase errors derived from the TDC 2804, 2824 sampling process for RH1 2802 and RH2 2822, respectively.

The TDC 2804, 2824 sampling process may include each of the TDCs 2804, 2824 of respective radiohead circuits 2802, 2822 receiving the output of the internal reference clock source 2808, 2828 of its own respective radiohead circuit 2802, 2822 as well as the output of the internal reference clock source 2808, 2828 of the other radiohead circuit 2802, 2822. In other words, the signals emanating from the internal reference clock sources REFs 2808, 2828 are cross-transmitted to the other radiohead circuits 2802, 22822, e.g., in addition to the REF 2808 of RH1 2802 transmitting the output to the TDC 2804 in RH1 2802, it also transmits it to the TDC 2824 of RH2 2822, and vice versa. These cross-transmitted signals may then be divided down by a constant ratio to form TDC clock signals, which are then used to sample the output signals from the internal reference clock sources 2808, 2828. Based on these samples, phase error signals are computed, $e_{1,2}[n]$, and fed to the DLF 2806, 2826. The DLF 2806, 2826 filters the phase errors and cross-amends the internal reference clock source REF frequencies, which results in the establishment of a global reference signal that is fed to each respective RF DPLL 2810, 2830.

FIG. 29 shows an exemplary process flowchart 2900 for a communication device with a plurality of radiohead circuits to generate a global virtual reference signal for the plurality of radiohead circuits according to some aspects. It is appreciated that flowchart 2900 may be simplified for purposes of this explanation.

Process 2900 may include both radiohead circuits (RHs) having a high frequency internal reference clock sources (REFs) 2902 and cross-transmitting (CT-ing) the signals emanating from the REFs to alternative RHs 2904. The process may also include dividing down the cross-transmitted signals by a constant ratio to form a TDC clock at each of the plurality of radiohead circuits 2906 and may further include using the TDC clock to sample output signals of the internal reference clock source at each of the plurality of radiohead circuits 2908. The process may also include computing phase error signals out of phase samples used by the TDC at each of the plurality of radiohead circuits 2910. The process may further include filtering the phase error signals by a digital loop filter (DLF) in each of the plurality of radiohead circuits 2912. The process may include filtering the phase error signals by a digital loop filter (DLF) in each of the plurality of radiohead circuits 2914.

In another option, there may be a common error measurement circuit for both of the radiohead circuits available, for example, as a TDC on a main board. This main board TDC may be used by the radiohead circuits to generate the global virtual reference signa. The main board TDC may be located, for example, in a modem of the communication device that the radiohead circuits are a part of.

FIG. 30 shows an exemplary diagram 3000 for two radiohead circuits, a first radiohead circuit RH1 3010 and a second radiohead circuit RH2 3030, configured to align the phases of their respective internal reference clock sources, REF 3012, 3032, according to some aspects. It is appreciated that diagram 3000 may be simplified for purposes of this explanation. For example, although two radiohead circuits (RH1 3010 and RH2 3030) are shown, it is appreciated that the concept described herein may be scaled to other numbers of radiohead circuits, e.g. three or more.

Instead of each of the radiohead circuits RH1 3010 and RH2 3030 including a controlled reference loop as described with respect to FIG. 28, FIG. 30 shows RH1 3010 and RH2 3030 sharing a common controlled reference loop via the main board 3020 TDC 3022. Similar to FIG. 28, the signals shown represent analogous signals. That is, $r_{1,2}(t)$ represent analog electric signals (of a continuous voltage/current) representing the continuous time waveforms of the internal reference clock source REF 3012, 3032 outputs in RH1 3010 and RH2 3030, respectively; $d_{1,2}[n]$ represent digital electric signals (of a discrete voltage/current level) representing the discrete time waveforms of frequency settings applied to the internal reference clock source REF 3012,3032 in RH1 3010 and RH2 3030, respectively; and e[n] represents digital electric signals (of a discrete voltage/current level) representing the discrete time waveforms of phase errors derived from the TDC 3022 sampling process for RH1 3010 and RH2 3030, respectively. Of note is that instead of the two $e_{1,2}[n]$ signals calculated by the two TDCs in FIG. 28, in FIG. 30, there is a common e[n] calculated by the main board 3020 TDC 3022 and provided to each of the DLFs 3014, 3034 of the respective radiohead circuits 3010, 3030.

In this scenario, the DLF 3014, 3034 may be narrow so the feedback communicated to it from the main board 3020 TDC 3022 may be slow. Accordingly, time division multiplex (TDM) processes may be employed to re-use exiting interfaces (e.g. cables) for the feedback.

FIG. 31 shows an exemplary process flowchart 2900 for a communication device with a plurality of radiohead circuits to generate a global virtual reference signal for the plurality of radiohead circuits according to some aspects. It is appreciated that flowchart 3100 may be simplified for purposes of this explanation.

Process 3100 may include including an internal reference clock source at each of the plurality of radiohead circuits 3102; transmitting signals emanating from each of the internal reference clock sources to a main board time-to-digital converter (TDC) 3104; dividing, by the main board TDC, down the signal transmitted from one of the internal reference clock sources by a constant ratio to form a TDC clock 3106; using the TDC clock to sample other of the signals transmitted from the other internal reference clock sources 3108; computing a phase error signal from the relative phase samples used by the main board TDC 3110; transmitting the phase error signal back to each of the plurality of radiohead circuits 3112; filtering the phase error signals by a DLF in each of the plurality of radiohead circuits 3114; and modifying the signals emanating from the internal reference clock source based on the filtering to establish the global virtual reference signal 3116.

FIG. 32 shows an exemplary process flowchart 3200 for a communication device with a plurality of radiohead circuits to generate a global virtual reference signal for the plurality of radiohead circuits according to some aspects. It is appreciated that flowchart QVY00 may be simplified for purposes of this explanation.

Process 3200 may include including an internal reference cock source configured to generate a reference clock signal at each of a plurality of radiohead circuits 3202; sharing, by at least one radiohead circuit of the plurality of radiohead circuits, its reference clock signal with one or more of the other plurality of radiohead circuits over one or more communication channels 3204; and tuning, by at least one of the plurality of radiohead circuits, its internal clock source to generate a modified reference clock signal based at least in part on the reference clock signal shared by another one of the plurality of radiohead circuits 3206. The one or more communication channels described as this process may be direct communication channels between the plurality of radiohead circuits as shown, for example, in FIGS. 28 and 30. These communication channels may include, for example, digital and/or analog links between the plurality of radiohead circuits.

In some aspects, FIG. 28 to FIG. 32 may be configured to operate in accordance with one or more of the examples set forth below in the example section.

As described herein, communication devices employing DRS systems may rely on independent clock reference sources on each radiohead circuit for performing communications. Such configurations may be needed in order for regulatory compliance in addition to performing the communications as described herein. Various wireless communication schemes and mechanisms, such as MIMO and beamforming to name a few examples, require accurate frequency alignment and phase tracking between the multiple radiohead circuits in order to operate effectively.

In addition to the various synchronization schemes described in this disclosure, e.g. the wireless synchronization scheme of various radiohead circuits with an external device or the generation of a virtual common reference signal by cross-talk between the radiohead circuits, the DRS system may also be configured to synchronize the LO signals of the multiple radiohead circuits via a central processing unit that the radiohead circuits are digitally coupled to. By utilizing the digital interface between each of the plurality of radiohead circuits and the modem, for example, fast and efficient synchronization of the LO signals across all the radiohead circuits may be achieved.

In some aspects, each of the radiohead circuits in the DRS system may be configured to embed a LO signal (or a divided LO signal) in a downlink to a central processing unit, system on chip (SOC), controller, modem, control processor, or other central processing unit via a digital link interface. The central processing unit, for example, may include a frequency domain (FD) modem component with other processing circuit, such as an error measurement circuit and/or frequency or phase difference determination circuits. The central processing unit may further include digital interface terminals for digitally coupling to each of the digital interface terminals of the plurality of radiohead circuits.

FIG. 33 shows a diagram of a DRS 3300 according to some aspects. It is appreciated that DRS diagram 3300 may be simplified for purposes of this explanation.

DRS 3300 may include a plurality of radiohead circuits 3310-3320, i.e. RH1 to RHn, and a central controller or processor 3330 (e.g., a modem circuit). Although only two radiohead circuits are shown, i.e., n=2, it is appreciated that this is purely for simplicity and for purposes of this explanation, and the system may be scaled to other numbers of radiohead circuits, e.g., three or more.

The first radiohead circuit (RH1) 3310 may include an internal reference clock source 3311, a local oscillator (LO) circuit 3312, a DTC 3313, a frequency divider 3314 coupled between the LO circuit 3312 and digital communication interface 3315, a digital communication interface 3315, a transceiver circuit (TX/RX) 3316 which may include one or more transceiver circuit chains, and an antenna 3317. It is appreciated that other radiohead circuits, such as radiohead circuit 3320 may include similar configurations and/or components. Furthermore, it is appreciated that other components within the radiohead circuits may be omitted from diagram 3300 for purposes of this explanation, e.g., RF FE components between the transceiver and the antennas.

In some aspects, the LO circuit 3312 may be a DPLL circuit, for example, configured to provide the radiohead circuit 3310 with a LO signal to utilize for wireless communication signal processing. Digital communication interface (Dig. Int.) 3315 may be, for example, a Serial Time Encoded Protocol (STEP) interface which may be digitally coupled to a digital interface at central processor 3330 and configured to transmit digital communications over the digital link between the Dig. Int. 3315 and its associated interface (Dig. $Int._1$) at the central processor 3330. This digital link may provide bi-directional digital communications in accordance with an asynchronous time-based protocol, and may therefore provide for communications employing time division multiplexing. Accordingly, the digital link between the digital interfaces may support multiple bits per symbol and a narrow pass-band frequency spectral occupancy, resulting in higher data rates and lower energy per bit signaling. Furthermore, because the digital communication interfaces may have a low exit latency, the system may be turned off during idle times with fast re-acquisition.

In some aspects, each of the radiohead circuits may be configured to embed the LO signal generated by the LO circuit (or, optionally, a divided LO signal) in a downlink communication from the radiohead circuit to the central processor. For example, with respect to the first radiohead circuit (RH1) 3310, the LO signal may be generated by LO circuit 3312 and forwarded to Dig. Int. 3315 for embedding into a digital downlink signal to central processor 3330. Optionally, frequency divider 3314 may divide the LO signal by a pre-determined factor prior to transmitting the LO signal to central processor 3330.

Once central processor 3330 receives the LO signals (or divided LO signals) from the radiohead circuits, it may perform a DRS clock synchronization scheme by comparing the LO signals from each of the radiohead circuits to a main reference. This comparison may be performed, for example by an error measurement circuit. The error measurement circuit may be, for example, a time-to-digital converter (TDC) or a phase detector (PD) of the central processor 3330. Based on this comparison, the central processor 3330 may then determine a LO correction for the radiohead circuits based on a difference between the respective LO signal and the main reference as determined by a frequency or phase difference determiner (Δf/Δφ), and forward the LO correction to each of the respective digital interfaces at the central processor 3330 that are digitally coupled to the respective digital interfaces of the radiohead circuits 3310-3320.

The central processor 3330 may then transmit the LO correction in the uplink direction over the digital interface to each of the radiohead circuits 3310-3320, which may receive the LO correction at the digital communication interface (Dig. Int.) 3315 and apply the correction at either the LO circuit 3312 or a DTC circuit 3313. If applied at the DTC circuit 3313, the correction may be instantaneous and further enable system power savings.

In some aspects, the main reference may be based on a reference clock available to the central processor 3330. For example, the main reference may be obtained from a system on chip (SOC) crystal oscillator (XTAL), a thin-film bulk acoustic resonator, a microelectromechanical system (MEMS) oscillator, or a bulk acoustic wave resonator.

In the case that the main reference can be obtained from an available processor reference clock (e.g., from a SOC XTAL), the processor reference clock signal may be input to an input terminal of the error measurement circuit (e.g., the TDC/PD). In addition, other input terminals of the error measurement circuit may include terminals coupled to the digital interfaces (Dig. $Int._1$, . . . , Dig. $Int._n$) of the central processor 3330. Accordingly, the inputs to the error measurement circuit are the processor reference clock signal obtained from the SOC XTAL, for example, and the LO signals from each of the plurality of radiohead circuits (RH1, . . . RHn) 3310-3320. The error measurement circuit may compare the frequency or phase of the LO signal from each of the plurality of radiohead circuits 3310-3320 to a frequency or phase of the processor reference clock signal and the frequency or phase difference determiner (Δf/Δφ) may then determine a difference based on the comparison. A LO correction for each of the radiohead circuits may then be determined based on this difference, and fed back to the digital interfaces (Dig. Int.1, . . . , Dig. Int.n) of the central processor 3330 for communicating back to radiohead circuit 3310, for example. Upon receiving the LO correction at Dig. Int. 3315, it may be forwarded to either the LO circuit 3312 or DTC 3313. Either of these circuits (i.e., the LO circuit 3312 or the DTC 3313) may then apply the LO correction to modify the LO signal provided to TX/RX 3316.

In some aspects, however, there may be no general processor reference clock available. For example, SOC XTAL may not be available for providing a processor reference clock to the error measurement circuit in order to provide a main reference to compare the LO signals of the plurality of radiohead circuits 3310-3320 to. In this case, the main reference may be based on an evaluation of the LO signals by the error measurement circuit. This evaluation may include, for example, determining an average frequency or phase of the all of the LO signals of the plurality of radiohead circuits 3310-3320. This average frequency may then be used as the main reference and compared to a frequency or phase of each of the LO signals of the plurality of radiohead circuits 3310-3320 to determine the LO correction for each of the radiohead circuits 3310-3320. Once the LO correction is determined, it may then be forwarded through the digital interface of the central processor 3330 to each of the radiohead circuits 3310-3320. For example, for radiohead circuit 3310, this includes forwarding the LO correction via Dig. Int. 1 in the central processor 3330 to Dig. Int. 3315. After receiving the LO correction, radiohead circuit 3310 may apply the LO correction at either the LO circuit 3312 or the DTC 3313.

By implementing these schemes and mechanisms, DRS 3300 is able to detect LO signal discrepancies at each of the plurality of radiohead circuits and correct the LO signal frequency or phase to perform MIMO and/or beamforming. In some aspects, this may be done independent of the availability of a processor reference clock, for example, since the main reference comparison point may be determined from the LO signals communicated from the plurality of radiohead circuits themselves. Also, an error measurement circuit such as a TDC of the central processor 3330

FIG. 34 shows an exemplary signal diagram 3400 showing the embedding of the LO signals (or divided LO signals) in the digital downlink communication from each of the radiohead circuits to the central processor according to some aspects. Dig. Int. Lanes in diagram 3400 may correspond to the signaling from radiohead circuit 3310 to central processor 3330 shown in FIG. 33, for example.

FIG. 35 shows an exemplary process flowchart 3500 for a DRS to synchronize the clocks of a plurality of radiohead circuits according to some aspects. It is appreciated that flowchart 3500 may be simplified for purposes of this explanation.

Process 3500 may include communicating the LO signal from each of the plurality of radiohead circuits to a processor 3502; comparing, by the processor, the LO signal received from each of the plurality of radiohead circuits to a main reference 3504; generating and transmitting a LO correction to each of the plurality of radiohead circuits based on the comparison to the main reference 3506; and applying, by each of the plurality of radiohead circuits, the LO correction at the LO circuit or a digital-to-time converter (DTC) of the respective radiohead circuit 3508. For example, the main reference may be obtained from a processor reference clock signal or it may be obtained based on an evaluation of the LO signals of the plurality of radiohead circuits (e.g., based on an average of the LO signals of the plurality of radioheads).

In some aspects, FIG. 33 to FIG. 35 may be configured to operate in accordance with one or more of the examples set forth below in the example section.

In the following, various aspects of the present disclosure will be illustrated:

Example 1a is a communication device. The communication device may include a first radiohead circuit and a second radiohead circuit, and one or more processors configured to instruct at least one of a first calibration of the first radiohead circuit or a second calibration of the second radiohead circuit such that the at least one of the first calibration or the second calibration is performed independently from whether the other one of the first calibration or the second calibration is being performed. Illustratively, the one or more processors may be configured to instruct at least one of a first calibration of the first radiohead circuit and/or a second calibration of the second radiohead circuit such that at least one of the first radiohead circuit or the second radiohead circuit carries out the respective first calibration or second calibration independently from whether the other one of the first radiohead circuit or the second radiohead circuit is carrying out the respective first calibration or second calibration.

In Example 2a, the subject matter of Example 1a can optionally include that the one or more processors are configured to instruct the at least one of the first calibration or the second calibration such that the at least one of the first calibration or the second calibration is performed independently from whether the other one of the first calibration or the second calibration is being performed by instructing the first calibration of the first radiohead circuit and the second calibration of the second radiohead circuit such that the first calibration and the second calibration are performed at least partially simultaneously with one another. Illustratively, the one or more processors are configured to instruct the at least one of the first calibration or the second calibration such that the first radiohead circuit and the second radiohead circuit carry out the respective first calibration and second calibration at least partially simultaneously with one another.

In Example 3a, the subject matter of Example 2a can optionally include that the one or more processors are configured to instruct the first calibration of the first radiohead circuit and the second calibration of the second radiohead circuit such that the first calibration and the second calibration are performed in parallel with one another. Illustratively, the one or more processors are configured to instruct the first calibration of the first radiohead circuit and the second calibration of the second radiohead circuit such that the first radiohead circuit and the second radiohead circuit carry out the respective first calibration and second calibration in parallel with one another.

In Example 4a, the subject matter of any one of Examples 1a to 3a can optionally include that the one or more processors are digitally coupled with the first radiohead circuit and the second radiohead circuit.

In Example 5a, the subject matter of any one of Examples 1a to 4a can optionally include that the first radiohead circuit includes a first transceiver chain configured to transmit a first radio frequency transmit signal and configured to receive a first radio frequency receive signal, and that the second radiohead circuit includes a second transceiver chain configured to transmit a second radio frequency transmit signal and configured to receive a second radio frequency receive signal.

In Example 6a, the subject matter of Example 5a can optionally include that each of the first transceiver chain and the second transceiver chain includes at least one component of the list of components including or consisting of: a low noise amplifier circuit, a power amplifier circuit, a digital pre-distortion circuit, a down-sampling circuit, a local oscillator circuit, an antenna tuning circuit, and a phase-modulation circuit.

In Example 7a, the subject matter of Example 6a can optionally include that a first calibration of the first radiohead circuit includes a first calibration of at least one component of the first transceiver chain, and that a second calibration of the second radiohead circuit includes a second calibration of at least one component of the second transceiver chain.

In Example 8a, the subject matter of Example 7a can optionally include that a first calibration of the first radiohead circuit includes at least one of a first linearity calibration of a power amplifier circuit or a first IQ-mismatch calibration, and that a second calibration of the second radiohead circuit includes at least one of a second linearity calibration of a power amplifier circuit or a second IQ-mismatch calibration.

In Example 9a, the subject matter of any one of Examples 5a to 8a can optionally include that the first transceiver chain is configured to transmit the first radio frequency transmit signal and the second transceiver chain is configured to transmit the second radio frequency transmit signal in synchronization with one another. In some aspects, the first transceiver chain may be configured to transmit the first radio frequency transmit signal and the second transceiver chain may be configured to transmit the second radio frequency transmit signal concurrently with one another or at least partially simultaneously with one another.

In Example 10a, the subject matter of Example 9a can optionally include that the first transceiver chain and the second transceiver chain are configured to transmit the first radio frequency transmit signal and the second radio frequency transmit signal within a same time slot.

In Example 11a, the subject matter of any one of Examples 9a or 10a can optionally include that the one or more processors are further configured to process the first radio frequency transmit signal to determine one or more first transmit calibration parameters, and/or that the one or more processors are further configured to process the second radio frequency transmit signal to determine one or more second transmit calibration parameters.

In Example 12a, the subject matter of Example 11a can optionally include that the one or more processors are configured to determine the one or more first transmit calibration parameters in accordance with a comparison of the first radio frequency transmit signal transmitted by the first transceiver chain with an expected first radio frequency transmit signal, and/or that the one or more processors are configured to determine the one or more second transmit calibration parameters in accordance with a comparison of the second radio frequency transmit signal transmitted by the second transceiver chain with an expected second radio frequency transmit signal.

In Example 13a, the subject matter of Example 12a can optionally include that the communication device further includes a memory storing the expected first radio frequency transmit signal and the expected second radio frequency transmit signal.

In Example 14a, the subject matter of any one of Examples 12a or 13a can optionally include that the first radiohead circuit includes one or more first processors configured to calibrate the first transceiver chain in accordance with the one or more first transmit calibration parameters, and that the second radiohead circuit includes one or more second processors configured to calibrate the second transceiver chain in accordance with the one or more second transmit calibration parameters.

In Example 15a, the subject matter of any one of Examples 1a to 14a can optionally include that the one or more processors are further configured to instruct a first calibration of the first radiohead circuit by transmitting a first configuration signal to the first radiohead circuit and to instruct a second calibration of the second radiohead circuit by transmitting a second configuration signal to the second radiohead circuit.

In Example 16a, the subject matter of Example 15a can optionally include that the one or more processors are configured to transmit the first configuration signal and the second configuration signal in synchronization with one another. In some aspects, the one or more processors may be configured to transmit the first configuration signal and the second configuration signal concurrently with one another or at least partially simultaneously with one another.

In Example 17a, the subject matter of any one of Examples 15a or 16a can optionally include that the first configuration signal includes an instruction (e.g., a first instruction) prompting a transmission of a first radio frequency transmit signal by a first transceiver chain of the first radiohead circuit, and that the second configuration signal includes an instruction (e.g., a second instruction) prompting a transmission of a second radio frequency transmit signal by a second transceiver chain of the second radiohead circuit.

In Example 18a, the subject matter of Example 17a can optionally include that the first transceiver chain is configured to transmit the first radio frequency transmit signal in response to the first configuration signal, and that the second transceiver chain is configured to transmit the second radio frequency transmit signal in response to the second configuration signal.

In Example 19a, the subject matter of Example 18a can optionally include that the first radio frequency transmit signal and/or the second radio frequency transmit signal is/are configured as a frame portion of a frame signal.

In Example 20a, the subject matter of any one of Examples 5a to 19a can optionally include that the first transceiver chain is configured to receive the first radio frequency receive signal and the second transceiver chain is configured to receive the second radio frequency receive signal in synchronization with one another. In some aspects, the first transceiver chain is configured to receive the first radio frequency receive signal and the second transceiver chain is configured to receive the second radio frequency receive signal concurrently with one another or at least partially simultaneously with one another.

In Example 21a, the subject matter of Example 20a can optionally include that the first transceiver chain and the second transceiver chain are configured to receive the first radio frequency receive signal and the second radio frequency receive signal within a same time slot.

In Example 22a, the subject matter of any one of Examples 20a or 21a can optionally include that the one or more processors are further configured to receive from the first radiohead circuit a first response signal indicative of a response of the first transceiver chain to the first radio frequency receive signal, and that the one or more processors are further configured to determine one or more first receive calibration parameters in accordance with the first response signal.

In Example 23a, the subject matter of any one of Examples 20a to 22a can optionally include that the one or more processors are further configured to receive from the second radiohead circuit a second response signal indicative of a response of the second transceiver chain to the second radio frequency receive signal, and that the one or more processors are further configured to determine one or more second receive calibration parameters in accordance with the second response signal.

In Example 24a, the subject matter of any one of Examples 22a or 23a can optionally include that the one or more processors are configured to determine the one or more first receive calibration parameters in accordance with a comparison of the first response signal with an expected first response signal associated with the first radio frequency receive signal, and that the one or more processors are configured to determine the one or more second receive calibration parameters in accordance with a comparison of the second response signal with an expected second response signal associated with the second radio frequency receive signal.

In Example 25a, the subject matter of Example 24a can optionally include that the communication device further includes a memory storing the expected first response signal and the expected second response signal.

In Example 26a, the subject matter of any one of Examples 23a to 25a can optionally include that the first radiohead circuit includes one or more first processors configured to calibrate the first transceiver chain in accordance with the one or more first receive calibration parameters, and that the second radiohead circuit includes one or more second processors configured to calibrate the second transceiver chain in accordance with the one or more second receive calibration parameters.

In Example 27a, the subject matter of any one of Examples 23a to 26a can optionally include that the first radio frequency receive signal and/or the second radio frequency receive signal is/are configured as a frame portion of a frame signal.

In Example 28a, the subject matter of any one of Examples 1a to 27a can optionally include that the one or more processors are configured to carry out processing in the frequency domain.

Example 29a is a communication device. The communication device may include a first radiohead circuit and a second radiohead circuit, and one or more processors configured to instruct a first calibration of the first radiohead circuit and a second calibration of the second radiohead circuit such that the first calibration and the second calibration are performed at least partially simultaneously with one another.

Examples 30a is a communication device. The communication device may include a first radiohead circuit including a first transceiver chain configured to transmit a first radio frequency transmit signal and to receive a first radio frequency receive signal, a second radiohead circuit including a second transceiver chain configured to transmit a second radio frequency transmit signal and to receive a second radio frequency receive signal, and one or more processors digitally coupled with the first radiohead circuit and with the second radiohead circuit. The one or more processors are configured to instruct a first calibration of the first transceiver chain and a second calibration of the second transceiver chain such that the first calibration and the second calibration are performed at least partially simultaneously with one another. Illustratively, the one or more processors are configured to instruct the first calibration of the first transceiver chain and the second calibration of the second transceiver chain such that the first radiohead circuit and the second radiohead circuit carry out the respective first calibration and second calibration at least partially simultaneously with one another.

Examples 31a is a communication device. The communication device may include a first radiohead circuit including first transceiving means for transmitting a first radio frequency transmit signal and for receiving a first radio frequency receive signal, a second radiohead circuit including second transceiving means for transmitting a second radio frequency transmit signal and for receiving a second radio frequency receive signal, and processing means digitally coupled with the first radiohead circuit and with the second radiohead circuit. The processing means are for instructing a first calibration of the first transceiving means and a second calibration of the second transceiving means such that the first calibration and the second calibration are performed at least partially simultaneously with one another. Illustratively, the processing means are for instructing the first calibration of the first transceiving means and the second calibration of the second transceiving means such that the first radiohead circuit and the second radiohead circuit carry out the respective first calibration and second calibration at least partially simultaneously with one another. In some aspects, the processing means are for instructing a first calibration of the first transceiving means and a second calibration of the second transceiving means such that the first calibration and the second calibration are performed concurrently with one another.

Examples 32a is a method for calibrating a first radiohead circuit and a second radiohead circuit of a communication device. The method may include instructing at least one of a first calibration of the first radiohead circuit or a second calibration of the second radiohead circuit such that at least one of the first calibration or the second calibration is performed independently from whether the other one of the first calibration or the second calibration is being performed. Illustratively, the method may include instructing at least one of a first calibration of the first radiohead circuit or a second calibration of the second radiohead circuit such that at least one of the first radiohead circuit or the second radiohead circuit carries out the respective first calibration or second calibration independently from whether the other one of the first radiohead circuit or the second radiohead circuit is carrying out the respective first calibration or second calibration.

In Example 33a, the subject matter of Example 32a can optionally include that instructing at least one of a first calibration of the first radiohead circuit or a second calibration of the second radiohead circuit such that at least one of the first calibration or the second calibration is performed independently from whether the other one of the first calibration or the second calibration is being performed includes instructing a first calibration of the first radiohead circuit and a second calibration of the second radiohead circuit such that the first calibration and the second calibration are performed at least partially simultaneously with one another. Illustratively, it includes instructing a first calibration of the first radiohead circuit and a second calibration of the second radiohead circuit such that the first radiohead circuit and the second radiohead circuit carry out the respective first calibration and second calibration at least partially simultaneously with one another.

Examples 34a is a method for calibrating a first radiohead circuit and a second radiohead circuit of a communication device. The method may include instructing a first calibration of the first radiohead circuit and a second calibration of the second radiohead circuit such that the first calibration and the second calibration are performed at least partially simultaneously with one another. Illustratively, the method may include instructing a first calibration of the first radiohead circuit and a second calibration of the second radiohead circuit such that the first radiohead circuit and the second radiohead circuit carry out the respective first calibration and second calibration at least partially simultaneously with one another.

Example 35a is a communication device. The communication device may include a first radiohead circuit and a second radiohead circuit, and one or more processors configured to instruct a first calibration of the first radiohead circuit and a second calibration of the second radiohead circuit such that the first calibration and the second calibration are performed concurrently with one another (or at least partially simultaneously with one another).

Examples 36a is a communication device. The communication device may include a first radiohead circuit including a first transceiver chain configured to transmit a first radio frequency transmit signal and to receive a first radio frequency receive signal, a second radiohead circuit including a second transceiver chain configured to transmit a second radio frequency transmit signal and to receive a second radio frequency receive signal, and one or more processors digitally coupled with the first radiohead circuit and with the second radiohead circuit. The one or more processors are configured to instruct a first calibration of the first transceiver chain and a second calibration of the second transceiver chain such that the first calibration and the second calibration are performed concurrently with one another (or at least partially simultaneously with one another). Illustratively, the one or more processors are configured to instruct the first calibration of the first transceiver chain and the second calibration of the second transceiver chain such that the first radiohead circuit and the second radiohead circuit carry out the respective first calibration and second calibration concurrently with one another (or at least partially simultaneously with one another).

Examples 37a is a method for calibrating a first radiohead circuit and a second radiohead circuit of a communication device. The method may include instructing a first calibration of the first radiohead circuit and a second calibration of the second radiohead circuit such that the first calibration and the second calibration are performed concurrently with one another (or at least partially simultaneously with one another).

Example 1b is a communication device. The communication device may include a first radiohead circuit including a first transceiver chain configured to transmit a first radio frequency signal associated with a first transmission configuration and to transmit a second radio frequency signal associated with a second transmission configuration, and a second radiohead circuit including a second transceiver chain configured to receive the first radio frequency signal and the second radio frequency signal. The communication device may further include one or more processors configured to determine a first signal parameter associated with the first radio frequency signal received at the second transceiver chain and a second signal parameter associated with the second radio frequency signal received at the second transceiver chain, and to determine a preferred transmission configuration for the first transceiver chain by using the first signal parameter and the second signal parameter.

In Example 2b, the subject matter of Example 1b can optionally include that the first transceiver chain is further configured to transmit a third radio frequency signal associated with a third transmission configuration, that the second transceiver chain is further configured to receive the third radio frequency signal, and that the one or more processors are further configured to determine a third signal parameter associated with the third radio frequency signal received at the second transceiver chain, and to determine a preferred transmission configuration for the first transceiver chain by using the first signal parameter, the second signal parameter, and the third signal parameter.

In Example 3b, the subject matter of any one of Examples 1 b or 2b can optionally include that the first signal parameter includes a first power of the first radio frequency signal received at the second transceiver chain and that the second signal parameter includes a second power of the second radio frequency signal received at the second transceiver chain.

In Example 4b, the subject matter of Example 3b can optionally include that the one or more processors are configured to select the first transmission configuration as the preferred transmission configuration in case the first power is greater than the second power, and that the one or more processors are configured to select the second transmission configuration as the preferred transmission configuration in case the second power is greater than the first power.

In Example 5b, the subject matter of any one of Examples 1 b to 4b can optionally include that the first radiohead circuit includes a first antenna, and that the first transceiver chain is configured to transmit the first radio frequency signal and the second radio frequency signal via the first antenna, and that the second radiohead circuit includes a second antenna, and that the second transceiver chain is configured to receive the first radio frequency signal and the second radio frequency signal via the second antenna.

In Example 6b, the subject matter of any one of Examples 1 b to 5b can optionally include that each of the first transceiver chain and the second transceiver chain includes one or more components of the list of components including or consisting of: a low noise amplifier circuit, a power amplifier circuit, a digital pre-distortion circuit, a down-sampling circuit, a local oscillator circuit, an antenna tuning circuit, and a phase-modulation circuit.

In Example 7b, the subject matter of Example 6b can optionally include that the first transmission configuration includes a first configuration of one or more of the components of the first transceiver chain, and that the second transmission configuration includes a second configuration of one or more of the components of the first transceiver chain.

In Example 8b, the subject matter of any one of Examples 6b or 7b can optionally include that the first transmission configuration includes a first tuning of the first antenna, and that the second transmission configuration includes a second tuning of the first antenna.

In Example 9b, the subject matter of Example 8b can optionally include that the first tuning of the first antenna includes a first impedance tuning and/or a first aperture tuning of the first antenna and/or a first tuning of a gain of the first antenna, and that the second tuning of the first antenna includes a second impedance tuning and/or a second aperture tuning of the first antenna and/or a second tuning of a gain of the first antenna.

In Example 10b, the subject matter of Example 9b can optionally include that the first antenna includes one or more antenna elements, and that the first tuning of the first antenna includes a respective first impedance tuning associated with each antenna element of the one or more antenna elements and/or a respective first aperture tuning associated with each antenna element of the one or more antenna elements, and/or a respective first tuning of a gain associated with each antenna element of the one or more antenna elements, and that the second tuning of the first antenna includes a respective second impedance tuning associated with each antenna element of the one or more antenna elements and/or a respective second aperture tuning associated with each antenna element of the one or more antenna elements, and/or a respective second tuning of a gain associated with each antenna element of the one or more antenna elements.

In Example 11b, the subject matter of any one of Examples 1b to 10b can optionally include that the first radio frequency signal is associated with a first communication channel between the first transceiver chain and the second transceiver chain, that the second radio frequency signal is associated with a second communication channel between the first transceiver chain and the second transceiver chain, and that the first signal parameter is indicative of a first quality of the first communication channel, and the second signal parameter is indicative of a second quality of the second communication channel.

In Example 12b, the subject matter of any one of Examples 1b to 11b can optionally include that the one or more processors are configured to instruct a first transmit calibration of the first transceiver chain prior to transmission of the first radio frequency signal and of the second radio frequency signal, and that the one or more processors are configured to instruct a second receive calibration of the second transceiver chain prior to reception of the first radio frequency signal and of the second radio frequency signal.

In Example 13b, the subject matter of Example 12b can optionally include that the one or more processors are configured to instruct the first transmit calibration by transmitting one or more first transmit calibration parameters to the first radiohead circuit, and that the one or more processors are configured to instruct the second receive calibration by transmitting one or more second receive calibration parameters to the second radiohead circuit.

In Example 14b, the subject matter of any one of Examples 1b to 13b can optionally include that the second transceiver chain is further configured to transmit a fourth radio frequency signal associated with a fourth transmission configuration and to transmit a fifth radio frequency signal associated with a fifth transmission configuration, and that the first transceiver chain is further configured to receive the fourth radio frequency signal and the fifth radio frequency signal. The one or more processors are further configured to determine a fourth signal parameter associated with the fourth radio frequency signal received at the first transceiver chain and a fifth signal parameter associated with the fifth radio frequency signal received at the first transceiver chain, and to determine a preferred transmission configuration for the second transceiver chain by using the fourth signal parameter and the fifth signal parameter.

In Example 15b, the subject matter of Example 14b can optionally include that the second transceiver chain is further configured to transmit a sixth radio frequency signal associated with a sixth transmission configuration. The first transceiver chain is further configured to receive the sixth radio frequency signal. The one or more processors are further configured to determine a sixth signal parameter associated with the sixth radio frequency signal received at the first transceiver chain, and to determine a preferred transmission configuration for the second transceiver chain by using the fourth signal parameter, the fifth signal parameter, and the sixth signal parameter.

In Example 16b, the subject matter of any one of Examples 14b or 15b can optionally include that the fourth signal parameter includes a fourth power of the fourth radio frequency signal received at the first transceiver chain and that the fifth signal parameter includes a fifth power of the fifth radio frequency signal received at the first transceiver chain.

In Example 17b, the subject matter of Example 16b can optionally include that the one or more processors are further configured to select the fourth transmission configuration as the preferred transmission configuration in case the fourth power is greater than the fifth power, and that the one or more processors are further configured to select the fifth transmission configuration as the preferred transmission configuration in case the fifth power is greater than the fourth power.

In Example 18b, the subject matter of any one of Examples 13b to 17b can optionally include that the one or more processors are further configured to instruct a first receive calibration of the first transceiver chain prior to reception of the fourth radio frequency signal and of the fifth radio frequency signal, and that the one or more processors are further configured to instruct a second transmit calibration of the second transceiver chain prior to transmission of the fourth radio frequency signal and of the fifth radio frequency signal.

In Example 19b, the subject matter of Example 18b can optionally include that the one or more processors are further configured to instruct the first receive calibration by transmitting one or more first receive calibration parameters to the first radiohead circuit, and that the one or more processors are further configured to instruct the second transmit calibration by transmitting one or more second transmit calibration parameters to the second radiohead circuit.

In Example 20b, the subject matter of any one of Examples 12b to 19b can optionally include that the one or more processors are further configured to instruct the first transmit calibration and the first receive calibration in synchronization with one another and/or that the one or more processors are further configured to instruct the second transmit calibration and the second receive calibration in synchronization with one another. In some aspects, the one or more processors are further configured to instruct the first transmit calibration and the first receive calibration concurrently with one another or at least partially simultaneously with one another, and/or that the one or more processors are further configured to instruct the second transmit calibration and the second receive calibration concurrently with one another or at least partially simultaneously with one another.

In Example 21b, the subject matter of any one of Examples 1b to 20b can optionally include that the first transceiver chain and the second transceiver chain are further configured to transmit the respective radio frequency signals in synchronization with one another. In some aspects, the first transceiver chain and the second transceiver chain are further configured to transmit the respective radio frequency signals concurrently with one another or at least partially simultaneously with one another.

In Example 22b, the subject matter of any one of Examples 1b to 21b can optionally include that the first radiohead circuit includes one or more first processors configured to convert a radio frequency signal in the time domain into a radio frequency signal in the frequency domain, and that the second radiohead circuit includes one or more second processors configured to convert a radio frequency signal in the time domain into a radio frequency signal in the frequency domain In Example 23b, the subject matter of any one of Examples 1b to 22b can optionally include that the one or more processors are configured to carry out processing in the frequency domain.

In Example 24b, the subject matter of any one of Examples 1b to 23b can optionally include that the one or more processors include or are a part of a system on chip (SoC).

In Example 25b, the subject matter of any one of Examples 1b to 24b can optionally include that the communication device further includes a first distributed radio system and a second distributed radio system. The first radiohead circuit is associated with the first distributed radio system, and the second radiohead circuit is associated with the second distributed radio system.

In Example 26b, the subject matter of any one of Examples 1b to 25b can optionally include that the first transceiver chain is configured to transmit a further radio frequency signal using the preferred transmission configuration.

In Example 27b, the subject matter of any one of Examples 1b to 26b can optionally include that the one or more processors are digitally coupled with the first radiohead circuit and with the second radiohead circuit.

Example 28b is a communication device. The communication device may include a first radiohead circuit including a first antenna and a first transceiver chain coupled with one another, the first transceiver chain being configured to transmit a first radio frequency signal associated with a first transmission configuration via the first antenna and to transmit a second radio frequency signal associated with a second transmission configuration via the first antenna, and a second radiohead circuit including a second antenna and a second transceiver chain coupled with one another, the second transceiver chain being configured to receive the first radio frequency signal and the second radio frequency signal via the second antenna. The communication device may further include one or more processors digitally coupled with the first radiohead circuit and the second radiohead circuit, the one or more processors being configured to determine a first signal power associated with the first radio frequency signal received at the second transceiver chain and a second signal power associated with the second radio frequency signal received at the second transceiver chain, to select the first transmission configuration as preferred transmission configuration in case the first signal power is greater than the second signal power or to select the second transmission configuration as preferred transmission configuration in case the second signal power is greater than the first signal power.

In Example 29b, the subject matter of Example 28b can optionally include that the first transceiver chain is further configured to transmit a further radio frequency signal in accordance with the selected preferred transmission configuration.

Example 30b is a communication device. The communication device may include a first radiohead circuit including first transceiving means for transmitting a first radio frequency signal associated with a first transmission configuration and for transmitting a second radio frequency signal associated with a second transmission configuration, and a second radiohead circuit including second transceiving means for receiving the first radio frequency signal and the second radio frequency signal. The communication device may further include processing means for determining a first signal parameter associated with the first radio frequency signal received at the second transceiving means and a second signal parameter associated with the second radio frequency signal received at the second transceiving means, and for determining a preferred transmission configuration for the first transceiving means by using the first signal parameter and the second signal parameter Example 31b is a communication device. The communication device may include a first radiohead circuit including a first memory storing a preferred transmission configuration, and a first transceiver chain configured to transmit a radio frequency signal in accordance with the preferred transmission configuration stored in the first memory; and a second radiohead circuit including a second transceiver chain configured to receive the radio frequency signal transmitted by the first transceiver chain. The preferred transmission configuration is determined by using a first signal parameter associated with a first radio frequency signal transmitted by the first transceiver chain and received at the second transceiver chain, and by using a second signal parameter associated with a second radio frequency signal transmitted by the first transceiver chain and received at the second transceiver chain.

Example 32b is a method of determining a preferred transmission configuration. The method may include transmitting by a first transceiver chain of a first radiohead circuit a first radio frequency signal associated with a first transmission configuration and a second radio frequency signal associated with a second transmission configuration, receiving by a second transceiver chain of a second radiohead circuit the first radio frequency signal and the second radio frequency signal, determining a first signal parameter associated with the first radio frequency signal received at the second transceiver chain and a second signal parameter associated with the second radio frequency signal received at the second transceiver chain, and determining a preferred transmission configuration for the first transceiver chain by using the first signal parameter and the second signal parameter.

Example 1c is a radiohead circuit. The radiohead circuit may include an antenna, and an antenna tuning circuit configured to tune the antenna by applying a first tuning configuration and a second tuning configuration. The antenna is configured to receive a radio frequency signal while the first tuning configuration is applied, and to receive the same radio frequency signal while the second tuning configuration is applied. The radiohead circuit may further include one or more processors configured to determine a first signal to noise ratio associated with the received radio frequency signal and the first tuning configuration, to determine a second signal to noise ratio associated with the received radio frequency signal and the second tuning configuration, and to determine a preferred tuning configuration by using the first signal to noise ratio and the second signal to noise ratio.

In Example 2c, the subject matter of Example 1c can optionally include that the antenna tuning circuit is configured to tune the antenna by applying a tuning configuration in accordance with the determined preferred tuning configuration.

In Example 3c, the subject matter of any one of Examples 1c or 2c can optionally include that the antenna tuning circuit is further configured to tune the antenna by applying a third tuning configuration. The antenna is further configured to receive the same radio frequency signal while the third tuning configuration is applied. The one or more processors are further configured to determine a third signal to noise ratio associated with the received radio frequency signal and the third tuning configuration, and to determine the preferred tuning configuration by using the first signal to noise ratio, the second signal to noise ratio, and the third signal to noise ratio.

In Example 4c, the subject matter of any one of Examples 1c to 3c can optionally include that the one or more processors are configured to determine as preferred tuning configuration the tuning configuration associated with the greatest signal to noise ratio among the determined signal to noise ratios.

In Example 5c, the subject matter of any one of Examples 1c to 4c can optionally include that the first tuning configuration represents a first impedance tuning of the antenna and/or a first aperture tuning of the antenna and/or a first tuning of a gain of the antenna, and that the second tuning configuration represents a second impedance tuning of the antenna and/or a second aperture tuning of the antenna and/or a second tuning of a gain of the antenna.

In Example 6c, the subject matter of any one of Examples 1c to 5c can optionally include that the one or more processors are configured to process the received radio frequency signal in the time domain.

In Example 7c, the subject matter of any one of Examples 1c to 6c can optionally include that the one or more processors are configured to determine the first signal to noise ratio as a first ratio of the power of the radio frequency signal to the noise power received while the first tuning configuration is applied, and that the one or more processors are configured to determine the second signal to noise ratio as a second ratio of the power of the radio frequency signal to the noise power received while the second tuning configuration is applied.

In Example 8c, the subject matter of any one of Examples 1c to 7c can optionally include that the radio frequency signal is configured as a frame signal configured in accordance with IEEE 802.11 standards.

In Example 9c, the subject matter of Example 8c can optionally include that the frame signal includes a legacy portion and a non-legacy portion, and that the one or more processors are configured to determine the first signal to noise ratio and the second signal to noise ratio from the legacy portion of the frame signal.

In Example 10c, the subject matter of Example 9c can optionally include that the antenna tuning circuit is configured to tune the antenna by applying the preferred tuning configuration prior to the antenna receiving the non-legacy portion of the frame signal.

In Example 11c, the subject matter of any one of Examples 8c to 10c can optionally include that the frame signal is configured according to at least one of a high-throughput PHY Protocol Data Unit (HT PPDU) format, a very high-throughput PHY Protocol Data Unit (VHT PPDU) format, and a high energy PHY Protocol Data Unit (HE PPDU) format.

In Example 12c, the subject matter of Example 11c can optionally include that the frame signal is configured according to the HT PPDU format and includes a legacy preamble portion, a HT preamble portion, and a HT data portion, and that the antenna tuning circuit is configured to tune the antenna by applying the preferred tuning configuration prior to the antenna receiving the HT preamble portion.

In Example 13c, the subject matter of Example 11c can optionally include that the frame signal is configured according to the VHT PPDU format and includes a legacy preamble portion, a VHT preamble portion, and a VHT data portion, and that the antenna tuning circuit is configured to tune the antenna by applying the preferred tuning configuration prior to the antenna receiving the VHT preamble portion.

In Example 14c, the subject matter of Example 11c can optionally include that the frame signal is configured according to the HE PPDU format and includes a legacy preamble portion, a HE preamble portion, and a HE data portion, and that the antenna tuning circuit is configured to tune the antenna by applying the preferred tuning configuration prior to the antenna receiving the HE preamble portion.

In Example 15c, the subject matter of any one of Examples 8c to 14c can optionally include that the frame signal includes a legacy preamble portion, the legacy preamble portion including a legacy short training field (L-STF), a legacy long training field (L-LTF), and a legacy signal (L-SIG) field, and that the antenna tuning circuit is configured to tune the antenna by applying the preferred tuning configuration after reception of the legacy signal (L-SIG) field (illustratively, after reception at the antenna of the legacy signal).

In Example 16c, the subject matter of Example 15c can optionally include that the one or more processors are configured to detect a start-of-packet upon reception of the legacy short training field (L-STF), and are configured to perform symbol timing synchronization and channel frequency synchronization in accordance with the legacy short training field (L-STF).

In Example 17c, the subject matter of any one of Examples 15c or 16c can optionally include that the one or more processors are configured to perform symbol timing synchronization and channel frequency synchronization in accordance with the legacy long training field (L-LTF).

In Example 18c, the subject matter of any one of Examples 15c to 17c can optionally include that the one or more processors are configured to decode the legacy signal (L-SIG) field, and that the antenna tuning circuit is configured to tune the antenna by applying the preferred tuning configuration after the legacy signal (L-SIG) field has been decoded.

In Example 19c, the subject matter of any one of Examples 1c to 18c can optionally include that the radio frequency signal is received via a communication channel between the antenna and a device external to the radiohead circuit (e.g., another communication device, for example including one or more other radiohead circuits).

Example 20c is a communication device including one or more radiohead circuits according to any one of Examples 1 to 19.

Examples 21c is a radiohead circuit. The radiohead circuit includes an antenna, and an antenna tuning circuit. The antenna and the antenna tuning circuit are coupled with one another. The antenna tuning circuit is configured to tune the antenna by applying a first tuning configuration and a second tuning configuration. The antenna is configured to receive a radio frequency signal while the first tuning configuration is applied, and to receive the same radio frequency signal while the second tuning configuration is applied. The radiohead circuit further includes one or more processors. The one or more processors and the antenna tuning circuit are coupled with one another. The one or more processors are configured to determine a first signal to noise ratio as a first ratio of the power of the radio frequency signal to the noise power received by the antenna while the first configuration signal is applied, to determine a second signal to noise ratio as a second ratio of the power of the radio frequency signal to the noise power received by the antenna while the second tuning configuration is applied, and to select the first tuning configuration as preferred tuning configuration in case the first signal to noise ratio is greater than the second signal to noise ratio or select the second tuning configuration as preferred tuning configuration in case the second signal to noise ratio is greater than the first signal to noise ratio.

In Example 22c, the subject matter of Example 21c can optionally include that the antenna tuning circuit is configured to tune the antenna by applying a tuning configuration in accordance with the selected preferred tuning configuration.

Example 23c is a radiohead circuit. The radiohead circuit includes receiving means, and tuning means for tuning the receiving means by applying a first tuning configuration and a second tuning configuration. The receiving means are for receiving a radio frequency signal while the first tuning configuration is applied, and for receiving the same radio frequency signal while the second tuning configuration is applied. The radiohead circuit may further include processing means for determining a first signal to noise ratio associated with the received radio frequency signal and the first tuning configuration, for determining a second signal to noise ratio associated with the received radio frequency signal and the second tuning configuration, and for determining a preferred tuning configuration by using the first signal to noise ratio and the second signal to noise ratio.

In Example 24c, the subject matter of Example 23c can optionally include that the tuning means are for tuning the receiving means by applying a tuning configuration in accordance with the determined preferred tuning configuration.

Example 25c is a radiohead circuit. The radiohead circuit may include a memory storing a preferred tuning configuration, an antenna, and an antenna tuning circuit configured to tune the antenna by applying the preferred tuning configuration stored in the memory. The preferred tuning configuration is determined by using a first signal to noise ratio and a second signal to noise ratio, the first signal to noise ratio being associated with a received radio frequency signal and a first tuning configuration, and the second signal to noise ratio being associated with the same received radio frequency signal and a second tuning configuration.

Example 26c is a method of tuning an antenna of a radiohead circuit. The method may include applying a first tuning configuration and a second tuning configuration, receiving a radio frequency signal at the antenna while the first tuning configuration is applied, and receiving the same radio frequency signal at the antenna while the second tuning configuration is applied, determining a first signal to noise ratio associated with the received radio frequency signal and the first tuning configuration, determining a second signal to noise ratio associated with the received radio frequency signal and the second tuning configuration, and determining a preferred tuning configuration by using the first signal to noise ratio and the second signal to noise ratio.

In Example 27c, the subject matter of Example 26c can optionally include that the method further includes applying a tuning configuration in accordance with the determined preferred tuning configuration.

Example 28c is a method of tuning an antenna of a radiohead circuit. The method may include applying a first tuning configuration and a second tuning configuration, receiving a legacy preamble portion of a radio frequency signal at the antenna while the first tuning configuration is applied, and receiving the same legacy preamble portion of the radio frequency signal at the antenna while the second tuning configuration is applied, determining a first signal to noise ratio associated with the received legacy preamble portion of the radio frequency signal and the first tuning configuration, determining a second signal to noise ratio associated with the received legacy preamble portion of the radio frequency signal and the second tuning configuration, and determining a preferred tuning configuration by using the first signal to noise ratio and the second signal to noise ratio.

Example 1d is a communication device. The communication device may include a radiohead circuit including an antenna and an antenna tuning circuit, the antenna tuning circuit being configured to tune the antenna by applying a first tuning configuration, the antenna being configured to receive a first radio frequency signal while the first tuning configuration is applied, and one or more processors configured to determine a first signal parameter associated with the received first radio frequency signal and the first tuning configuration, and to determine a first tuning configuration change by using the first signal parameter.

In Example 2d, the subject matter of Example 1d can optionally include that the first signal parameter includes at least one of a first error vector magnitude, a first signal to noise ratio, a first airlink utilization, or a first throughput.

In Example 3d, the subject matter of any one of Examples 1d or 2d can optionally include that the antenna tuning circuit is configured to tune the antenna by applying a second tuning configuration, the second tuning configuration being determined in accordance with the first tuning configuration and the first tuning configuration change.

In Example 4d, the subject matter of Example 3d can optionally include that the antenna is further configured to receive a second radio frequency signal while the second configuration is applied, and that the one or more processors are further configured to determine a second signal parameter associated with the received second radio frequency signal and the second tuning configuration, and to determine a second tuning configuration change by using the second signal parameter.

In Example 5d, the subject matter of Example 4d can optionally include that the antenna tuning circuit is configured to tune the antenna by applying a third tuning configuration, the third tuning configuration being determined in accordance with the second tuning configuration and the second tuning configuration change.

In Example 6d, the subject matter of any one of Examples 4d or 5d can optionally include that the second signal parameter is at least one of a second error vector magnitude, a second signal to noise ratio, a second airlink utilization or a second throughput.

In Example 7d, the subject matter of any one of Examples 2d to 6d can optionally include that the one or more processors are further configured to determine the second tuning configuration change in accordance with a comparison of the second signal to noise ratio with the first signal to noise ratio, and/or in accordance with a comparison of the first error vector magnitude with the second error vector magnitude, and/or in accordance with a comparison of the second airlink utilization with the first airlink utilization, and/or in accordance with a comparison of the second throughput with the first throughput.

In Example 8d, the subject matter of any one of Examples 1d to 7d can optionally include that the first tuning configuration represents a first impedance tuning of the antenna, and/or a first aperture tuning of the antenna, and/or a first tuning of the gain of the antenna.

In Example 9d, the subject matter of Example 8d can optionally include that the first tuning configuration change represents a (first) change in an impedance of the antenna, and/or a (first) change in an aperture of the antenna, and/or a (first) change in the gain of the antenna.

In Example 10d, the subject matter of any one of Examples 1d to 9d can optionally include that the one or more processors are configured to process the received first radio frequency signal in the frequency domain.

In Example 11d, the subject matter of any one of Examples 1d to 10d can optionally include that the first radio frequency signal is received via a communication channel between the antenna and a device external to the communication device.

In Example 12d, the subject matter of any one of Examples 1d to 11d can optionally include that the first radio frequency signal is configured as a first frame signal configured in accordance with IEEE 802.11 standards.

In Example 13d, the subject matter of Example 12d can optionally include that the first frame signal is configured according to at least one of a high-throughput PHY Protocol Data Unit (HT PPDU) format, a very high-PHY Protocol Data Unit (VHT PPDU) format, and a high energy PHY Protocol Data Unit (HE PPDU) format.

In Example 14d, the subject matter of any one of Examples 12d or 13d can optionally include that the one or more processors are configured to determine the first signal parameter and in accordance with the entire content of the received first frame signal.

In Example 15d, the subject matter of any one of Examples 4d to 14d can optionally include that the second radio frequency signal is configured as a second frame signal configured in accordance with IEEE 802.11 standards, and that the antenna tuning circuit is configured to tune the antenna by applying the second tuning configuration prior to the antenna receiving the second frame signal.

In Example 16d, the subject matter of any one of Examples 1d to 15d can optionally include that the one or more processors and the radiohead circuit are digitally coupled with one another.

In Example 17d, the subject matter of any one of Examples 1d to 15d can optionally include that the radiohead circuit further includes a transceiver chain configured to receive the first radio frequency signal via the antenna. The transceiver chain is configured to receive the first radio frequency signal according to a first reception scheme. The one or more processors are further configured to determine the first signal parameter associated with the first radio frequency signal and the first reception scheme. The one or more processors are further configured to determine a first reception scheme change by using the first signal parameter.

In Example 18d, the subject matter of Example 17d can optionally include that the first reception scheme includes a first throughput with which the transceiver chain receives the first radio frequency signal.

In Example 19d, the subject matter of Example 17d or 18d can optionally include that first reception scheme change includes an increase in the throughput in case the first signal parameter is indicative of successful reception of the first radio frequency signal.

In Example 20d, the subject matter of any one of Examples 17d to 19d can optionally include that first reception scheme change includes a decrease in the throughput in case the first signal parameter is indicative of unsuccessful reception of the first radio frequency signal.

In Example 21d, the subject matter of any one of Examples 1d to 20d can optionally include that the one or more processors are further configured to determine a first feedback signal indicative of the first signal parameter.

In Example 22d, the subject matter of Example 21d can optionally include that the feedback signal includes an acknowledgment signal.

In Example 23d, the subject matter of any one of Examples 17d to 22d can optionally include that the one or more processors are further configured to determine a second reception scheme in accordance with the first reception scheme and the first reception scheme change.

In Example 24d, the subject matter of Example 23d can optionally include that the transceiver chain is configured to receive a second radio frequency signal via the antenna. The transceiver chain is configured to receive the second radio frequency signal according to the second reception scheme. The one or more processors are further configured to determine a second signal parameter associated with the received second radio frequency signal and the second reception scheme. The one or more processors are further configured to determine a second reception scheme change by using the second signal parameter.

Example 25d is a communication device including a radiohead circuit, the radiohead circuit including a transceiver chain configured to receive a first radio frequency signal according to a first reception scheme. The device further includes one or more processors configured to determine a first signal parameter associated with the received first radio frequency signal and the first reception scheme, and to determine a first reception scheme change by using the first signal parameter.

In Example 26d, the subject matter of Example 25d can optionally include that the first signal parameter is at least one of a first error vector magnitude, a first signal to noise ratio, a first airlink utilization, or a first throughput.

In Example 27d, the subject matter of Example 25d or 26d can optionally include that the radiohead circuit further includes an antenna and an antenna tuning circuit, the antenna tuning circuit being configured to tune the antenna by applying a first tuning configuration, the antenna being configured to receive the first radio frequency signal while the first tuning configuration is applied, and that the one or more processors are configured to determine the first signal parameter associated with the received first radio frequency signal and the first tuning configuration, and to determine a first tuning configuration change by using the first signal parameter.

Example 28d is a communication device. The communication device may include a radiohead circuit including an antenna and an antenna tuning circuit, the antenna and the antenna tuning circuit being coupled with one another. The antenna tuning circuit is configured to tune the antenna by applying a first tuning configuration. The antenna is configured to receive a first radio frequency signal while the first tuning configuration is applied. The communication device may further include one or more processors digitally coupled with the radiohead circuit. The one or more processors are configured to determine at least one of a first signal to noise ratio, a first error vector magnitude, a first airlink utilization, and/or a first throughput. associated with the received first radio frequency signal and the first tuning configuration, and to determine a first tuning configuration change in accordance with the at least one of the first signal to noise ratio, the first error vector magnitude, the first airlink utilization, and/or the first throughput.

In Example 29d, the subject matter of Example 28d can optionally include that the antenna tuning circuit is configured to tune the antenna by applying a second tuning configuration, the second tuning configuration being determined in accordance with the first tuning configuration and the first tuning configuration change.

Example 30d is a communication device. The communication device may include a radiohead circuit including receiving means, and tuning means for tuning the receiving means by applying a first tuning configuration. The receiving means are for receiving a first radio frequency signal while the first tuning configuration. The communication device may further include processing means for determining a first signal parameter associated with the received first radio frequency signal and the first tuning configuration, and for determining a first tuning configuration change by using the first signal parameter.

In Example 31d, the subject matter of Example 30d can optionally include that the tuning means are for tuning the receiving means by applying a second tuning configuration, the second tuning configuration being determined in accordance with the first tuning configuration and the first tuning configuration change.

Example 32d is a method of tuning an antenna of a radiohead circuit. The method may include applying a first tuning configuration to the antenna, receiving a first radio frequency signal while the first tuning configuration is applied, determining a first signal parameter associated with the received first radio frequency signal and the first tuning configuration, and determining a tuning configuration change by using the first signal parameter.

In Example 33d, the subject matter of Example 32d can optionally include that the first signal parameter is at least one of a first error vector magnitude, a first signal to noise ratio, a first airlink utilization, and/or a first throughput.

In Example 34d, the subject matter of any one of Examples 32d or 33d can optionally include that the first radio frequency signal is configured as a first frame signal configured in accordance with IEEE 802.11 standards.

In Example 35d, the subject matter of any one of Examples 32d to 34d can optionally include that the method further includes applying a second tuning configuration to the antenna, the second tuning configuration being determined in accordance with the first tuning configuration and the first tuning configuration change.

In Example 36d, the subject matter of any one of Examples 31d to 35d can optionally include receiving the first radio frequency signal according to a first signal reception scheme, determining the first signal parameter associated with the received first radio frequency signal and the first signal reception scheme, and determining a signal reception scheme change by using the first signal parameter.

Example 37d is a method of tuning signal reception at a radiohead circuit, the method including: receiving a first radio frequency signal according to a first signal reception scheme, determining a first signal parameter associated with the received first radio frequency signal and the first signal reception scheme, and determining a signal reception scheme change by using the first signal parameter.

In Example 38d, the subject matter of Example 37d can optionally include applying a first tuning configuration to an antenna, receiving the first radio frequency signal while the first tuning configuration is applied, determining the first signal parameter associated with the received first radio frequency signal and the first tuning configuration, and determining a tuning configuration change by using the first signal parameter.

Example 39d is a communication device including a radiohead circuit. The radiohead circuit includes a transceiver chain, an antenna and an antenna tuning circuit, the antenna tuning circuit being configured to tune the antenna by applying a first tuning configuration, the transceiver chain being configured to transmit a first radio frequency signal via the antenna while the first configuration is applied. The device further includes one or more processors configured to receive a first feedback signal indicative of a first signal parameter associated with the transmitted first radio frequency signal and the first tuning configuration, and determine a first tuning configuration change by using the first signal parameter.

In Example 40d, the subject matter of Example 39d can optionally include that the first signal parameter includes a network performance parameter indicative of a quality of a communication between the communication device and another communication device receiving the transmitted first radio frequency signal.

In Example 41d, the subject matter of Example 39d or 40d can optionally include that the first signal parameter includes at least one of a of a first error vector magnitude, a first signal to noise ratio, a first airlink utilization, or a first throughput.

In Example 42d, the subject matter of any one of Examples 39d to 41d can optionally include that the first feedback signal includes a first acknowledgment signal indicative of a reception of the first radio frequency signal.

In Example 43d, the subject matter of any one of Examples 39d to 42d can optionally include that the transceiver chain is further configured to transmit the first radio frequency signal according to a first transmission scheme, and that the one or more processors are configured to determine a first transmission scheme change by using the first signal parameter. Illustratively, the first signal parameter may be (further) associated with the first transmission scheme.

In Example 44d, the subject matter of Example 43d can optionally include that the first transmission scheme includes a first throughput with which the transceiver chain transmits the first radio frequency signal.

In Example 45d, the subject matter of Example 44d can optionally include that the first transmission scheme change includes an increase in the first throughput in case the first signal parameter is indicative of successful communication between the communication device and another communication device receiving the first transmitted signal.

In Example 46d, the subject matter of any one of Examples 39d to 45d can optionally include that the one or more processors are configured to determine a second tuning configuration in accordance with the first tuning configuration and the first tuning configuration change.

In Example 47d, the subject matter of Example 46d can optionally include that the antenna tuning circuit is configured to tune the antenna by applying the second tuning configuration, the transceiver chain is configured to transmit a second radio frequency signal via the antenna while the second configuration is applied. The one or more processors are configured to receive a second feedback signal indicative of a second signal parameter associated with the transmitted second radio frequency signal, and determine a second tuning configuration change by using the second signal parameter.

In Example 48d, the subject matter of Example 43d can optionally include that the one or more processors are configured to determine a second transmission scheme in accordance with the first transmission scheme and the first transmission scheme change.

In Example 49d, the subject matter of Example 48d can optionally include that the transceiver chain is configured to transmit a second radio frequency signal according to the second transmission scheme, and that the one or more processors are configured to receive a second feedback signal indicative of a second signal parameter associated with the transmitted second radio frequency signal, and determine a second transmission scheme change by using the second signal parameter.

In Example 50d, the subject matter of any one of Examples 39d to 49d can optionally include that the transmitted first radio frequency signal is configured as a first frame signal configured in accordance with IEEE 802.11 standards.

In Example 51d, the subject matter of Example 50d can optionally include that the first frame signal is configured according to at least one of a high-throughput PHY Protocol Data Unit (HT PPDU) format, a very high-PHY Protocol Data Unit (VHT PPDU) format, and a high energy PHY Protocol Data Unit (HE PPDU) format.

Example 52d is a communication device including a radiohead circuit, the radiohead circuit including a transceiver chain configured to transmit a first radio frequency signal according to a first transmission scheme. The device further includes one or more processors configured to receive a first feedback signal indicative of a first signal parameter associated with the transmitted first radio frequency signal and the first transmission scheme, and to determine a first transmission scheme change by using the first signal parameter.

In Example 53d, the subject matter of Example 52d can optionally include that the first signal parameter is at least one of a first error vector magnitude, a first signal to noise ratio, a first airlink utilization, or a first throughput.

In Example 54d, the subject matter of Example 52d or 53d can optionally include that the radiohead circuit further includes an antenna and an antenna tuning circuit, the antenna tuning circuit being configured to tune the antenna by applying a first tuning configuration, the transceiver chain being configured to transmit the first radio frequency signal via the antenna while the first tuning configuration is applied, that the first signal parameter is further associated with the first tuning configuration, and that the one or more processors are configured to determine a first tuning configuration change by using the first signal parameter.

Example 55d is a method of tuning an antenna of a radiohead circuit. The method may include applying a first tuning configuration to the antenna, transmitting a first radio frequency signal while the first tuning configuration is applied, receiving a first feedback signal indicative of a first signal parameter associated with the transmitted first radio frequency signal and the first tuning configuration, and determining a tuning configuration change by using the first signal parameter.

In Example 56d, the subject matter of Example 55d can optionally include transmitting the first radio frequency signal according to a first transmission scheme, the first signal parameter being further associated with the first transmission scheme, and determining a transmission scheme change by using the first signal parameter.

Example 57d is a method of tuning signal transmission by a radiohead circuit, the method including: transmitting a first radio frequency signal according to a first signal transmission scheme, receiving a first feedback signal indicative of a first signal parameter associated with the received first radio frequency signal and the first signal transmission scheme, and determining a signal transmission scheme change by using the first signal parameter.

In Example 58d, the subject matter of Example 57d can optionally include applying a first tuning configuration to an antenna, transmitting the first radio frequency signal while the first tuning configuration is applied, the first signal parameter being further associated with the first tuning configuration, and determining a tuning configuration change by using the first signal parameter.

Example 59d is a communication device including a radiohead circuit. The radiohead circuit includes transceiving means, an antenna and antenna tuning means for tuning the antenna by applying a first tuning configuration, the transceiving means being for transmitting a first radio frequency signal via the antenna while the first configuration is applied. The communication device further includes processing means for receiving a first feedback signal indicative of a first signal parameter associated with the transmitted first radio frequency signal and the first tuning configuration, and determining a first tuning configuration change by using the first signal parameter.

Example 59d is a communication device including a radiohead circuit. The radiohead circuit includes transceiving means for transmitting a first radio frequency signal according to a first transmission scheme. The communication device further includes processing means for receiving a first feedback signal indicative of a first signal parameter associated with the transmitted first radio frequency signal and the first transmission scheme, and determining a first transmission scheme change by using the first signal parameter.

Example 60d is a communication device. The communication device may include a radiohead circuit including an antenna, a transceiver chain configured to receive a first radio frequency receive signal via the antenna and configured to transmit a first radio frequency transmit signal via the antenna, and an antenna tuning circuit, the antenna tuning circuit being configured to tune the antenna by applying a first tuning receive configuration and a first tuning transmit configuration, the transceiver chain being configured to receive the first radio frequency receive signal via the antenna while the antenna tuning circuit applies the first tuning receive configuration, the transceiver chain being further configured to transmit the first radio frequency transmit signal via the antenna while the antenna tuning circuit applies the first tuning transmit configuration. The communication device further includes one or more processors configured to determine a first receive signal parameter associated with the received first radio frequency receive signal and the first tuning receive configuration, and to determine a first tuning receive configuration change by using the first receive signal parameter. The one or more processors may be further configured to receive a first feedback signal indicative of a first transmit signal parameter associated with the transmitted first radio frequency transmit signal and the first tuning transmit configuration, and to determine a first tuning transmit configuration change by using the first transmit signal parameter.

Example 1e is a communication device. The communication device may include one or more radiohead circuits, each radiohead circuit including one or more antennas, an internal reference clock source configured to provide a reference clock signal for a local oscillator (LO) circuit of the radiohead circuit, and one or more transceiver chains configured to transmit and receive wireless signals via the one or more antennas. The one or more radiohead circuits are configured to receive training pilots from an external device and sample the training pilots using the internal reference clock source. The communication device may further include one or more processors digitally coupled to the one or more radiohead circuits and configured to detect a frequency of the received training pilots, to receive the sampled training pilots from the one or more radiohead circuits, and to tune the local oscillator circuit of each of the one or more radiohead circuits based on an evaluation of the detected frequency of the received training pilots and the sampled training pilots.

In Example 2e, the subject matter of Example 1e can optionally include that the local oscillator circuit is a digital phase locked loop (DPLL) circuit configured to provide a local oscillator (LO) signal for the one or more transceiver chains.

In Example 3e, the subject matter of Example 2e can optionally include that the DPLL circuit includes a time-to-digital converter (TDC) coupled to the internal reference clock source.

In Example 4e, the subject matter of Example 3e can optionally include that the TDC is configured to sample the received training pilots using the reference clock signal.

In Example 5e, the subject matter of Example 4e can optionally include that the TDC is configured to generate digital signals representing discrete waveforms of phase errors of the sampled training pilots for communicating to the processor.

In Example 6e, the subject matter of any one of Examples 2e to 5e can optionally include that the DPLL includes a digital loop filter (DLF) and a digitally controlled oscillator (DCO).

In Example 7e, the subject matter of any one of Examples 3e to 6e can optionally include that the one or more processors are configured to tune the local oscillator of each of the one or more radiohead circuits by generating digital signals and transmitting said digital signals to the internal reference clock source.

In Example 8e, the subject matter of Example 7e can optionally include that the digital signal represents discrete time waveforms of settings applied to the internal reference clock source.

In Example 9e, the subject matter of any one of Examples 7e or 8e can optionally include that the internal reference clock source is configured to generate an analog signal and communicates the analog signal to the TDC of the DPLL to tune the local oscillator circuit.

In Example 10e, the subject matter of Example 9e can optionally include that the analog signal represents continuous time waveforms of outputs of the internal reference clock source.

In Example 11e, the subject matter of any one of Examples 1e to 10e can optionally include that the internal reference clock source is a crystal oscillator, a thin-film bulk acoustic resonator, a microelectromechanical system (MEMS) oscillator, or a bulk acoustic wave resonator.

In Example 12e, the subject matter of any one of Examples 1e to 11e can optionally include that each of the one or more radiohead circuits includes a front-end module coupled between the one or more antennas and the one or more transceiver chains.

In Example 13e, the subject matter of Example 12e can optionally include that the front-end module includes one or more power amplifiers (PAs) or low-noise amplifiers (LNAs).

In Example 14e, the subject matter of any one of Examples 1e to 13e can optionally include that the training pilots are transmitted via a wireless communication protocol.

In Example 15e, the subject matter of Example 14e can optionally include that the wireless communication protocol is a wide local area network (WLAN) communication protocol.

In Example 16e, the subject matter of any one of Examples 1e to 15e can optionally include that the external device is a wireless access point.

In Example 17e, the subject matter of any one of Examples 1e to 16e can optionally include that the external device is configured to identify the one or more radiohead circuits via a unique identification.

In Example 18e, the subject matter of Example 17e can optionally include that the unique identification is a Medium Access Control (MAC) signature.

In Example 19e, the subject matter of any one of Examples 1e to 18e can optionally include that tuning the local oscillator circuit of each of the one or more radiohead circuits corrects drifting of the reference clock signal generated by the internal reference clock source.

In Example 20e, the subject matter of any one of Examples 1e to 19e can optionally include that the communication device further includes a digital link coupling each of the one or more radiohead circuits to the processor.

Example 21e is a communication device. The communication device may include one or more radiohead circuits, each radiohead circuit including one or more antennas, an internal reference clock source with an output terminal coupled to an input terminal of a local oscillator circuit of the radiohead circuit and configured to provide a reference clock signal for the local oscillator circuit, and one or more transceiver chains with terminals coupled to the local oscillator (LO) circuit and configured to transmit and receive wireless signals based on a LO signal provided by the LO circuit. The one or more radiohead circuits are configured to receive training pilots from an external device and sample the training pilots using the internal reference clock source. The one or more radiohead circuits include a communication terminal digitally coupled to one or more processors. The one or more processors are configured to detect a frequency of the received training pilots, to receive the sampled training pilots from the one or more radiohead circuits, and to tune the local oscillator circuit of each of the one or more radiohead circuits based on an evaluation of the detected frequency of the received training pilots and the sampled training pilots.

In Example 22e, the subject matter of Example 21e can optionally include that the LO circuit is a digital phase locked loop (DPLL) circuit having a terminal coupled to the one or more transceiver chains.

In Example 23e, the subject matter of Example 22e can optionally include that the DPLL circuit includes a time-to-digital converter (TDC) having a terminal coupled to the internal reference clock source.

In Example 24e, the subject matter of Example 23e can optionally include that the TDC is configured to sample the received training pilots using reference clock signal.

In Example 25e, the subject matter of Example 24e can optionally include that the TDC generates digital signals representing discrete waveforms of phase errors of the sampled training pilots for communicating to the processor via the communication terminal.

In Example 26e, the subject matter of any one of Examples 21e to 25e can optionally include that the one or more processors are configured to tune the LO circuit of each of the one or more radiohead circuits by generating digital signals and transmitting said digital signals to the internal reference clock source.

In Example 27e, the subject matter of Example 26e can optionally include that the digital signal represents discrete time waveforms of settings applied to the internal reference clock source.

In Example 28e, the subject matter of any one of Examples 26e or 27e can optionally include that the internal reference clock source generates an analog signal and communicates the analog signal to the TDC of the DPLL to tune the LO circuit.

In Example 29e, the subject matter of Example 28e can optionally include that the analog signal represents continuous time waveforms of outputs of the internal reference clock source.

In Example 30e, the subject matter of any one of Examples 21e to 29e can optionally include that the internal reference clock source is a crystal oscillator, a thin-film bulk acoustic resonator, a microelectromechanical system (MEMS) oscillator, or a bulk acoustic wave resonator.

Example 31e is a method for a communication device to synchronize a local oscillator circuit of a radiohead circuit with an external device. The method may include receiving training pilots from the external device, sampling the received training pilots using an internal reference clock source of the radiohead circuit, detecting a training pilot frequency, and tuning the local oscillator circuit based on a discrepancy of the training pilot frequency with that of the sampled received training pilots.

In Example 32e, the subject matter of Example 31e can optionally include that the sampling of the received training pilots is performed by a time-to-digital converter (TDC) in a digital phase locked loop (DPLL) circuit of the radiohead circuit.

In Example 33e, the subject matter of Example 32e can optionally include that the method further includes the radiohead circuit digitally transmitting the sampled received training pilots to a processor of the communication device.

In Example 34e, the subject matter of Example 33e can optionally include performing the detecting of the training pilot frequency and determining the discrepancy of the training pilot frequency with that of the sampled received training pilots.

In Example 35e, the subject matter of Example 34e can optionally include that the method further includes transmitting, to the internal reference clock source of the radiohead circuit, a digital signal.

In Example 36e, the subject matter of Example 35e can optionally include that the digital signal represents discrete time waveforms of frequency settings to apply to the internal reference clock source.

In Example 37e, the subject matter of any one of Examples 35e or 36e can optionally include that the method further includes transmitting, by the internal reference clock source to a time-to-digital converter (TDC) in a digital phase locked loop (DPLL) circuit, an analog signal representing continuous time waveforms of the internal reference clock source.

In Example 38e, the subject matter of any one of Examples 31e to 37e can optionally include that the training pilots are transmitted via a wireless communication protocol.

In Example 39e, the subject matter of Example 38e can optionally include that the communication protocol is a wide local area network (WLAN) communication protocol.

In Example 40e, the subject matter of any one of Examples 31e to 39e can optionally include that the external device is a wireless access point.

In Example 41e, the subject matter of any one of Examples 31e to 40e can optionally include that the external device identifies the radiohead circuit via a unique identification.

In Example 42e, the subject matter of Example 41e can optionally include that the unique identification is a Medium Access Control (MAC) signature.

Example 43e is a method. The method may include transmitting, by an access point (AP), training pilots based on an output of a reference clock of the AP, listening for and receiving the training pilots, sampling the training pilots using an internal reference clock source, detecting a frequency of the training pilots, and tuning a local oscillator (LO) circuit according to a discrepancy between the detected frequency of the training pilots and the sampled training pilots.

Example 44e is a method. The method may include obtaining samples of a reference clock signal generated by the internal reference clock source (e.g., of a radiohead circuit); encoding the samples for wireless transmission to the external device; receiving feedback from the external device based on the encoded samples; and tuning the internal reference clock source based on the received feedback to synchronize the internal reference clock source with the external device.

In Example 45e, the subject matter of Example 44e may optionally include obtaining the samples of the reference clock signal in response to a signal from the external device.

In Example 46e, the subject matter of Example 45e may optionally include wherein the signal from the external device triggers using one or more pilot slots in a communication protocol for encoding the samples for transmission to the external device.

In Example 47e, the subject matter of Example 46e may optionally include wherein the communication protocol is a wide local area network (WLAN) communication protocol.

In Example 48e, the subject matter of Examples 44e-47e may optionally include generating the received feedback from the external device at an error measurement circuit of the external device.

In Example 49e, the subject matter of Example 48e may optionally include wherein the error measurement circuit is a time-to-digital converter (TDC).

In Example 50e, the subject matter of Example 49e may optionally include generating, at the error measurement circuit, a correctional signal based on the received feedback and a reference clock signal of the external device.

In Example 51e, the subject matter of Example 50e may optionally include using the correctional signal for tuning the internal reference clock source to correct drifting of the reference clock signal generated by the internal reference clock source.

In Example 52e, the subject matter of Examples 44e-51e may optionally include wherein the external device is a wireless access point.

In Example 53e, the subject matter of Examples 44e-52e may optionally include wherein the external device identifies the radiohead via a unique identification.

In Example 54e, the subject matter of Example 53e may optionally include wherein the unique identification is a Medium Access Control (MAC) signature.

Example 55e is a communication device with one or more radiohead circuits. Each radiohead circuit may include one or more antennas; an internal reference clock source configured to provide a reference clock signal for the radiohead circuit; one or more transceiver chains configured transmit and receive wireless signals via the one or more antennas; and one or more processors configured to: obtain samples of the reference clock signal; encode the samples for transmission to an external device; receive feedback from the external device in response to the encoded samples; and tune the internal reference clock source based on the received feedback.

In Example 56e, the subject matter of Example 55e may include the one or more processors configured to obtain the samples of the reference clock signal in response to a signal received from the external device.

In Example 57e, the subject matter of Example 56e may optionally include wherein the signal from the external device triggers the one or more processors to use one or more pilot slots in a communication protocol for encoding the samples for transmission to the external device.

In Example 58e, the subject matter of Example 57e may optionally include wherein the communication protocol is a wide local area network (WLAN) communication protocol.

In Example 59e, the subject matter of Examples 55e-58e may optionally include wherein the received feedback from the external device is generated at an error measurement circuit of the external device.

In Example 60e, the subject matter of Example 59e may optionally include wherein the error measurement circuit is a time-to-digital converter (TDC).

In Example 61e, the subject matter of Example 60e may optionally include wherein the error measurement circuit yields a correctional signal based on the received feedback and an external device reference clock signal.

In Example 62e, the subject matter of Examples 55e-61e may optionally include wherein the external device is wireless access point.

In Example 63e, the subject matter of Examples 55e-62e may optionally include wherein the external device identifies the radiohead via a unique identification.

In Example 64e, the subject matter of Example 63e may optionally include wherein the unique identification is a Medium Access Control (MAC) signature.

In Example 65e, the subject matter of Examples 61e-63e may optionally include wherein the one or more processors are configured to tune the internal reference clock source based on the correctional signal to correct drifting of the reference clock signal generated by the internal reference clock source.

In Example 66e, the subject matter of Examples 55e-65e may optionally include a digital phase locked loop (DPLL) locked to the internal reference clock source and configured to provide a local oscillator (LO) signal to the one or more transceiver chains.

In Example 67e, the subject matter of Example 66e may optionally include wherein the DPLL includes a time-to-digital converter (TDC), a digital loop filter (DLF), and a digitally controlled oscillator (DCO).

In Example 68e, the subject matter of Examples 55e-67e may optionally include a digital interface to communicate digital signals over a digital link with one or more other circuits.

In Example 69e, the subject matter of Example 68e may optionally include wherein the one or more other circuits include a system on chip (SoC).

In Example 70e, the subject matter of Example 69e may optionally include wherein the SoC includes baseband circuitry.

In Example 71e, the subject matter of Examples 68e-70e may optionally include wherein the digital link is a high-throughput digital link.

In Example 72e, the subject matter of Examples 55e-71e may optionally include a radio frequency (RF) front-end (FE) coupled between the one or more antennas and the one or more transceiver chains.

In Example 73e, the subject matter of Examples 72e may optionally include the RF FE including one or more power amplifiers (PAs) or low-noise amplifiers (LNAs).

Example 74e is a communication device, for example, a wireless AP. The communication device may include one or more processors operably coupled to a wireless transceiver and configured to: wirelessly receive, from a radiohead circuit, samples of a radiohead reference clock signal via the wireless transceiver; generate a correction based on the received samples and a reference clock signal internal to the communication device; and encode the correction for wireless transmission to the radiohead via the wireless transceiver.

In Example 75e, the subject matter of Example 74e may optionally include the one or more processors configured to encode for transmission, via the wireless transceiver, a signal to trigger the radiohead to generate the samples of the radiohead reference clock signal.

In Example 76e, the subject matter of Example 75e may optionally include wherein the signal causes the radiohead to use one or more pilot slots in a communication protocol for encoding the samples of the radiohead reference clock signal for transmission.

In Example 77e, the subject matter of Example 76e may optionally include wherein the communication protocol is a wide local area network (WLAN) communication protocol.

In Example 78e, the subject matter of Examples 74e-77e may optionally include the one or more processors configured to generate the correction based on a comparison of the received samples and the reference clock signal internal to the communication device.

In Example 79e, the subject matter of Examples 74e-78e may optionally include the one or more processors including time-to-digital converter (TDC) processing circuitry.

In Example 80e, the subject matter of Examples 74e-79e may optionally include wherein the reference clock signal internal to the communication device is based on a local oscillator (LO) signal.

Example 81e is a communication device with one or more radiohead circuits. The radiohead circuits may include one or more antennas, each antenna including an antenna terminal; one or more transceiver chains, each transceiver chain including a first transceiver terminal coupled to one of the antenna terminals and a second transceiver terminal coupled to an internal reference clock source generating a reference clock signal; one or more processors including terminals coupled to one or more transceiver terminals, the one or more processors configured to: obtain samples of the reference clock signal, encode the samples for transmission to an external device, receive feedback from the external device in response to the encoded samples, and tune the internal reference clock source based on the received feedback.

In Example 82e, the subject matter of Example 81e may optionally include a radio frequency (RF) front-end (FE) coupled between the one or more antenna terminals and the one or more transceiver terminals.

In Example 83e, the subject matter of Example 82e may optionally include the RF FE including one or more power amplifiers (PAs) or low-noise amplifiers (LNAs).

In Example 84e, the subject matter of Examples 81e-83e may optionally include a digital interface terminal coupled to one or more other circuits via a digital link.

In Example 85e, the subject matter of Example 84e may optionally include wherein the one or more other circuits include a system on chip (SoC).

In Example 86e, the subject matter of Example 85e may optionally include wherein the SoC includes baseband circuitry.

In Example 87e, the subject matter of Examples 84e-86e may optionally include wherein the digital link is a high-throughput digital link.

In Example 88e, the subject matter of Examples 81e-87e may optionally include the one or more processors configured to obtain the samples of the reference clock signal in response to a signal received from the external device.

In Example 89e, the subject matter of Example 88e may optionally include wherein the signal from the external device triggers the one or more processors to use one or more pilot slots in a communication protocol for encoding the samples for transmission to the external device.

In Examples 90e, the subject matter of Example 89e may optionally include wherein the communication protocol is a wide local area network (WLAN) communication protocol.

In Example 91e, the subject matter of Examples 81e-90e may optionally include wherein the one or more processors are configured to tune the internal reference clock source based on a measurement al signal in the feedback to correct drifting of the reference clock signal generated by the internal reference clock source.

In Example 92e, the subject matter of Examples 81e-91e may optionally include a digital phase locked loop (DPLL) with a first DPLL terminal locked to the internal reference clock source and a second DPLL terminal configured to provide a local oscillator (LO) signal to the one or more transceiver chains.

In Example 93e, the subject matter of Example 92e may optionally include wherein the DPLL includes a time-to-digital converter (TDC), a digital loop filter (DLF), and a digitally controlled oscillator (DCO).

In Example 94e, an apparatus may include means to realize a device or perform a method as recited in Examples 1e-93e.

Example 1f is a communication device. The communication device may include a plurality of radiohead circuits, each including an internal reference clock source configured to generate a reference clock signal for the respective radiohead circuit, and one or more communication channels between the plurality of radiohead circuits. At least one of the plurality of radiohead circuits is configured to share its reference clock signal with one or more of the other plurality of radiohead circuits over the one or more communication channels. At least one of the plurality of radiohead circuits is configured to tune its internal clock source to generate a modified reference clock signal based at least in part on the reference clock signal shared by another one of the plurality of radiohead circuits.

In Example 2f, the subject matter of Example 1f can optionally include that each of the plurality of radiohead circuits includes a digital phase locked loop (DPLL) circuit configured to receive the reference clock signal from the internal reference clock source. The DPLL circuit is configured to provide a local oscillator (LO) signal for one or more transceiver chains of the respective radiohead circuit.

In Example 3f, the subject matter of any one of Examples 1f or 2f can optionally include that two or more radiohead circuits of the plurality of radiohead circuits each include a controlled reference loop.

In Example 4f, the subject matter of Example 3f can optionally include that the two or more radiohead circuits of the plurality of radiohead circuits each include an error measurement circuit in their controlled reference loop.

In Example 5f, the subject matter of Example 4f can optionally include that the error measurement circuit is a time-to-digital converter (TDC).

In Example 6f, the subject matter of Example 5f can optionally include that the controlled reference loop includes the TDC, a digital loop filter (DLF), and the internal reference clock source.

In Example 7f, the subject matter of Example 5f can optionally include that an output of the TDC is fed to the DLF, and an output of the DLF is fed to the internal reference clock source.

In Example 8f, the subject matter of any one of Examples 5f to 7f can optionally include that for each of the plurality of radiohead circuits, the respective reference clock signal is input to the TDC of the respective radiohead circuit.

In Example 8f, the subject matter of any one of Examples 5f to 7f can optionally include that an output of the internal reference clock source of a first of the two or more radiohead circuits is input to the TDC of the second of the two or more radiohead circuits via one of the one or more communication channels.

In Example 9f, the subject matter of Example 8f can optionally include that the output of the internal reference clock source of the second of the two or more radiohead circuits is input to the TDC of the first of the two or more radiohead circuits via one of the one or more communication channels.

In Example 10f, the subject matter of any one of Examples 1f or 2f can optionally include that two or more radiohead circuits are coupled to a common error measurement circuit via the one or more communication channels.

In Example 11f, the subject matter of Example 10f can optionally include that the common error measurement circuit is a time-to-digital converter (TDC).

In Example 12f, the subject matter of any one of Examples 10f or 11f can optionally include that the error measurement circuit is configured to receive the reference clock signal from each of the two or more radiohead circuits and determines a correction signal to provide to the two or more radiohead circuits.

In Example 13f, the subject matter of Example 12f can optionally include that each of the two or more radiohead circuits is configured to tune its internal clock source based on the correction signal.

In Example 14f, the subject matter of any one of Examples 12f or 13f can optionally include that the correction signal is fed to a digital loop filter (DLF) of each of the two or more radiohead circuits.

In Example 15f, the subject matter of Example 14f can optionally include that the DLF of each of the two or more radiohead circuits is configured to provide an output based on the correction signal to the internal reference clock source.

In Example 16f, the subject matter of any one of Examples 1f to 15f can optionally include that the internal reference clock source is a crystal oscillator, a thin-film bulk acoustic resonator, a microelectromechanical system (MEMS) oscillator, or a bulk acoustic wave resonator.

In Example 17f, the subject matter of any one of Examples 2f to 16f can optionally include that the DPLL of each respective radiohead circuit is configured to provide the respective radiohead circuit components with a local oscillator (LO) signal.

In Example 18f, the subject matter of Example 17f can optionally include that the respective radiohead circuit components include one or more circuits in a transceiver of the radiohead circuit.

Example 19f is a communication device. The communication device may include a plurality of radiohead circuits, each including an internal reference clock source configured to generate a reference clock signal for the respective radiohead circuit, a reference clock signal output terminal, and a clock correction input terminal, and one or more communication channels between the plurality of radiohead circuits. At least one of the plurality of radiohead circuits is configured to share its reference clock signal with one or more of the other plurality of radiohead circuits over the one or more communication channels via its reference clock signal output terminal. At least one of the plurality of radiohead circuits is configured to tune its internal clock source to generate a modified reference clock signal based at least in part on the reference clock signal received at the clock correction input terminal and communicated to it from another one of the plurality of radiohead circuits.

In Example 20f, the subject matter of Example 19f can optionally include that each of the plurality of radiohead circuits including a digital phase locked loop (DPLL) configured to receive the reference clock signal from the internal reference clock source.

In Example 21f, the subject matter of any one of Examples 19f or 20f can optionally include that two or more radiohead circuits of the plurality of radiohead circuits each include a controlled reference loop including an error measurement circuit, a digital loop filter, and the internal reference clock source. The clock correction input terminal is at an input of the error measurement circuit.

In Example 22f, the subject matter of Example 21f can optionally include that the error measurement circuit is a time-to-digital converter (TDC).

In Example 23f, the subject matter of Example 22f can optionally include that the controlled reference loop includes the TDC, a digital loop filter (DLF), and the internal reference clock source.

In Example 24f, the subject matter of Example 22f can optionally include that the TDC including an output terminal coupled to an input terminal of the DLF, and the DLF includes an output terminal coupled to an input terminal of the internal reference clock source.

In Example 25f, the subject matter of any one of Examples 21f to 24f can optionally include that for each of the plurality of radiohead circuits, the reference clock signal is fed to a first input terminal of the TDC.

In Example 26f, the subject matter of any one of Examples 21f to 25f can optionally include that the reference clock signal output terminal of a first of the two or more radiohead circuits is coupled to the error measurement circuit of the second of the two or more radiohead circuits via one of the one or more communication channels.

In Example 27f, the subject matter of Example 26f can optionally include that the reference clock signal output terminal of the second of the two or more radiohead circuits is coupled to the error measurement circuit of the first of the two or more radiohead circuits via one of the one or more communication channels.

In Example 28f, the subject matter of any one of Examples 19f to 27f can optionally include that the reference clock signal output terminal of two or more radiohead circuits are coupled to one or more input terminals of a common error measurement circuit via the one or more communication channels.

In Example 29f, the subject matter of Example 28f can optionally include that the common error measurement circuit is a time-to-digital converter (TDC).

In Example 30f, the subject matter of any one of Examples 28f or 29f can optionally include that the common error measurement circuit includes one or more output terminals coupled to the clock correction input terminal of the two or more radiohead circuits for providing a correction signal.

In Example 31f, the subject matter of Example 30f can optionally include that the clock correction input terminal is an input of a digital loop filter (DLF) of each of the two or more radiohead circuits.

In Example 32f, the subject matter of Example 30f can optionally include that the DLF includes an output terminal coupled to an input terminal of the internal reference clock source. The DLF of each of the two or more radiohead circuits provides an output based on the correction signal to the internal reference clock source.

In Example 33f, the subject matter of any one of Examples 19f to 32f can optionally include that the internal reference clock source is a crystal oscillator, a thin-film bulk acoustic resonator, a microelectromechanical system (MEMS) oscillator, or a bulk acoustic wave resonator.

In Example 34f, the subject matter of any one of Examples 20f to 33f can optionally include that the DPLL of each respective radiohead circuit is configured to provide the respective radiohead circuit components with a local oscillator (LO) signal.

In Example 35f, the subject matter of Example 34f can optionally include that the respective radiohead circuit components include one or more circuits in a transceiver of the radiohead circuit.

Example 36f is a method for a plurality of radiohead circuits to perform any one of Examples 1f to 35f.

Example 37f is a method. The method may include providing an internal reference cock source configured to generate a reference clock signal at each of a plurality of radiohead circuits, sharing, by at least one radiohead circuit of the plurality of radiohead circuits, its reference clock signal with one or more of the other plurality of radiohead circuits over one or more communication channels, and tuning, by at least one of the plurality of radiohead circuits, its internal clock source to generate a modified reference clock signal based at least in part on the reference clock signal shared by another one of the plurality of radiohead circuits.

Example 38f is a method for a plurality of radiohead circuits to establish a global virtual reference signal. The method may include providing an internal reference clock source at each of the plurality of radiohead circuits, cross-transmitting signals emanating from the internal reference clock source of each of the plurality of radiohead circuits to a time-to-digital converter (TDC) of other radiohead circuits of the plurality of radiohead circuits, dividing down the cross-transmitted signals by a constant ratio to form a TDC clock at each of the plurality of radiohead circuits, using the TDC clock to sample output signals of the internal reference clock source at each of the plurality of radiohead circuits, computing phase error signals out of phase samples used by the TDC at each of the plurality of radiohead circuits, filtering the phase error signals by a digital loop filter (DLF) in each of the plurality of radiohead circuits, and filtering the phase error signals by a digital loop filter (DLF) in each of the plurality of radiohead circuits.

Example 39f is a method for a plurality of radiohead circuits to establish a global virtual reference signal. The method may include providing an internal reference clock source at each of the plurality of radiohead circuits, transmitting signals emanating from each of the internal reference clock sources to a main board time-to-digital converter (TDC), dividing down the signal transmitted from one of the internal reference clock sources by a constant ratio to form a TDC clock, using the TDC clock to sample other of the signals transmitted from the other internal reference clock sources, computing a phase error signal from the relative phase samples used by the main board TDC, transmitting the phase error signal back to each of the plurality of radiohead circuits, filtering the phase error signals by a digital loop filter (DLF) in each of the plurality of radiohead circuits, and modifying the signals emanating from the internal reference clock source based on the filtering to establish the global virtual reference signal.

In Example 40f, an apparatus may include means to realize a device or perform a method as recited in Examples 1f-39f.

Example 1g is a communication device. The communication device may include a plurality of radiohead circuits, each of the respective radiohead circuits including a local oscillator (LO) circuit configured to generate a LO signal for the respective radiohead circuit, and a digital communication interface configured to communicate the LO signal and receive a LO correction, and one or more processors configured to receive the LO signal from each of the plurality of radiohead circuits, to compare the LO signal received from each of the plurality of radiohead circuits to a main reference, and to generate and transmit the LO correction to each of the plurality of radiohead circuits based on the comparison to the main reference. Each of the plurality of radiohead circuits is configured to apply the LO correction at the LO circuit or a digital-to-time converter (DTC) of the respective radiohead circuit.

In Example 2g, the subject matter of Example 1g can optionally include that each of the plurality of radiohead circuits includes one or more transceiver chains, a radio frequency (RF) front end (FE), and one or more antennas.

In Example 3g, the subject matter of any one of Examples 1g or 2g can optionally include that the LO circuit is a digital phase locked loop (DPLL) circuit.

In Example 4g, the subject matter of any one of Examples 1g to 3g can optionally include that the one or more processors include one or more digital communication interfaces coupled to the digital communication interfaces of each of the plurality of radiohead circuits.

In Example 5g, the subject matter of any one of Examples 1g to 4g can optionally include that the one or more processors includes an error measurement circuit.

In Example 6g, the subject matter of Example 5g can optionally include that the error measurement circuit includes a time-to-digital converter (TDC) or a phase detector (PD).

In Example 7g, the subject matter of any one of Examples 5g or 6g can optionally include that the error measurement circuit is configured to output one or more frequency or phase differences corresponding to the reference clock signals from the plurality of radiohead circuits.

In Example 8g, the subject matter of Example 7g can optionally include that the reference clock correction includes the one or more frequency or phase differences and is transmitted to each of the plurality of radiohead circuits via the one or more digital communication interfaces of the processor coupled to the digital communication interface of each of the plurality of radiohead circuits.

In Example 9g, the subject matter of any one of Examples 5g to 8g can optionally include that the main reference is based on a processor reference clock signal provided to the error measurement circuit.

In Example 10g, the subject matter of Example 9g can optionally include that the processor reference clock signal is input from a system on chip (SoC) crystal oscillator.

In Example 11g, the subject matter of any one of Examples 9g or 10g can optionally include that the error measurement circuit is configured to compare a frequency or phase of the LO signal from each of the plurality of radiohead circuits to a frequency or phase of the processor reference clock signal.

In Example 12g, the subject matter of Example 11 g can optionally include that the LO correction of each of the plurality of radiohead circuits is based on the comparison of the respective LO signal to the processor reference clock.

In Example 13g, the subject matter of any one of Examples 5g to 8g can optionally include that the main reference is based on an evaluation of the LO signals of the plurality of radiohead circuits by the error measurement circuit.

In Example 14g, the subject matter of Example 13g can optionally include that the evaluation of the LO signals of the plurality of radiohead circuits by the error measurement circuit includes determining an average frequency or phase of the LO signals of the plurality of radiohead circuits.

In Example 15g, the subject matter of Example 14g can optionally include that the average is used as the main reference.

In Example 16g, the subject matter of any one of Examples 13g to 15g can optionally include that the LO correction of each of the plurality of radiohead circuits is based on the evaluation.

In Example 17g, the subject matter of any one of Examples 1g to 16g can optionally include that the LO signals communicated from each of the plurality of radiohead circuits via the digital communication interfaces are embedded in a downlink to the one or more processors on a digital link connecting the respective digital communication interface to the one or more processors.

In Example 18g, the subject matter of any one of Examples 1g to 17g can optionally include that the LO signal communicated by the digital communication interface to the processor is a divided LO signal.

Example 19g is a communication device. The communication device may include a plurality of radiohead circuits, each of the respective radiohead circuits including a local oscillator (LO) circuit configured to generate a LO signal for the respective radiohead circuit, and a digital communication interface with an interface terminal configured to communicate the LO signal and receive a LO correction. The communication device may further include one or more processors digitally coupled to each of the plurality of radiohead circuits and including one or more processor digital communication interfaces including a processor terminal configured to receive the LO signal from each of the plurality of radiohead circuits, and a processor output terminal coupled to an input terminal of an error measurement circuit; the error measurement circuit configured to compare the LO signal received from each of the plurality of radiohead circuits to a main reference and generate the LO correction for each of the plurality of radiohead circuits based on the comparison to the main reference. The error measurement circuit includes a circuit output terminal coupled to the one or more processor digital communication interfaces. Each of the plurality of radiohead circuits is configured to apply the LO correction at the LO circuit or a digital-to-time converter (DTC) of the respective radiohead circuit.

In Example 20g, the subject matter of Example 19g can optionally include that each of the plurality of radiohead circuits includes the DTC including a terminal coupled to a transceiver chain, and the transceiver including a terminal coupled to one or more antennas.

In Example 21g, the subject matter of any one of Examples 19g or 20g can optionally include that the LO circuit is a digital phase locked loop (DPLL) including a terminal coupled to a digital-to-time converter (DTC).

In Example 22g, the subject matter of Example 21g can optionally include that the digital communication interface of each of the plurality of radiohead circuits includes at least one terminal coupled to one or more of the DPLL or the DTC.

In Example 23g, the subject matter of any one of Examples 19g to 22g can optionally include that the error measurement circuit includes a time-to-digital converter (TDC) or a phase detector (PD).

In Example 24g, the subject matter of any one of Examples 19g to 23g can optionally include that the error measurement circuit is configured to output one or more frequency or phase differences corresponding to the LO signals from the plurality of radiohead circuits.

In Example 25g, the subject matter of Example 24g can optionally include that the one or more frequency or phase differences are transmitted to each of the plurality of radiohead circuits via the one or more digital communication interfaces of the processor coupled to the digital communication interface of each of the plurality of radiohead circuits.

In Example 26g, the subject matter of any one of Examples 19g to 25g can optionally include that the main reference is based on a processor reference clock with a terminal coupled to an input terminal of the error measurement circuit.

In Example 27g, the subject matter of Example 26g can optionally include that the processor reference clock signal is input from a system on chip (SoC) crystal oscillator.

In Example 28g, the subject matter of any one of Examples 26g or 27g can optionally include that the error measurement circuit is configured to compare a frequency or phase of the LO signal from each of the plurality of radiohead circuits to a frequency or phase of the processor reference clock signal.

In Example 29g, the subject matter of Example 28g can optionally include that the LO correction of each of the plurality of radiohead circuits is based on the comparison of the respective LO signal to the processor reference clock.

In Example 30g, the subject matter of any one of Examples 19g to 25g can optionally include that the main reference is based on an evaluation of the LO signals of the plurality of radiohead circuits by the error measurement circuit.

In Example 31g, the subject matter of Example 30g can optionally include that the evaluation of the LO signals of the plurality of radiohead circuits by the error measurement circuit includes determining an average frequency or phase of the LO signals of the plurality of radiohead circuits.

In Example 32g, the subject matter of Example 31g can optionally include that the average frequency or phase of the LO signals of the plurality of radiohead circuits is used as the main reference.

In Example 33g, the subject matter of any one of Examples 30g to 32g can optionally include that the LO correction of each of the plurality of radiohead circuits is based on the evaluation.

In Example 34g, the subject matter of any one of Examples 19g to 33g can optionally include that the LO signals communicated from each of the plurality of radiohead circuits via the digital communication interfaces are embedded in a downlink to the processor on a digital link connecting the respective digital communication interface to the processor.

In Example 35g, the subject matter of any one of Examples 19g to 34g can optionally include that the LO signal communicated by the digital communication interface to the processor is a divided LO signal.

Example 36g is a method for a communication device to perform any one of Examples 1g to 35g.

Example 37g is a method for synchronizing a plurality of radiohead circuits with local oscillator (LO) circuits configured to generate LO signals. The method may include communicating the LO signal from each of the plurality of radiohead circuits to a processor, comparing the LO signal received from each of the plurality of radiohead circuits to a main reference, generating and transmitting a LO correction to each of the plurality of radiohead circuits based on the comparison to the main reference, and applying, by each of the plurality of radiohead circuits, the LO correction at the LO circuit or a digital-to-time converter (DTC) of the respective radiohead circuit.

In Example 38g, an apparatus may include means to realize a device or perform a method as recited in Examples 1g-37g.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

The term "antenna" or "antenna structure", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "calibration" as used herein may describe a process in which a device or a component of a device (e.g., a radiohead circuit, a transceiver chain, a component of a transceiver chain, and the like) is calibrated. Illustratively, the term calibration may describe a process in which one or more deviations of a behavior of a device or of one of its components from an expected or desired (e.g., target) behavior are corrected. Further illustratively, the term calibration may describe a process in which the operation of a device or of one of its components is aligned with a predefined or desired (e.g., target) operation of the device or of the component. By way of example, a calibration may describe a process in which nonlinearities are eliminated and/or in which mismatches are eliminated. In some aspects, a calibration may be understood as the process through which transmission (TX) and/or reception (RX) parameters and/or circuitry may be tuned to optimize TX power and signal integrity (e.g., EVM) and RX signal quality (e.g., RSSI, or signal-to-interference-plus-noise-ratio SINR).

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication device, comprising:

a first radiohead circuit comprising a first antenna and a first transceiver chain configured to transmit a first radio frequency signal associated with a first transmission configuration and to transmit a second radio frequency signal associated with a second transmission configuration, wherein the first transmission configuration comprises a first tuning configuration of the first antenna, wherein the second transmission configuration comprises a second tuning configuration of the first antenna;

a second radiohead circuit comprising a second transceiver chain configured to receive the first radio frequency signal and the second radio frequency signal;

a memory configured to store a plurality of possible tuning configurations of the first antenna, wherein the plurality of possible tuning configurations are ordered according to antenna impedance, wherein adjacent tuning configurations in the plurality of possible tuning configurations have a smallest possible difference in the antenna impedance within the plurality of possible tuning configurations, wherein the first tuning configuration and the second tuning configuration are adjacent tuning configurations in the plurality of possible tuning configurations; and one or more processors configured to determine a first signal parameter associated with the first radio frequency signal received at the second transceiver chain and a second signal parameter associated with the second radio frequency signal received at the second transceiver chain, wherein each of the first signal parameter and the second signal parameter comprises at least one of a signal-to-noise ratio or an error vector magnitude, and to determine a preferred transmission configuration for the first transceiver chain based on the first signal parameter and the second signal parameter, wherein the one or more processors configured to determine the preferred transmission configuration comprises the one or more processors configured to select, as the preferred transmission configuration, the first tuning configuration or the second tuning configuration based on a comparison of the first signal parameter and the second signal parameter.

2. The communication device of claim 1, wherein the first transceiver chain is further configured to transmit a third radio frequency signal associated with a third transmission configuration, wherein the second transceiver chain is further configured to receive the third radio frequency signal, wherein the one or more processors are further configured to determine a third signal parameter associated with the third radio frequency signal received at the second transceiver chain, and to determine a preferred transmission configuration for the first transceiver chain by using the first signal parameter, the second signal parameter, and the third signal parameter.

3. The communication device of claim 1, wherein the first signal parameter comprises a first power of the first radio frequency signal received at the second transceiver chain, wherein the second signal parameter comprises a second power of the second radio frequency signal received at the second transceiver chain, wherein the one or more processors are configured to select the first transmission configuration as the preferred transmission configuration in case the first power is greater than the second power, and to select the second transmission configuration as the preferred transmission configuration in case the second power is greater than the first power.

4. The communication device of claim 1, wherein the first transceiver chain is configured to transmit the first radio frequency signal and the second radio frequency signal via the first antenna, wherein the second radiohead circuit comprises a second antenna, wherein the second transceiver chain is configured to receive the first radio frequency signal and the second radio frequency signal via the second antenna.

5. The communication device of claim 1,
wherein the first radio frequency signal is associated with a first communication channel between the first transceiver chain and the second transceiver chain,
wherein the second radio frequency signal is associated with a second communication channel between the first transceiver chain and the second transceiver chain,
wherein the first signal parameter is indicative of a first quality of the first communication channel,
wherein the second signal parameter is indicative of a second quality of the second communication channel.

6. The communication device of claim 1,
wherein the first transceiver chain and the second transceiver chain are further configured to transmit the respective radio frequency signals in synchronization with one another.

7. The communication device of claim 1,
wherein the first radiohead circuit comprises one or more first processors configured to convert a radio frequency signal in the time domain into a radio frequency signal in the frequency domain,
wherein the second radiohead circuit comprises one or more second processors configured to convert a radio frequency signal in the time domain into a radio frequency signal in the frequency domain.

8. The communication device of claim 1,
wherein the one or more processors are configured to carry out processing in the frequency domain.

9. The communication device of claim 1,
wherein the one or more processors are a part of a system on chip (SoC).

10. The communication device of claim 1, further comprising:
a first distributed radio system and a second distributed radio system;
wherein the first radiohead circuit is associated with the first distributed radio system; and
wherein the second radiohead circuit is associated with the second distributed radio system.

11. The communication device of claim 1,
wherein the first transceiver chain is configured to transmit a further radio frequency signal using the preferred transmission configuration.

12. The communication device of claim 1,
wherein the one or more processors are digitally coupled with the first radiohead circuit and with the second radiohead circuit.

13. The communication device of claim 1,
wherein the one or more processors are configured to instruct a first transmit calibration of the first transceiver chain prior to transmission of the first radio frequency signal and of the second radio frequency signal,
wherein the one or more processors are configured to instruct a second receive calibration of the second transceiver chain prior to reception of the first radio frequency signal and of the second radio frequency signal.

14. The communication device of claim 13,
wherein the one or more processors are configured to instruct the first transmit calibration by transmitting one or more first transmit calibration parameters to the first radiohead circuit,
wherein the one or more processors are configured to instruct the second receive calibration by transmitting one or more second receive calibration parameters to the second radiohead circuit.

15. The communication device of claim 1,
wherein the second transceiver chain is further configured to transmit a fourth radio frequency signal associated with a fourth transmission configuration and to transmit a fifth radio frequency signal associated with a fifth transmission configuration,
wherein the first transceiver chain is further configured to receive the fourth radio frequency signal and the fifth radio frequency signal,
wherein the one or more processors are further configured to determine a fourth signal parameter associated with the fourth radio frequency signal received at the first transceiver chain and a fifth signal parameter associated with the fifth radio frequency signal received at the first transceiver chain, and to determine a preferred transmission configuration for the second transceiver chain by using the fourth signal parameter and the fifth signal parameter.

16. The communication device of claim 15,
wherein the second transceiver chain is further configured to transmit a sixth radio frequency signal associated with a sixth transmission configuration,
wherein the first transceiver chain is further configured to receive the sixth radio frequency signal,
wherein the one or more processors are further configured to determine a sixth signal parameter associated with the sixth radio frequency signal received at the first transceiver chain, and to determine a preferred transmission configuration for the second transceiver chain by using the fourth signal parameter, the fifth signal parameter, and the sixth signal parameter.

17. The communication device of claim 15,
wherein the fourth signal parameter includes a fourth power of the fourth radio frequency signal received at the first transceiver chain and that the fifth signal parameter includes a fifth power of the fifth radio frequency signal received at the first transceiver chain.

18. The communication device of claim 15,
wherein the one or more processors are further configured to instruct a first receive calibration of the first transceiver chain prior to reception of the fourth radio frequency signal and of the fifth radio frequency signal,
wherein the one or more processors are further configured to instruct a second transmit calibration of the second transceiver chain prior to transmission of the fourth radio frequency signal.

19. The communication device of claim 13,
wherein the one or more processors are further configured to instruct the first transmit calibration and the second receive calibration in synchronization with one another.

20. The communication device of claim 18,
wherein the one or more processors are further configured to instruct the second transmit calibration and the first receive calibration in synchronization with one another.

21. The communication device of claim 13,
wherein the one or more processors are further configured to instruct the first transmit calibration and the second receive calibration concurrently with one another or at least partially simultaneously with one another.

22. The communication device of claim 18,
wherein the one or more processors are further configured to instruct the second transmit calibration and the first receive calibration concurrently with one another.

23. The communication device of claim 1,
wherein each of the first transceiver chain and the second transceiver chain comprises one or more components of the list of components including or consisting of: a low noise amplifier circuit, a power amplifier circuit, a digital pre-distortion circuit, a down-sampling circuit, a local oscillator circuit, an antenna tuning circuit, and a phase-modulation circuit.

24. The communication device of claim 23, wherein the first transmission configuration includes a first configuration of one or more of the components of the first transceiver chain, and that the second transmission configuration includes a second configuration of one or more of the components of the first transceiver chain.

* * * * *